US012251027B1

(12) United States Patent
Larsen et al.

(10) Patent No.: US 12,251,027 B1
(45) Date of Patent: Mar. 18, 2025

(54) ROTARY DRUM SYSTEM FOR FORMATION OF A GEL INFUSED PLIANT FOAM BODY

(71) Applicants: John Robert Larsen, Gig Harbor, WA (US); James Van Lear, Shady Shores, TX (US)

(72) Inventors: John Robert Larsen, Gig Harbor, WA (US); James Van Lear, Shady Shores, TX (US)

(*) Notice: Subject to any disclaimer, the term of this patent is extended or adjusted under 35 U.S.C. 154(b) by 0 days.

(21) Appl. No.: 18/762,258

(22) Filed: Jul. 2, 2024

Related U.S. Application Data

(60) Provisional application No. 63/638,923, filed on Apr. 25, 2024.

(51) Int. Cl.

| | |
|---|---|
| ***A47C 27/15*** | (2006.01) |
| ***A47C 27/20*** | (2006.01) |
| ***B02C 18/22*** | (2006.01) |
| ***B66C 19/02*** | (2006.01) |

(52) U.S. Cl.
CPC .............. *A47C 27/15* (2013.01); *A47C 27/20* (2013.01); *B02C 18/225* (2013.01); *B66C 19/02* (2013.01)

(58) Field of Classification Search
CPC ....... B29C 44/28; B29C 44/285; B29C 44/30; B29C 44/3403; B29C 44/353; B29C 44/461; B29C 44/467; A47C 27/085; A47C 27/148; A47C 27/15; A47C 7/18; A47C 7/20
See application file for complete search history.

(56) References Cited

U.S. PATENT DOCUMENTS

| | | | |
|---|---|---|---|
| 2,604,642 | A | 7/1952 | Marco |
| 5,167,401 | A | 12/1992 | James et al. |
| 5,575,085 | A | 11/1996 | Groombridge |
| 6,848,136 | B2 | 2/2005 | Sonobe |
| 7,325,759 | B2 | 2/2008 | Meyer |
| 8,231,756 | B2 | 7/2012 | Kim |
| 8,434,748 | B1 | 5/2013 | Pearce et al. |
| 9,259,099 | B1 | 2/2016 | Larsen et al. |
| 9,914,601 | B2 | 3/2018 | Morency et al. |
| 10,913,432 | B1 | 2/2021 | Goldsmith |
| 11,330,851 | B2 | 5/2022 | Bailey et al. |
| 11,766,811 | B1 | 9/2023 | Larsen et al. |
| 2002/0013407 | A1 | 1/2002 | Pearce et al. |

(Continued)

FOREIGN PATENT DOCUMENTS

EP 3441327 A1 2/2019

OTHER PUBLICATIONS

Wee, et al., Tuning MXene Properties Through Cu Intercalation: Coupled Guest/Host Redox and Pseudocapacitance, ACS Nano Publications, 2024, vol. 18, pp. 10124-10132m, United States.

(Continued)

*Primary Examiner* — Stella K Yi
(74) *Attorney, Agent, or Firm* — Elizabeth Reilly; Patentpending, PLLC

(57) ABSTRACT

A rotary drum system and method for the formation of a gel infused pliant foam body including a rotary drum, a gel heating metal table, a gel heating metal table cover, a plurality of pliant foam core bodies, an overhead double-beam bridge crane, a rotary drum anchorage conveyor frame, a rack and pinion motor, a rotary drum, a rotary drum motor, a dual gripping effector, a gel position sensor, an exhaust hood, a heated gel infused pliant foam core body lift, a heated gel infused pliant foam core body resting and transport table.

19 Claims, 35 Drawing Sheets

(56) References Cited

U.S. PATENT DOCUMENTS

| | | | |
|---|---|---|---|
| 2004/0098806 | A1 | 5/2004 | Stender et al. |
| 2008/0095983 | A1 | 4/2008 | Carlsen et al. |
| 2010/0229308 | A1 | 9/2010 | Pearce et al. |
| 2010/0237082 | A1 | 9/2010 | Fernandez |
| 2012/0167308 | A1 | 7/2012 | Van Lear |
| 2021/0179241 | A1 | 6/2021 | Cecchin |
| 2024/0156144 | A1 | 5/2024 | Titel et al. |

OTHER PUBLICATIONS

Jia, et al., Fabrication, Microstructure and Properties of Ti3C2Tx MXene Nanosheets Reinforced Cu Composites, Journal of Materials Research and Technology, available online—Jan. 3, 2023, https://doi.org/10.1016/j.jmrt.2022.12.189, Publishing Company, Elsevier B.V., United States.

Liu, et al., Electrically Conductive Aluminum Ion-Reinforced MXene Films for Efficient Electromagnetic Interference Shielding, The Journal of Materials Chemistry C, 2020, vol. 8, 1673-1678, United States.

Foley, Mike, cheaptubes.com, 3992 Rte. 121 East Ste. 3, Grafton, VT 05146, https://www.cheaptubes.com/product/mxene-ti3c2-materials/last accessed on Jun. 15, 2024, United States.

Wang,et al., MXene-Base Materials for Multivanlent Metal-Ion Batteries, Batteries, 2023, vol. 9, p. 174. https://doi.org/10.3390/batteries9030174, United States.

Ghidiu, et al., Ion-Exchange and Cation Solvation Reactions in Ti3C2 MXene, Chem.Mater. 2016, vol. 28, 10, pp. 3507-3514, https:/doi.org/10.1021/acs.chemmater.6b01275, United States.

Qin, et al., Flexible MXene/Copper/Cellulose Nanobiber Heat Spreader Films With Enhanced Thermal Conductivity, Publisher, De Gruyter, https://doi.org/101515/ntrev-2022-0096, Feb. 16, 2022, United States.

Patel, Prachl, Mighty MXenes Are Ready for Launch, Chemical & Engineering News, vol. 102, Issue 9, Mar. 25, 2024, United States.

Di Wang, et al., Direct Synthesis and Chemical Vapor Deposition of 2D Carbide and Nitride MXenes, Science, vol. 379, Issue 6638, pp. 1242-1247, Mar. 23, 2023, doi:1010.1126/science.add9204, United States.

Worku, et al., Recent Advances in MXene-Based Materials for High-Performance Metal-Air Batteries, Green Chemistry Letters and Reviews, Article 2325983, Feb. 27, 2024, https:/doi.org/10.17518253.2024.2325983, United States.

Bilibana, Mawethu, Electrochemical Properties of MXenes and Applications, Advanced Sensor and Energy Materials, Advanced Sensor and Energy Materials Journal, Published by Elsevier B.V., https://doi.org/10.1016/j.asems.2023.100080, United States.

MSE Supplies, MSE PRO Ti3C2Tx MXene Multilayer Nanoflakes, https://www.msesupplies.com/pages/search-results?q=Mxene, last accessed Jun. 15, 2024, 2705 E.Medina, AZ, 85756, United States.

Prior Art

FIG. 16A

KIT 900

A rotary drum system for the formation of a gel infused pliant foam body 10;

a gel heating metal table 12;

a gel heating metal table cover 100;

a gel heating metal table cover weighted rubber mat 118;

a plurality of pliant foam core bodies $52^{1+N}$;

an overhead double – beam bridge crane 140;

a rotary drum anchorage conveyor frame 190;

a rack and pinion motor 290;

a rotary drum 200; ⇨

FIG. 16B

KIT 900 (continued)

a rotary drum motor 516;

a dual gripping effector 420;

a gel position sensor 628;

an exhaust hood 692;

a heated gel infused pliant foam core body lift 314;

a plurality of top anti-static high temperature mat 640;

a heated gel infused pliant foam core body resting and transport table 316;

a dual gel supply pipe system 66;

a gel extruder system 70;

a gel subscription for recurring delivery 902;

a pliant foam core body subscription for recurring pliant foam core body delivery service 904;

FIG.16C

KIT 900 (continued)

a gel foam core body system instruction manual 906 including a quick reference code 908 to access a manufacturer's instructions 910;

a warranty 912;

contact information 914;

ion – intercalated Mxene film subscription 916 for recurring delivery; a plurality of bolted column end cap plates $\mathbf{154}^{1+N}$; a plurality of I – beam end plates $\mathbf{166}^{1+N}$;

a plurality of 90° cast aluminum channel joiner fitting connectors $\mathbf{208}^{1+N}$;

a plurality of steel double joist holders $\mathbf{238}^{1+N}$;

a plurality of plain push trolleys $\mathbf{256}^{1+N}$ being rivet locked; a plurality of iron face plates $\mathbf{236}^{1+N}$;

FIG. 16D

KIT 900 (continued)

a plurality of wheels 110, 112, 114, 116, adapted for the gel heating metal table cover 100;

a plurality of 360° swivel wheels 678, 680, 682, 684, adapted for the heated gel infused pliant foam core body resting and transport table 316;

a plurality of gripping effectors $\mathbf{420}^{1+N}$;

a plurality of rolled steel square tubing 512; a plurality of rack and pinion drive chains $\mathbf{326}^{1+N}$; a plurality of first rotary drum drive chains 614; a plurality of second rotary drum drive chains 624;

a plurality of sprockets 606, 618, 610, 622; a plurality of trunnions $\mathbf{522}^{1+N}$; a plurality of drive shaft center support bearings $\mathbf{594}^{1+N}$;

FIG.16E

KIT 900 (continued)

a plurality of differential pilot bearings 598$^{1+N}$;

a plurality of hook connectors 376$^{1+N}$;

a plurality of carabiner snap clips 374$^{1+N}$; a plurality of rotary drum cylindrical drive axle 524$^{1+N}$, 600$^{1+N}$;

a plurality of bolted flanged metal face plate 356$^{1+N}$;

a plurality of I-beam end plates 166$^{4}$;

a plurality of stainless steel square plate eye hook 354$^{1+N}$; quick reference code 908 label including intellectual property identifying registration numbers, or serial numbers, or certificate numbers, comprising of the group of intellectual property patents, trademarks, and copyright;

Occupational Safety and Health Administration (OSHA) guidelines 918 for the planar heater device 92 and for the gel heating metal table 12; and gel product information sheets 920.

ROTARY DRUM SYSTEM FOR FORMATION OF A GEL INFUSED PLIANT FOAM BODY

PRIORITY CLAIM

This application of a non-provisional patent claims the benefit of U.S. Provisional Application No. 63/638,923, filed title GEL PLIABLE FOAM BODY SYSTEM filed on Apr. 25, 2024, the contents of which are incorporated by reference in its entirety.

FIELD OF THE INVENTION

The disclosure relates to the field of a gel infused pliant foam body processing and method implemented by a rotary drum system. A rotary drum system for the formation of a gel infused pliant foam body includes a rotary drum; a gel heating metal table; a gel heating metal table cover; a plurality of pliant foam core bodies; an overhead double-beam bridge crane; a rotary drum anchorage conveyor frame; a rack and pinion motor; a rotary drum; a rotary drum motor; a dual gripping effector; a gel position sensor; an exhaust hood; a heated gel infused pliant foam core body lift; a heated gel infused pliant foam core body resting and transport table. The disclosure, also, relates to the field of MXene films as used in conductivity and thermoconductivity of heat applied in the method of the rotary drum system for the formation of the gel infused pliant foam body. The method of the rotary drum system can be implemented in producing a variety of sizes of mattresses, cushions, seats, pillows, furniture, a variety of supportive items for a user, and, also, in the field of stuffed animals, substates for apparel, and in products where there is a necessity for support. The disclosure of the present invention, also, relates to methods for manufacturing the dual-core foam body amalgamate and the dual-core body amalgamate without requiring the use of a traditional metal mold.

DESCRIPTION OF THE RELATED ART

Known methods for manufacturing supports employing both gel and foam exhibit a variety of shortcomings. Typically, the gel must first be extruded, injected, or poured into and shaped by large and expensive metal molds. These molds are usually large and quite heavy. As a result, they are difficult to maneuver into position and properly secure during the molding operation. Extracting the cooled and formed gel from the mold can also be difficult and time consuming. Moreover, the size of the molded gel support is strictly limited by the size of the available metal mold. After the gel is molded, further problems are encountered securing the gel to one or more layers of foam. Cured gel is unable to adhere directly to the foam. As a result, the gel usually must first be heat bonded to a thin textile layer of scrim. This requires the purchase and maintenance of additional manufacturing material which results in additional manufacturing steps and resultant expenses. Conventional gel support products also tend to be vertically unstable and are apt to buckle outwardly when a large load is applied. This is undesirable and can significantly reduce the usefulness, support, and lifespan of the product.

SUMMARY

The present disclosure is directed to a rotary drum system implemented in a method of manufacture of a gel infused pliant foam body. The disclosure relates to the field of a gel infused pliant foam body processing and method implemented by a rotary drum system. A rotary drum system for the formation of a get infused pliant foam body includes a rotary drum, a gel heating metal table; a gel heating metal table cover; a plurality of pliant foam core bodies; an overhead double-beam bridge crane; a rotary drum anchorage conveyor frame; a rack and pinion motor; a rotary drum; a rotary drum motor; a dual gripping effector; a gel position sensor; an exhaust hood; a heated gel infused pliant foam core body lift; a heated gel infused pliant foam core body resting and transport table. The operation of the rotary drum revolves at the rate of between 1.25-1.75 rpm being timed by a timer.

The rotary drum system implemented in a method of manufacture of a gel infused pliant foam body includes a dual gripping effector including a first gripping effector and a second gripping effector. The first gripping effector includes a first master rigid plate, a first handle operationally connected to a first all-thread encased in a first compression spring; a second handle operationally connected to a second all-thread encased in a second compression spring; a first gripping jaw and a second gripping jaw. The dual effector is implemented in the rotary drum system implemented in a method of manufacture of a gel infused pliant foam body to grip a leading end and a trailing end of the pliant foam core body mounted upon the rotary drum as the rotary drum rotates within a specific volume of heated gel contained within the metal gel basin of the gel heating metal table.

The gel position sensor detects the surface of a heated gel in a gel bath contained within the metal gel basin when the pliant foam core body is gripped circumferentially around the rotary drum and descends into the 380° F. heated liquid gel contained in the metal gel basin of the gel heating metal table the gel position sensor detects a top surface of the 380° F. heated liquid gel whereby the position gel sensor sends an electric signal to the rack and pinion motor whereby the descent of the rotary drum is halted at the predetermined depth to prevent an unwanted retention of an influent of 380° F. heated liquid gel upon the exterior cube surfaces of the plurality of extended cubes and the outlying surfaces of each of the plurality of recessed channels of the pliant foam core body such that as the rotary drum continues to rotate 360° for 45 seconds so that each of the exterior cube surfaces of the plurality of extended cubes and the outlying surfaces of each of the plurality of recessed channels of the pliant foam core body is infused with 380° F. heated liquid gel to a predetermined gel thickness to create a hydrophobic gel barrier over each of the exterior cube surfaces of each of the plurality of extended cubes of the series of the plurality of extended cubes and outlying surfaces of each of the plurality of recessed channels to form a heated gel infused pliant foam core body. The gel position sensor is selected from the group comprising any one of potentiometric linear transducer sensors, laser position sensors, and contact position sensors.

The heated gel infused pliant foam body showing is maneuvered onto a heated gel infused pliant foam core body lift and, subsequently, the heated gel infused pliant foam body is maneuvered onto a heated gel infused pliant foam core body resting and transport table to cure the heated gel upon the gel infused pliant foam body to ambient temperature.

A method of process steps implementing the rotary drum system to form the gel infused pliant foam body is disclosed wherewith the process steps are repeated until the required number of gel infused pliant foam bodies are formed.

BRIEF DESCRIPTION OF THE DRAWINGS

The embodiments mentioned can be better understood through the following detailed description while perusing the drawings. It is emphasized that the various components are not necessarily drawn to scale. In the drawings, identical reference labels denote identical elements. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment in a designated drawing need not portray all aspects of the elements of the embodiment where additional elements may be shown in another designated drawing.

FIGS. 16A-16E is a flowchart of a kit of a rotary drum system for the formation of a gel infused pliant foam body, according to an embodiment of the present invention.

DETAILED DESCRIPTION

Figure 1A:
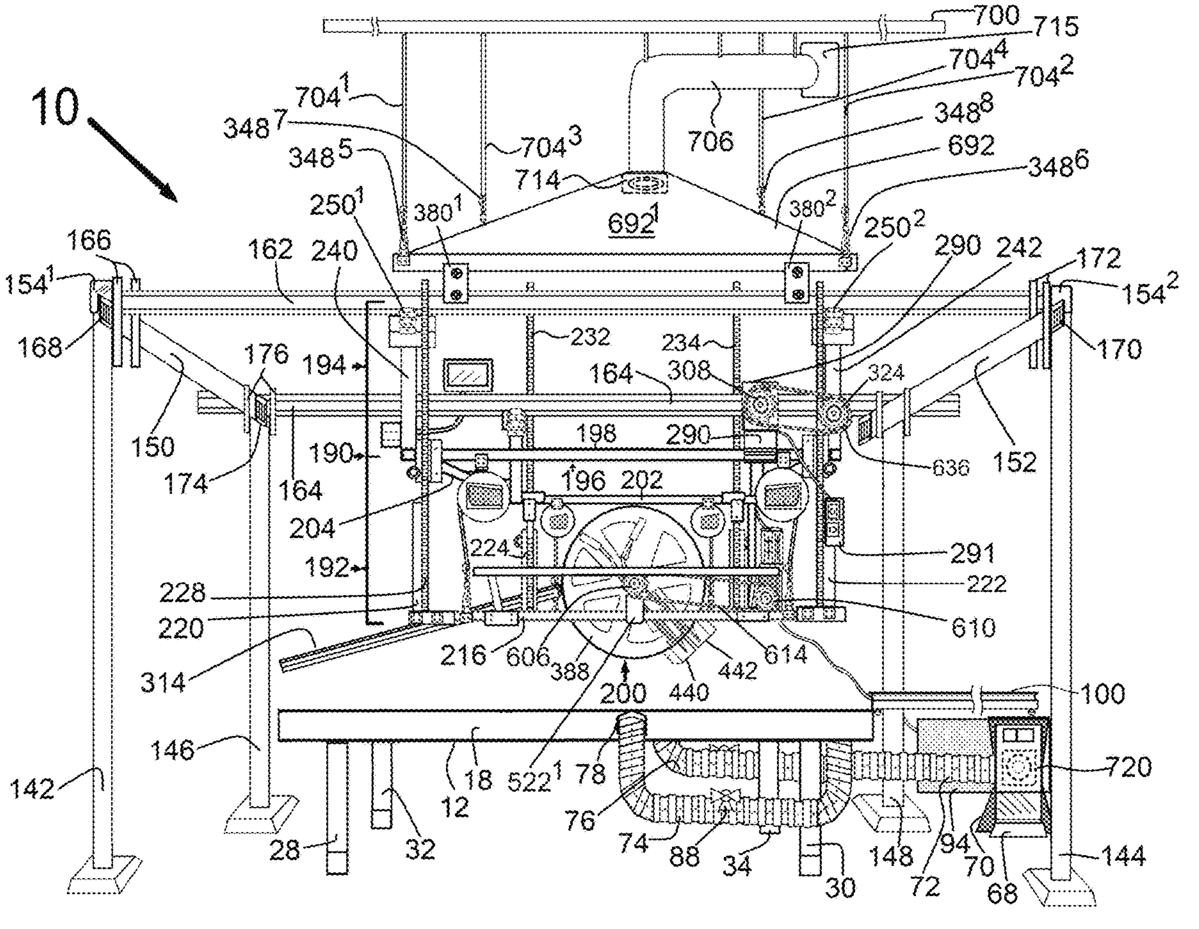
FIG. 1A is a front perspective view of a rotary drum system for the formation of a gel infused pliant foam body, according to an embodiment of the present invention.

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

An aspect or an advantage described in conjunction with a particular embodiment is not necessarily limited to that embodiment and can be practiced in any other embodiments, even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Exemplary embodiments have been disclosed herein, and although specific terms are employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

In one aspect, the present invention is directed to a rotary drum system for the formation of a gel infused pliant foam body to form a gel infused pliant foam body article of manufacture. Another aspect of the present invention discloses a method including processing steps for the operation of the rotary drum system for forming of a gel infused pliant foam body.

FIGS. 1A-14C illustrates an exemplary embodiment of the rotary drum system for the formation of a gel infused pliant foam body 10 comprising, a gel heating metal table 12; a gel heating metal table cover 100; a plurality of pliant foam core bodies $\mathbf{52}^{1+N}$; an overhead double-beam bridge crane 140; a rotary drum anchorage conveyor frame 190; a rack and pinion motor 290; a rotary drum 200; a rotary drum motor 516; a dual gripping effector 420; a gel position sensor 628; a timer 750; an exhaust hood 692; a heated gel infused pliant foam core body lift 314; a heated gel infused pliant foam core body resting and transport table 316; and a heated gel infused pliant foam core body resting and transport table cover 318.

Figure 1B:
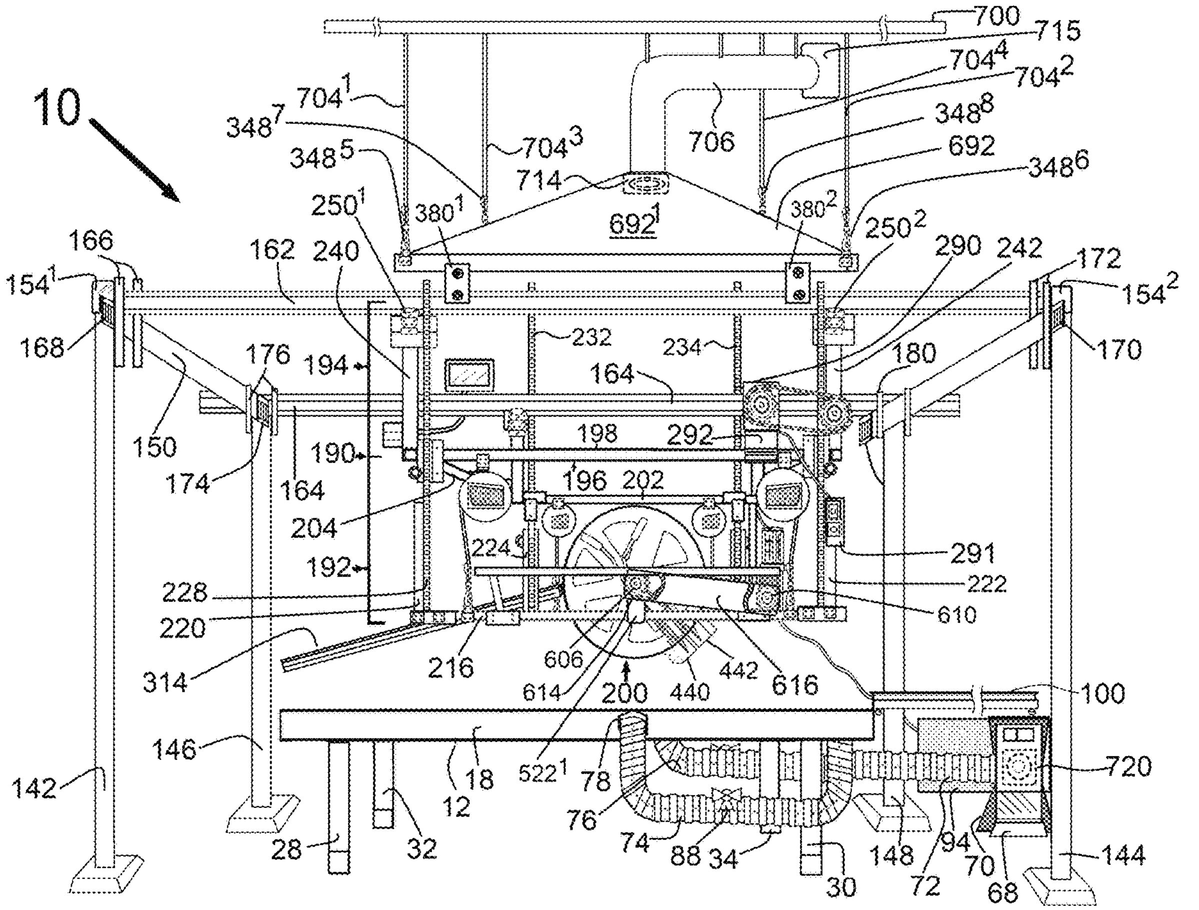
FIG. 1B is a front perspective view of the rotary drum system for the formation of a gel infused pliant foam body, according to an embodiment of the present invention.
Figure 1C:
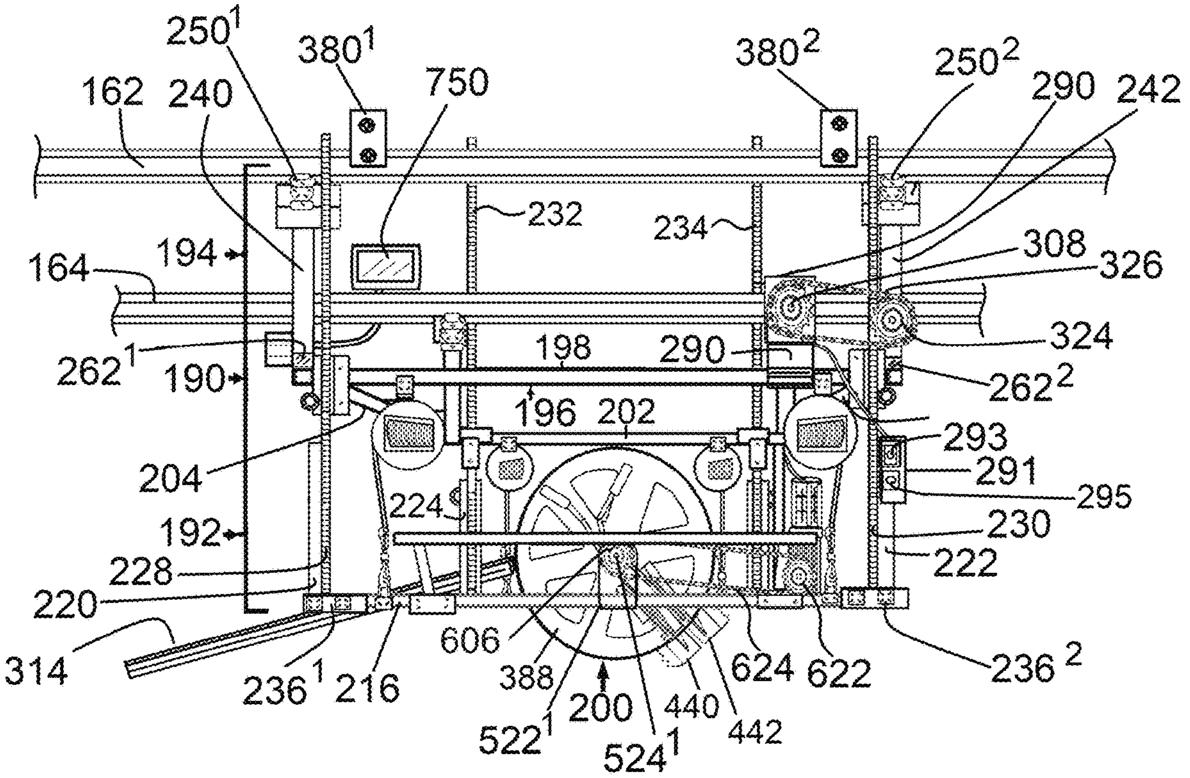
FIG. 1C is a partial view of the rotary drum system for the formation of a gel infused pliant foam body of FIG. 1A and FIG. 1B, according to an embodiment of the present invention.
Figure 2A:
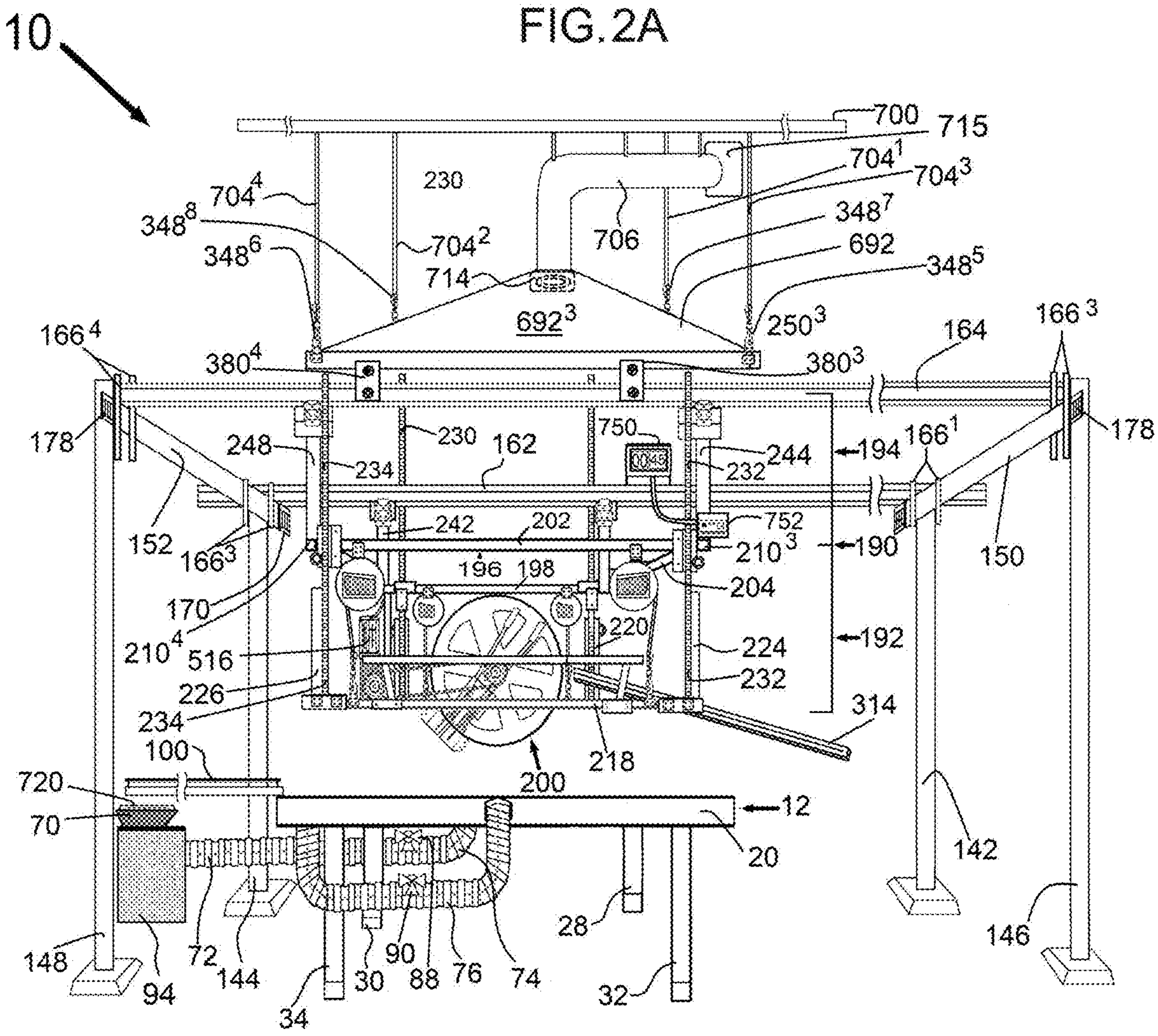
FIG. 2A is a rear perspective view of the rotary drum system for the formation of a gel infused pliant foam body, according to an embodiment of the present invention.
Figure 2B:
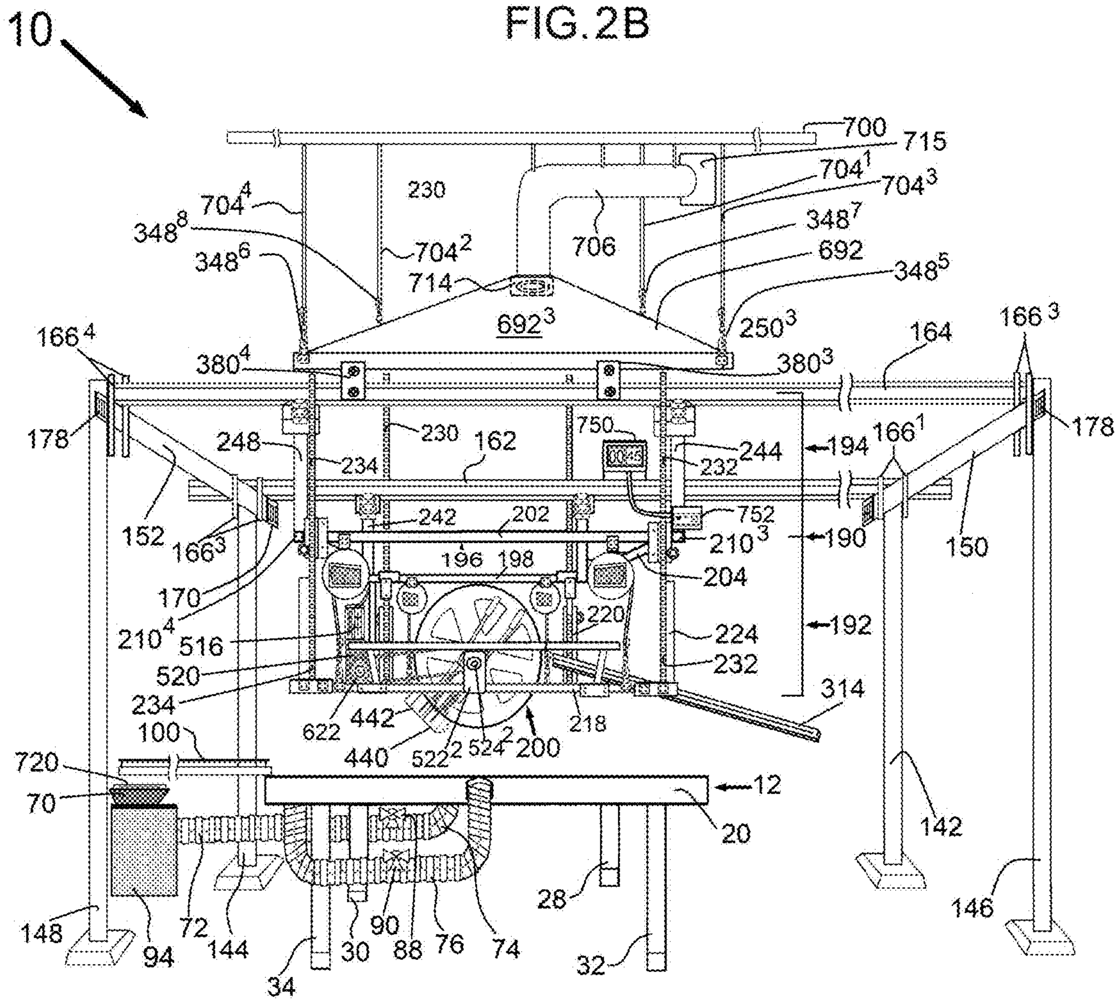
FIG. 2B is a partial perspective view of the rotary drum system for the formation of a gel infused pliant foam body of FIG. 2A, according to an embodiment of the present invention.
Figure 13:
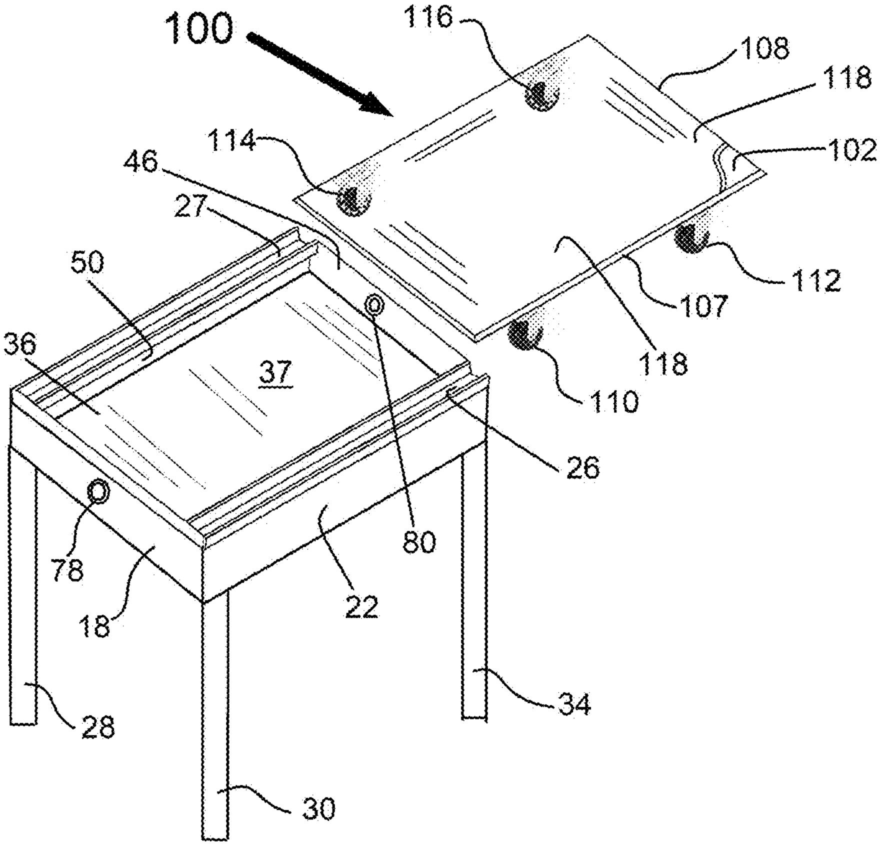
FIG. 13 is a perspective top view of the metal gel basin of a gel heating metal table of the rotary drum system for the formation of a gel infused pliant foam body showing a gel heating metal table cover, according to an embodiment of the present invention.

FIGS. 1A and 1B illustrate a front perspective view of the rotary drum system for the formation of a gel infused pliant foam body 10. FIG. 1C is a partial view of the pliant foam body gel infusion system of FIG. 1A and FIG. 1B, according to an embodiment of the present invention. FIG. 2A is a rear perspective view of the rotary drum system for the formation of a gel infused pliant foam body 10 of FIG. 1A, according to an embodiment of the present invention. FIG. 2B is another rear perspective view of the rotary drum system for the formation of a gel infused pliant foam body 10, as depicted in FIG. 1A and FIG. 1B, according to an embodiment of the present invention. FIG. 13 illustrates a top perspective view of a metal gel basin 36 of the gel heating metal table 12.

With reference to FIGS. 1A-2D together viewing FIG. 13, the rotary drum system for the formation of a gel infused pliant foam body 10 includes the gel heating metal table 12. The gel heating metal table 12 comprises a multi-metal composite table structure configured with a rectangular shape including a metal gel basin bottom wall 111 having a flat exterior surface which is bound by four upright perimetric metal walls including a front facing flat metal wall 18, a rear facing flat metal wall 20, a first lateral flat metal side wall 22, an opposing second lateral flat metal side wall 24, wherewith the metal gel basin 36 is formed therein.

The first lateral flat metal side wall 22 of the gel heating metal table 12, as shown in FIG. 13, with reference to FIGS. 1A-1B, includes a first roller track 26 configured with a first track depth and first track width, and the opposing second lateral flat metal side wall 24 includes a second roller track 27 configured with a second track depth and second track width equal to the first track depth and first track width, four insulated metal columns 28, 30, 32, 34, supporting the gel heating metal table 12, a first front insulated table metal column 28, a second front insulated table metal column 30, a first back insulated table metal column 32, and a second back insulated table metal column 34.

Figure 14A:
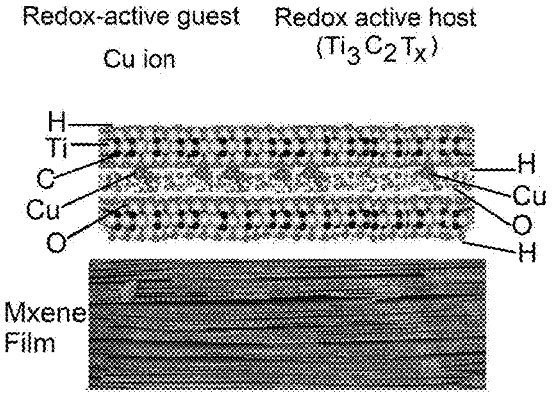
FIG. 14 A Prior Art
FIG. 14A is prior art showing an annotated illustration of the structure of non-naturally occurring Cu-$Ti_3C_2T_x$. MXene generated with ab initio molecular dynamics (AIMD) of the Ti and Cu elements in Cu-intercalated $Ti_3C_2T_x$.
Figure 14B:
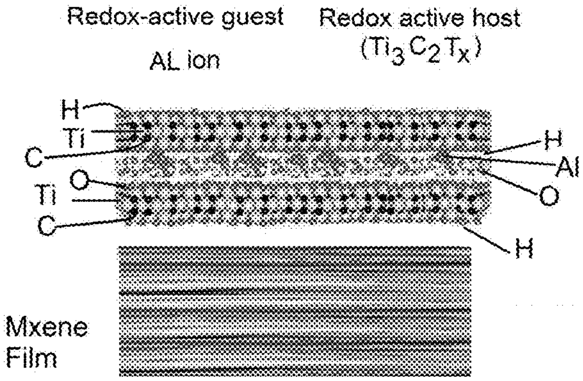
FIG. 14B is prior art showing the non-naturally occurring ion-intercalated MXene film is a non-naturally occurring Aluminum (Al) ion intercalated MXene Film.

FIG. 14A is an annotated illustration of the structure of non-naturally occurring Cu-$Ti_3C_2T_x$ MXene generated with ab initio molecular dynamics (AIMD) of the Ti and Cu elements in Cu-intercalated $Ti_3C_2T_x$. FIG. 14B is a non-naturally occurring ion-intercalated MXene film is a non-naturally occurring Aluminum (Al) ion intercalated MXene Film.

MXenes are a family of two-dimensional (2D) transition metal carbonitrides with a general formula of $M_{n+1}X_nT_x$, where M is an early transition metal, n=1–4, X is carbon and/or nitrogen, and $T_x$ refers to surface termination such as ═O, —OH, —Cl, —F, etc. MXenes offer a combination of tunable metallicity and hydrophilicity coupled with attractive redox properties that gave rise fast energy storage, electrocatalysis, and biomedical and electromagnetic shielding.

The Cu-ion MXene 808 and the Al-ion MXene 810 has been known in the art to be synthesized by Ghidiu Method: "Ion-Exchange and Cation Solvation Reactions in Ti3C2 MXene. Ghidiu, et al., Chem. Mater. (2016) Apr. 29, 2016, at https://doi.org/10.1021/acs.chemmater.6b01275.

The most ordinary method for preparing MXene is etching the MAX precursor. MAX can be expressed as $M_{n+1}AX_n$ (n ranges from 1 to 4), where M and X are the same compositions. A is mainly from the elements of the main group 13-15, such as Si, Al, Ge, Sn, etc. The MAX phase exists as three different types of unit cells with a six-square tightly packed structure of the space group P63/mmc. The A atomic layer in the MAX phase is sandwiched between the densely packed M layers, and the octahedral position is occupied by the X atom. In accordance with the crystal structure of MAX, $M_{n+1}AX_n$ is also recognized with a layered structure, in which the two-dimensional $M_{n+1}X_n$ layer is connected by the A layer. M-A is a metal bond, while M-X has both covalent and ionic bond properties, which are more stable than the M-A bond. This feature makes it possible to remove the A atoms from the MAX phase to obtain MXene.

As known in the field of art, MXene, a new series of 2D materials composed of early transition metal carbides and/or carbonitrides was first introduced by Yuri Gagotski group in 2011 and has since been growing rapidly. MXenes are a family of two-dimensional (2D) transition metal carbonitrides with a general formula of $M_{n+1}X_nT_x$, where M is an early transition metal, n=1–4, X is carbon and/or nitrogen, and $T_x$ refers to surface termination such as ═O, —OH, —Cl, —F, etc. MXenes offer a combination of tunable metallicity and hydrophilicity, coupled with redox properties that gave rise to applications, including fast energy storage, electrocatalysis, and biomedical and electromagnetic shielding. MXenes are known for their excellent pseudocapacitive energy storage properties that stem from the combination of large surface-to-volume ratio and high electrical conductivity.

MXenes, as a new category of graphene-like two-dimensional transition-metal carbides, nitrides, and carbonitrides, has attracted interdisciplinary attention since the pioneeringTi.sub.3C.sub.2 work by Naguib et al. Benefittingfrom the fascinating properties of high electrical and metallic conductivity (6,0008,000 S·Math·cm·sup·−1), large surface area, hydrophilic nature, superb carrier anisotropic mobility, and tunable band structure. M·sub·n+1X·sub·nT·sub·x (where M is an early transition metal, X is carbon and/or nitrogen, T.sub.x refers to the surface functional groups (e.g., O, OH, and/or F) and n=1, 2, or 3) and its composite have been used in a variety of applications, including electrochemical energy storage in supercapacitors and batteries, photothermal conversion, membrane separation, and catalysis.

Electronic and electrochemical properties of MXenes can be tailored by changing its chemistry from the type of transition metals within the MX layer to modification of the surface terminations. Further, since MXenes are layered and have negatively charged surfaces, they can be electrochemically intercalated by various cations and polar molecules such as monovalent ($Li^+$, $Na^+$, $K^+$, $NH_4^+$), multivalent ($Mg^{2+}$, $Al^{3+}$, $Sn^{4+}$), and organic cations (alkylammonium (TBA) offering an additional tuning knob to alter their physicochemical properties. It has been shown in the field of MXenes, Copper (Cu) intercalation into $Ti_3C_2T_x$ changes its electronic and electrochemical properties. In the prior art, it is known, as shown in FIGS. 14A-14B, Cu-intercalated $Ti_3C_2T_x$ MXene can be synthesized following the Ghidiu et al. method, published in *Tuning MXene Properties through Cu Intercalation: Coupled Guest/Host Redox and Pseudocapacitance*, Shianlin Wee, et al., *ACS Nano* 2024, 18, 14, 10124-10132 Publication Date:Mar. 21, 2024. It is demonstrated producing average Cu content is 0.23±0.007 per $Ti_3C_2T_x$ formula unit wherein the Cu ions successfully intercalate within the $Ti_3C_2T_x$ structure. Interspacing in Cu-$Ti_3C_2T_x$ falls in-between values typically attributed for $Ti_3C_2T_x$ with a monolayer and $Ti_3C_2T_x$ with a bilayer of water. The Cu-intercalated $Ti_3C_2T_x$ MXene can be stacked layer upon layer as shown in FIGS. 14A-14B.

Multilayer Molybdenum Titanium Carbide ($Mo_2Ti_2C_3$) MXene Material, Chemical Name: Molybdenum Titanium Carbide ($Mo_2Ti_2C_3$), is commercially available at MSE supplies; Foam Copper 3D MXene is commercially available at Foam Copper 3D MXene highly purel Nanochemazone at Foam Copper 3D MXene pure Nanochemzaone. It is suitable for electrochemical energy storage devices such as supercapacitors, lithium-ion batteries, aluminum batteries, and nano batteries, and used for chemical sensors and gas sensors. Molybdenum Titanium Carbide ($Mo_2Ti_2C_3$), is a typical representative material among the emerging family of 2D layered transition metal carbides and/or nitrides referred to as MXenes. It has multiple advantages such as metallic conductivity, a plastic layer structure, small band gaps, and the hydrophilic nature of its functionalized surface. It is widely used for energy storage applications such as supercapacitors, lithium-ion batteries, sodium-ion batteries, and lithium-sulfur batteries. It also can be used for electromagnetic interference (EMI) shielding coatings, semiconductors and catalysis. Multilayer Molybdenum Titanium Carbide ($Mo_2Ti_2Ca$) MXene Material is a revolutionary material for a wide range of applications. With its unique combination of mechanical, electrical, and structural properties, it is ideal for energy storage, catalysis, analytical chemistry, mechanics, adsorption, biology, microelectronics and sensors.

Figures 14C, 14D:
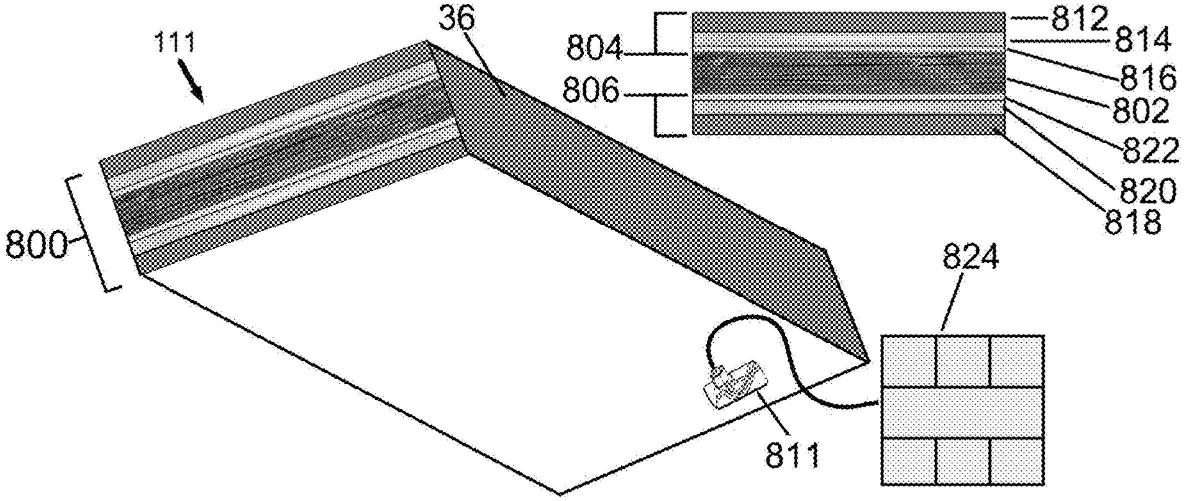
FIG. 14C is a sectional perspective view of a metal gel basin bottom wall of the metal gel basin of the rotary drum system for the formation of a gel infused pliant foam body illustrating a multilayered composite core including a non-naturally occurring Copper (Cu)-ion intercalated MXene film.
FIG. 14D is a sectional perspective view of a metal gel basin bottom wall of the metal gel basin of the gel heating metal table of the rotary drum system for the formation of a gel infused pliant foam body illustrating a multilayered composite core including a non-naturally occurring Aluminum (Al)-ion intercalated MXene film.
Figure 15A:
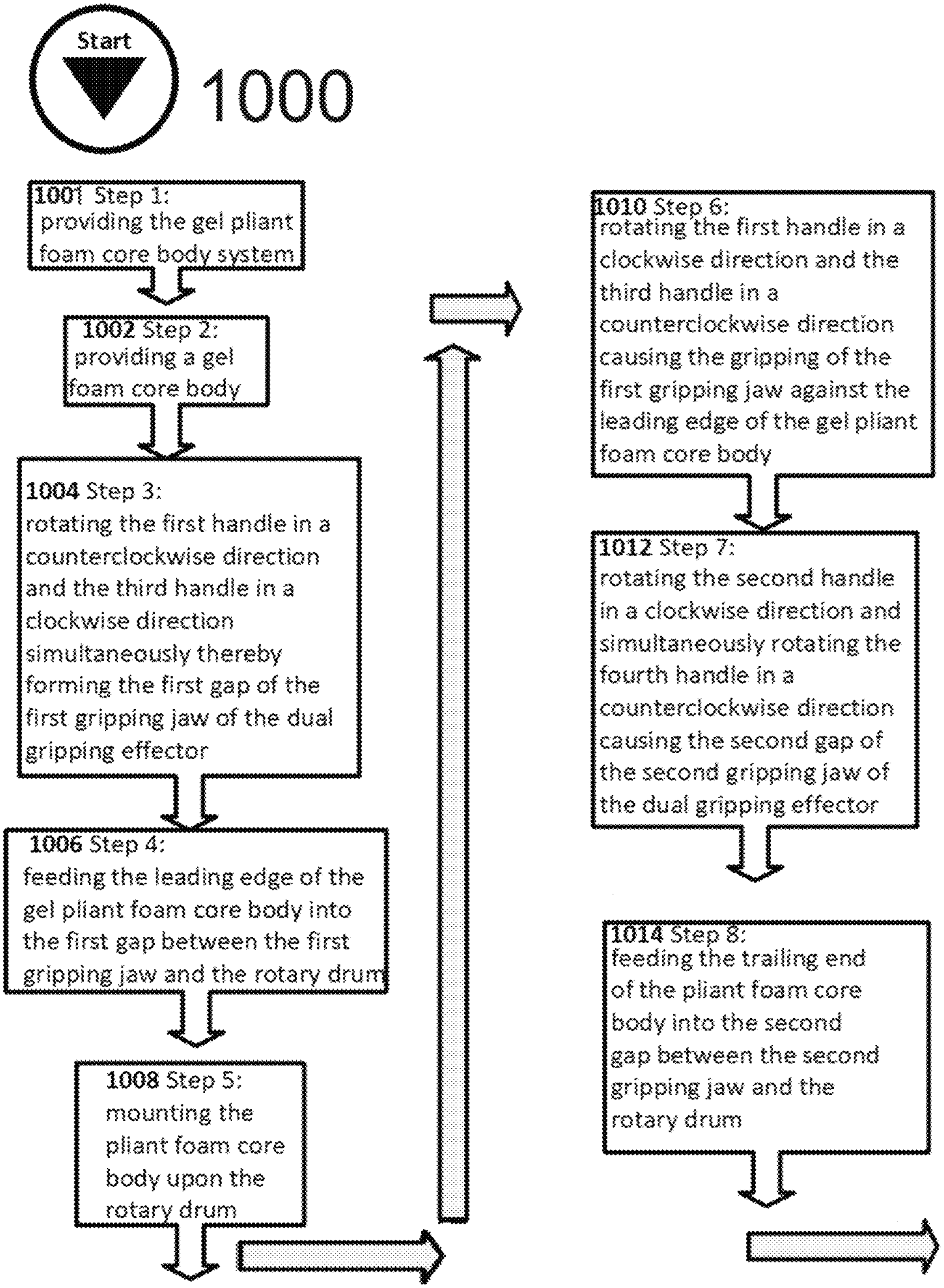
FIG. 15A is a process flow diagram for operation of the rotary drum system for the formation of a gel infused pliant foam body producing a gel infused pliant foam core body including Steps 1-8, according to an embodiment of the present invention.
Figure 15B:
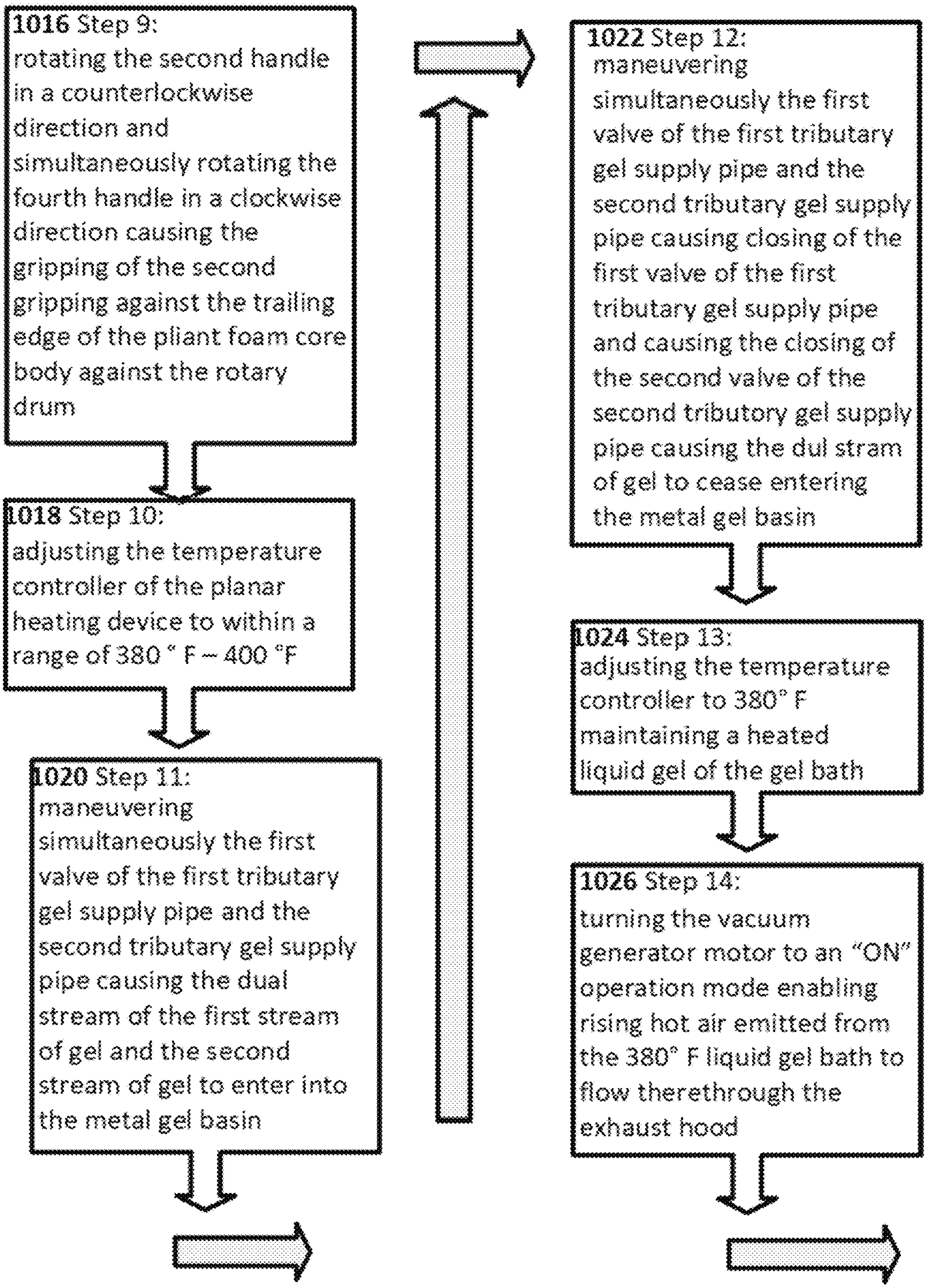
FIG. 15B is a continuation of the process flow diagram of FIG. 15A for rotary drum system for the formation of a gel infused pliant foam body producing a gel infused pliant foam core body including Steps 9-14, according to an embodiment of the present invention.
Figure 15C:
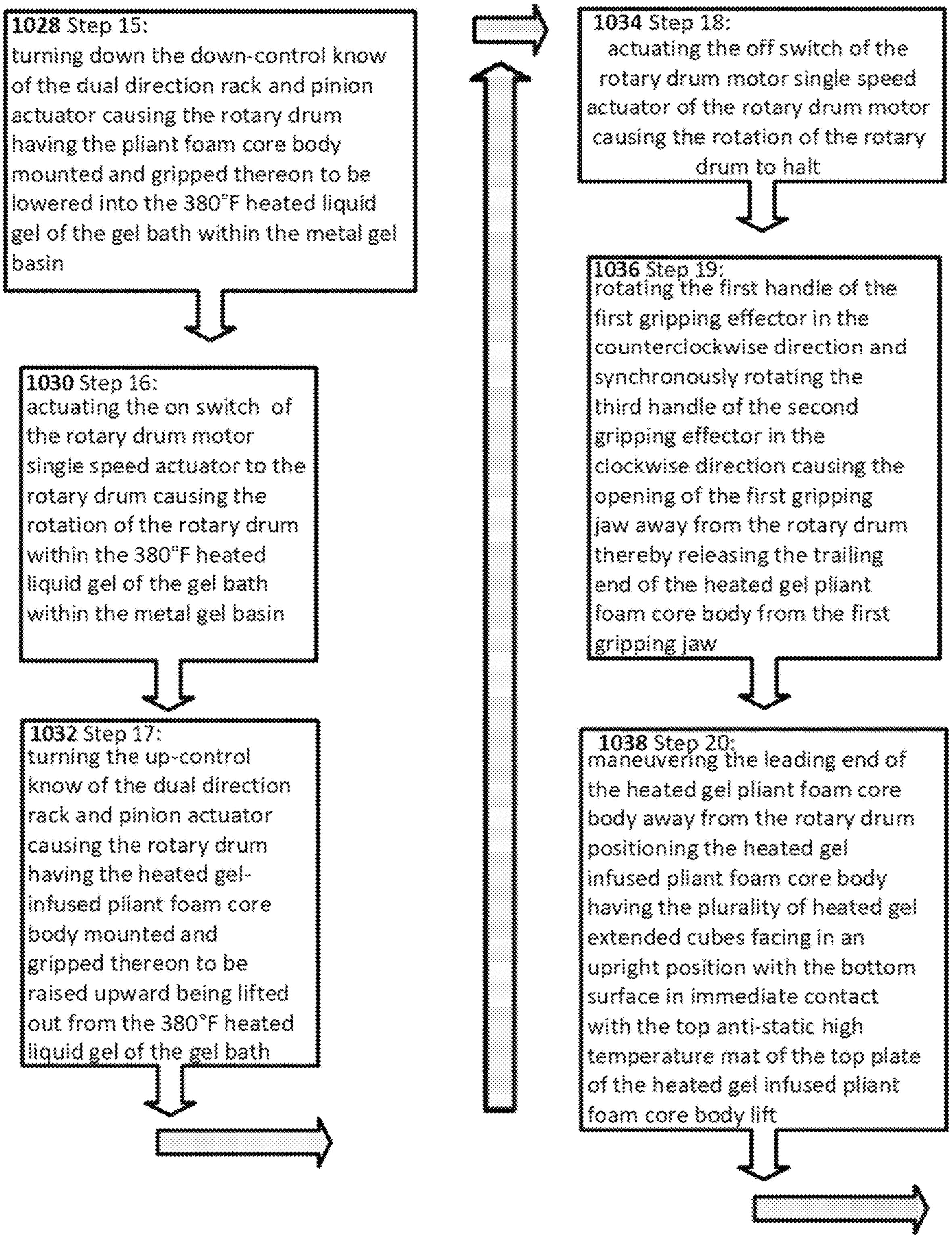
FIG. 15C is a continuation of the process flow diagram of FIG. 15B for operation of the rotary drum system for the formation of a gel infused pliant foam body producing a gel infused pliant foam core body including Steps 15-20, according to an embodiment of the present invention.
Figure 15D:
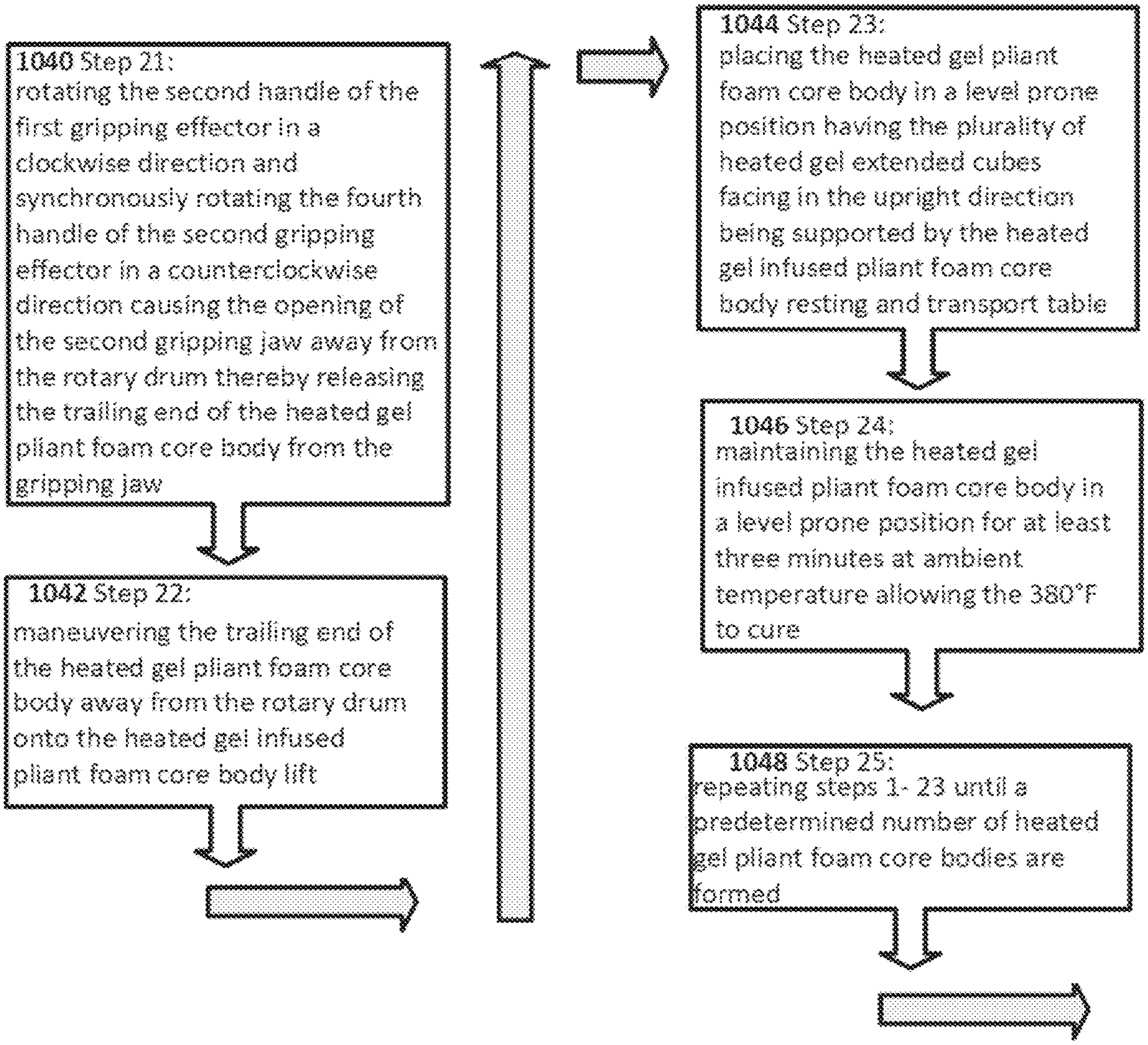
FIG. 15D is a continuation of the process flow diagram of FIG. 15C for operation of the rotary drum system for the formation of a gel infused pliant foam body producing a gel infused pliant foam core body including Steps 21-25, according to an embodiment of the present invention.
Figure 15E:
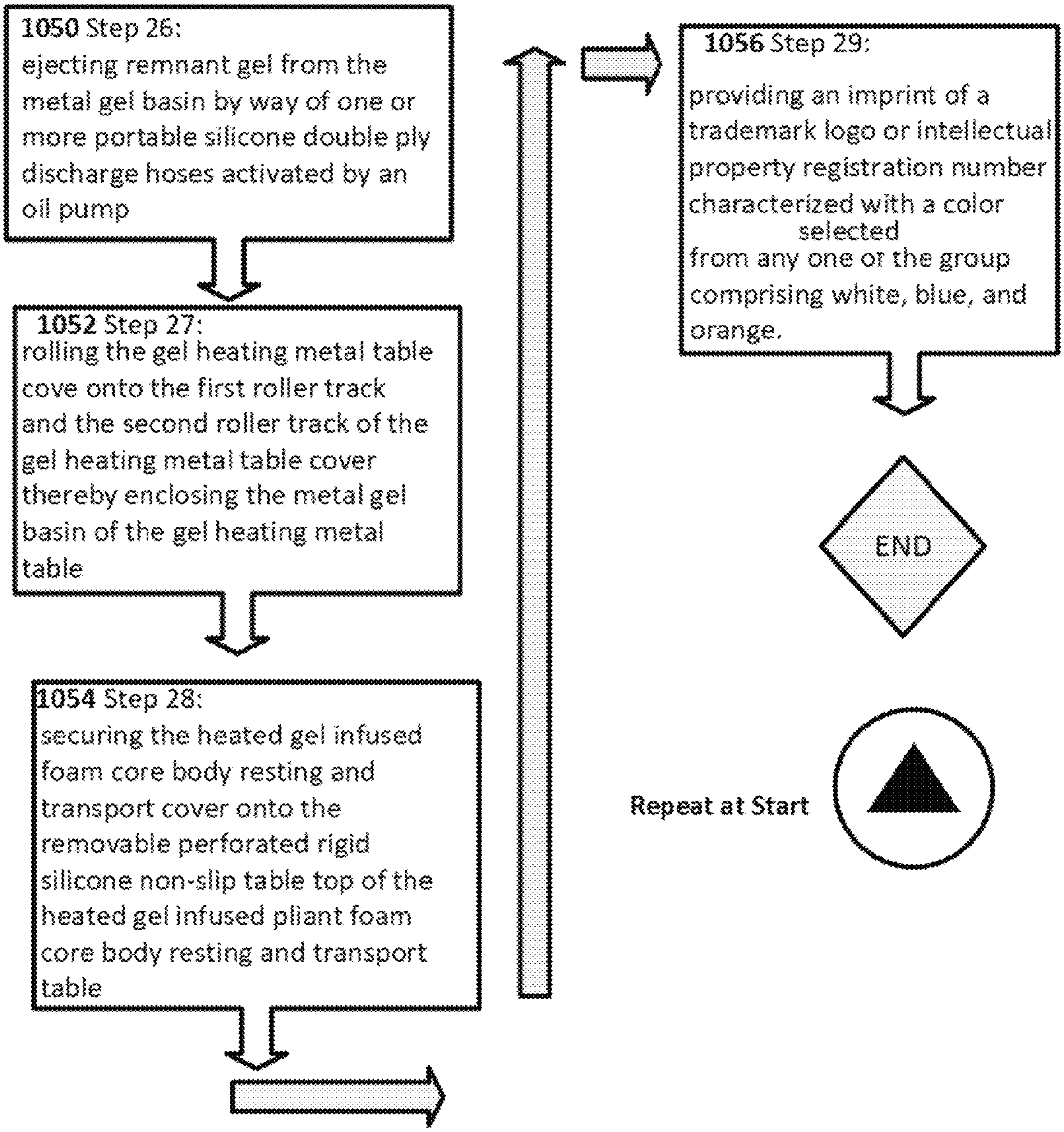
FIG. 15E is a continuation of the process flow diagram of FIG. 15D for operation of the rotary drum system for the formation of a gel infused pliant foam body producing a gel infused pliant foam core body including Steps 26-29, according to an embodiment of the present invention.

In an exemplary embodiment of the present invention, FIG. 14C is a sectional perspective view of a metal gel basin bottom wall 111 of the metal gel basin 36 of the rotary drum system for the formation of a gel infused pliant foam body 10 illustrating a multilayered composite core including a non-naturally occurring Copper (Cu) ion intercalated MXene film, hereinafter, Cu-ion intercalated MXene film 826.

In another exemplary embodiment of the present invention, FIG. 14D is a sectional perspective view of a metal gel basin bottom wall 111 of the metal gel basin 36 of the gel heating metal table 12 of the rotary drum system for the formation of a gel infused pliant foam body 10 illustrating a multilayered composite core including a non-naturally occurring Aluminum (Al)-ion intercalated MXene film, hereinafter, Al-ion intercalated MXene film 828.

As depicted in FIGS. 14C, with reference to FIGS. 14A-14B, FIGS. 1A-1B and FIGS. 2A-2B, the metal gel basin bottom wall 111 of the metal gel basin 36 of the gel heating metal table 12 includes a multilayered composite core 800 configured therein with a non-naturally occurring ion-intercalated MXene film 802, discussed in detail herein below. The multilayered composite core 800 includes a superior composite 804 and an inferior composite 806 configured with the non-naturally occurring ion-intercalated MXene film 802 layered therebetween the superior composite 804 and the inferior composite 806 of the multilayered composite core 800 of the metal gel basin 36.

With attention to FIG. 14C, the superior composite 804 of the multilayered composite core 800 of the metal gel basin bottom wall 111 includes three layers, a first layer including a superior stainless steel plate 812, a second layer including a superior ultra-high-temperature ceramic (UHTC) plate 814, or an ultra-high temperature porcelain plate (UHTP), a third layer including a superior copper sheet 816 wherein each of the superior stainless steel plate 812, the superior ultra-high-temperature ceramic (UHTC) plate 814, or the ultra-high temperature porcelain plate (UHTP), and the superior copper sheet 816 are each dimensioned with an equal surface area having equal square footage.

The superior stainless steel plate 812 is disposed having an exterior facing superior stainless steel wall 812$^E$ and an interior facing superior stainless steel wall 812$^I$ wherein the exterior facing superior stainless steel wall 812$^E$ having a first surface area is configured being positioned to provide an entire surface area of the metal gel basin floor 37 of the metal gel basin 36 of the get heating metal table 12 to generate thermoconductive stability to the metal gel basin floor 37 as the gel is being heated to 380° F. within the metal gel basin 36 of the get heating metal table 12.

The interior facing superior stainless steel plate 812$^I$ is contiguous with an upper facing wall 814$^U$ of the superior ultra-high-temperature ceramic (UHTC) plate 814 wherein a lower facing wall 814$^L$ of the superior ultra-high-temperature ceramic plate 814 is contiguous with an upper facing surface 816$^U$ of the superior copper sheet 816. The superior ultra-high-temperature ceramic (UHTC) plate 814 or the superior ultra-high-temperature porcelain (UHTP) plate 814 provides thermoconductive characteristics enabling the transfer of heat from the superior stainless steel wall 812.

A lower facing surface 816$^L$ of the superior copper sheet 816 is contiguous with a top layer of the non-naturally occurring ion-intercalated MXene film 802 being layered therebetween the superior composite 804 and the inferior composite 806 of the multilayered composite core 800 of the metal gel basin 36.

The inferior composite 806 of the metal get basin bottom wall 111 includes three layers, a first layer including an inferior stainless steel plate 818, a second layer including an inferior ultra-high-temperature ceramic (UHTC) plate 820, or an inferior ultra-high temperature porcelain plate (UHTP), a third layer including an inferior copper sheet 822, wherein each of the inferior stainless steel plate 818, the inferior ultra-high-temperature ceramic (UHTC) plate 820, or the ultra-high temperature porcelain plate (UHTP), and the inferior copper sheet 822 are each dimensioned with an equal surface area having equal square footage.

The inferior stainless steel plate 818 is disposed having an exterior facing inferior stainless steel wall 818$^E$ and an interior facing inferior stainless steel wall 818$^I$ wherein the exterior facing inferior stainless steel wall 818$^E$ is disposed facing and parallel to a floor of an industrial work area where the rotary drum system for the formation of the gel infused pliant foam body 10 is being operated and housed.

The inferior stainless steel plate 818 provides an entire surface area of the metal gel basin bottom wall 111 of the metal gel basin 36 of the gel heating metal table 12 to provide support to the metal gel basin 36, and, also, to provide an electrical system with plug 811 to interface with an electrical power supply 824, as depicted in FIG. 14C, and to generate thermoconductive stability to the metal gel basin floor 37 of the metal gel basin 36 of the gel heating metal table 12 as the gel 40 incorporated in the gel bath 42 is being heated to 380° F. within the metal gel basin 36 of the gel heating metal table 12.

The interior facing inferior stainless steel wall 818 is contiguous with a lower facing wall 820$^I$ of the inferior ultra-high-temperature ceramic (UHTC) plate 820 wherein an upper facing wall 814$^L$ of the inferior ultra-high-temperature ceramic plate 820 is contiguous with a lower facing surface 816$^L$ of the inferior copper sheet 822.

An upper facing surface 816$^L$ of the inferior copper sheet 816 is contiguous with a bottom layer of the non-naturally occurring ion-intercalated MXene film 802 being layered therebetween the superior composite 804 and the inferior composite 806 of the multilayered composite core 800 of the metal gel basin 36. The superior copper sheet 816 a rigid support for the ion-intercalated MXene film 802 and provides a continuum of the flow and transfer of heat by thermoconduction from the inferior stainless steel plate 818 therethrough to the inferior ultra-high-temperature ceramic (UHTC) plate 820 therethrough the ion-intercalated MXene film 802 therethrough the superior copper sheet 816 therethrough the ultra-high-temperature porcelain (UHTP) plate 814 and therethrough to the superior stainless steel wall 812 which provides the metal gel basin floor 37 of the gel heating metal table 12. The heat is provided by the at least one planar heater 92 operationally electrically connected to the power supply 824.

The inferior ultra-high-temperature ceramic (UHTC) plate 814 and the superior ultra-high-temperature porcelain (UHTP) plate 814 provides thermoconductive characteristics. Ultra-high-temperature ceramics (UHTCs) or porcelains include thermoconductive characteristics include excellent stability at temperatures exceeding 2000° C. being investigated as possible thermal protection system (TPS) materials, coatings for materials subjected to high temperatures, and bulk materials for heating elements. Broadly speaking, UHTCs are borides, carbides, nitrides, and oxides of early transition metals. Current efforts have focused on heavy, early transition metal borides such as hafnium diboride (HfB2) and zirconium diboride (ZrB2); additional UHTCs under investigation for TPS applications include hafnium nitride (HfN), zirconium nitride (ZrN), titanium carbide (TiC), titanium nitride (TiN), thorium dioxide (ThO2), tantalum carbide (TaC)and their associated composites. Ultra-high-temperature ceramics (UHTCs) are a type of refractory ceramics that can withstand extremely high temperatures without degrading, often above 2,000° C.

They also often have high thermal conductivities and are highly resistant to thermal shock, meaning they can withstand sudden and extreme changes in temperature without cracking or breaking. Chemically, they are usually borides, carbides, nitrides, and oxides of early transition metals. UHTCs are used in various high-temperature applications, such as heat shields for spacecraft, furnace linings, hypersonic aircraft components and nuclear reactor components. They can be fabricated through various methods, including hot pressing, spark plasma sintering, and chemical vapor deposition.

As shown in FIG. 14C, in an exemplary embodiment of the present invention, the non-naturally occurring ion-intercalated MXene film 802 is a non-naturally occurring Cu-ion intercalated MXene film 826.

FIG. 14A is the structure of Cu-$Ti_3C_2T_x$ MXene generated with ab initio molecular dynamics (AIMD) of the Ti and Cu elements in Cu-intercalated $Ti_3C_2T_x$ of the prior art *Tuning MXene Properties through Cu Intercalation: Coupled Guest/Host Redox and Pseudocapacitance*, Shianlin Wee, et al. Mar. 21, 2024, ACS Publications).

In an exemplary embodiment of the present invention, the Cu-ion intercalated MXene film 826 is integrated into the multilayered composite core 800 of the metal gel basin bottom wall 111 of the metal gel basin 36. Cu-ion intercalated MXene composites with various contents of $Ti_3C_2T_x$ MXene nanosheets can be fabricated by hot pressing sintering.

The Cu-ion intercalated MXene film 826 configured with a plurality of stacked layers of Cu-ion intercalated MXene films 826 exhibit electronic properties while retaining its non-magnetic nature while the pristine MXene remains. Copper sheets have been shown to have an affinity for graphene, therefore, in an exemplary embodiment of the present, it is disclosed that the superior copper sheet 816 and the inferior copper sheet 822 into the multilayered composite core 800 wherein each of the superior copper sheet 816 and the inferior copper sheet 822 is contiguous with the non-naturally occurring ion-intercalated MXene film 802 to increase electromigration and the thermoconduction of heat from disseminated from the industrial heater device 92 of the metal gel basin 36 wherein the gel 40 advances to a predetermined volume of the 380° F. heated liquid gel $\mathbf{40}^{380}$. The heater device 92 has a 130,000 BTU capacity.

Metallic copper sheets are characterized with high electromigration and is used to construct integrated circuits. Metallic copper sheets are efficient current collectors due to its high electric conduction. Copper surfaces can be used as a substrate to grow graphene, and in an exemplary embodiment of the present invention, it is disclosed to integrate the superior copper sheet 816 and the inferior copper sheet 822 is contiguous with the non-naturally occurring ion-intercalated MXene film 802 into the multilayered composite core 800 of the metal gel basin bottom wall 111 of the metal gel basin 36 of the gel heating metal table 12 to support the non-naturally occurring ion-intercalated MXene film 802.

As shown in FIG. 14D, with reference to FIG. 14B, in another exemplary embodiment of the present invention, the non-naturally occurring ion-intercalated MXene film 802 is a configured with a plurality of stacked non-naturally occurring Aluminum (Al) ion intercalated MXene film 828. It is known in the art, the existence of electrically conductive aluminum (Al) ion-reinforced MXene films that are characterized with high conductivity and excellent mechanical strength by enhancing the interfacial adhesion among the adjacent MXene nanosheets with multivalent aluminum ions. (See, *Electrically conductive aluminum ion-reinforced MXene films for efficient electromagnetic interference shielding*, Zhangshuo Liu et al., Journal of Materials Chemistry C, Issue, 2020. Aluminum (A) ion intercalated MXene films were fabricated yielding highly conductive MXene-based films with remarkable shielding performance and excellent mechanical strength by enhancing the interfacial adhesion among the adjacent MXene nanosheets with multivalent aluminum ions. The tensile strength of the MXene film is significantly enhanced by 190% from 28.7 to 83.2 MPa with the introduction of aluminum ions and its conductivity is retained at 265-600 S $m^{-1}$, exhibiting superior comprehensive performances to the previously reported results with other reinforcements. The strong and highly conductive MXene film with a small thickness of 39 μm exhibits one of the highest EMI shielding performances of over 80 dB in the X-band. This work provides a simple and efficient strategy for designing and fabricating high-performance MXene-based materials for efficient shielding applications.

The tensile strength of the MXene film is significantly enhanced by 190% from 28.7 to 83.2 MPa with the introduction of aluminum ions and its conductivity is retained at 265-600 S $m^{-1}$, exhibiting superior comprehensive performances to the previously reported results with other reinforcements. The strong and highly conductive MXene film with a small thickness of 39 μm exhibits one of the highest EMI shielding performances of over 80 dB in the X-band. This work provides a simple and efficient strategy for designing and fabricating high-performance MXene-based materials for efficient EMI shielding applications.

As depicted in FIGS. 1A-1B, FIG. 1E, FIGS. 2A-2B, FIG. 6A, FIG. 7, FIG. 8A, FIG. 8C, FIG. 9, FIG. 10, and FIG. 13, the metal gel basin 36 is configured rigidly supported by the flat metal table peripheral rim 14 of the gel heating metal table 12 wherein the metal gel basin 36 includes a cavity 38 to contain a predetermined volume of gel 40 incorporated in a gel bath 42.

The gel 40 is selected from any one of a colloidal matter comprising any one of a gelatinous matter that is characterized to consist of two phases that are intertwined with one another having a solid particle network and a liquid solvent phase when treated with heat in the range of 360° F.-380° F. Silica gel beads and Silica gel crystals are provided through commercial manufacturers.

The plurality of pliant foam core bodies $\mathbf{52}^{1+N}$ can be manufactured with a material selected from anyone of the group comprising, foam, silicone, vinyl foam, rubber, polyethylene, polyethylene terephthalate, polyvinyl alcohol, polypropylene, polystyrene, polycarbonate, polyamide, and resins based on any combinations thereof.

The metal gel basin 36 is configured with a metal gel basin floor 37, as shown in FIG. 13, with reference to FIGS. 1A-1B, FIGS. 2A-2B, FIG. 6A, and FIG. 8A, is bound by four upright perimetric metal walls 44, 46, 48, 50, providing a peripheral top metal rim to the metal gel basin 36. The four upright perimetric metal walls include a front interior facing metal basin wall 44, a rear interior facing metal basin wall 46, and two interior lateral facing metal basin side walls 48, 50, a first interior facing lateral metal basin side wall 48 and a second interior lateral metal basin side wall 50 enclosing the gel 40 in the gel bath 42 wherein the cavity 38 is configured with a cavity opening dimensioned to receive a pliant foam core body 52 of the plurality of pliant foam core bodies $\mathbf{52}^{1+N}$ circumferentially mounted on the rotary drum 200.

In an exemplary embodiment of the present invention, the rotary drum 200 can further include a variety of size markers 201 indicated in circumferential colored lines circumscribed around the rotary drum 200, wherein the variety of size markers includes a King $201^K$, a Queen $201^Q$, a Double $201^D$, and a Twin $201^T$. In this manner the rotary drum 200 can receive a variety of sizes of foam core bodies ranging to equivalent sizes of a King mattress (80×76 inches); a Queen size mattress (80×60 inches); a Double size mattress (75×73 inches); and a Twin size mattress (75×38); and for pillows, cushions, stuffed toys, and a variety of support devices.

The metal gel basin floor 37 and the four upright perimetric metal walls 44, 46, 48, 50, walls of the metal gel basin 36 can be treated with a non-stick perfluorocarbon coating selected from any one of the non-stick perfluorocarbons comprising polytetrafluoroethylene (PTFE), polyvinylidene fluoride (PVDF), fluorinated ethylene propylene (FEP), perfluoroalkoxy alkane (PFA), and ethylene tetrafluoroethylene (ETFE) to prevent build up of the gel 40 on the four upright perimetric metal walls 44, 46, 48, 50, and the metal gel basin floor 37 of the metal gel basin 36, and advances the removal of remnant gel when cleaning the metal gel basin 36.

With reference to FIGS. 1A-1B, FIGS. 2A-2B, FIG. 6A, FIG. 7, FIG. 8A, FIG. 8C, FIGS. 9-11, illustrating the front perspective view of the rotary drum system for the formation of a get infused pliant foam body 10, the rear perspective view of the rotary drum system for the formation of a gel infused pliant foam body 10, and partial perspective views of the rotary drum system for the formation of a gel infused pliant foam body 10, respectively, the metal gel basin 36 of the gel heating metal table 12 includes a dual gel supply pipe system 66, including a gel supply well 68, a gel extruder system 70, a main gel supply pipe 72, a first tributary gel supply pipe 74, and a second tributary gel supply pipe 76, and a variable frequency drive pump 720 configured within the gel supply well 68 being actuated by an activating ON-OFF operating mode switch operationally electrically connected to an electrical power source 94 wherein the dual gel supply pipe system 66 provides a dual stream of gel $40^{1-2}$ being pumped into the metal gel basin 36 being propelled by the variable frequency drive pump 720.

The power source 94 supplies the electricity needed to operate the variable frequency drive pump 720. The power source 94 includes a cable to transmit electricity from the first power source to the variable frequency drive pump 720 and, thus, the electrical components of the On-Off operating mode switch of the variable frequency drive pump 720 to be powered. The first power source 94 includes an electrical system, and/or a capacitor, as well known in the art, with an outlet providing a high voltage of at least 300 Volts. In another embodiment, the first power source 94 provides a voltage of at least 800 Volts and/or at least 1000 Volts. The implementations of the rotary drum for the formation of a gel infused pliant foam body 10 includes the electrical power source 94 and electrical system configured with a plurality of fuses and a plurality of loads. The electrical power source 94 is electrically connected to each of the plurality of loads. The fuses are electrically connected to fuse actuators. A first fuse is connected to the electrical power source 94 and a first load wherein the first load is the rotary drum motor 516. A second fuse is connected to the electrical power source 94 and a second load wherein the second load is the rack and pinion motor 290. A third fuse is connected to the electrical power source 94 and a third load wherein the third load is the timer 750.

Fuses can include commercially available fuses which provide overcurrent protection for circuits from 200 through 6000 amperes. The fuses can be manufactured with 99.9% pure silver links, silver-plated copper end bells, glass-reinforced melamine bodies, O-ring seals between body and end bells, and granular quartz fillers.

With reference to FIGS. 1A-1B, FIG. 6A, and FIG. 7, a first gel supply pipe inlet port 78 is disposed at a central portion of the front facing flat metal wall 18 of the metal gel basin 36 configured compatible with the first tributary gel supply pipe 74 fluidly connected to the main gel supply pipe 72, fluidly connected to the gel supply well 68 fluidly connected to the main gel supply pipe 72 fluidly connected to the gel supply well 68 fluidly connected to the gel extruder system 70. The gel extruder system 70 is configured with an extruder heater and an extruder pump and gel supply well 68 to enable a first stream of gel $40^1$ to flow into the metal gel basin 36 therethrough the first gel supply pipe inlet port 78 of the metal gel basin 36 and a second gel supply pipe inlet port 80 is disposed at a central portion of the rear facing flat metal wall 20 of the metal gel basin 36 configured compatible with the second tributary gel supply pipe 76 fluidly connected to the main gel supply pipe 72 fluidly connected to the gel supply well 68 fluidly connected to the gel extruder system 70 to enable a second stream of gel $40^2$ to flow into the metal gel basin 36 therethrough the second gel supply pipe inlet port 80 disposed at the central portion of the rear facing flat metal wall 20 of the metal gel basin 36.

A first interior circumferential wall of the first gel supply pipe inlet port 78 and a second interior circumferential wall of the second gel supply pipe inlet port 80 and the first tributary gel supply pipe 74 and the second tributary gel supply pipe 76 is treated with a non-stick perfluorocarbon coating selected from any one of the non-stick perfluorocarbons comprising polytetrafluoroethylene (PTFE), polyvinylidene fluoride (PVDF), fluorinated ethylene propylene (FEP), perfluoro alkoxy alkane (PFA), and ethylene tetrafluoroethylene (ETFE) to prevent accumulation of gel 40 within the first tributary gel supply pipe 74 and the second tributary gel supply pipe 76, and, thereby, advance an uninterrupted delivery of the first stream of gel $40^1$ to flow into the metal gel basin 36 therethrough the first gel supply pipe inlet port 78 of the metal gel basin 36 and the second stream of gel to flow into the metal gel basin 36 therethrough the second gel supply pipe inlet port 80 disposed at the central portion of the rear facing flat metal wall 20 of the metal gel basin 36.

Figure 6A:
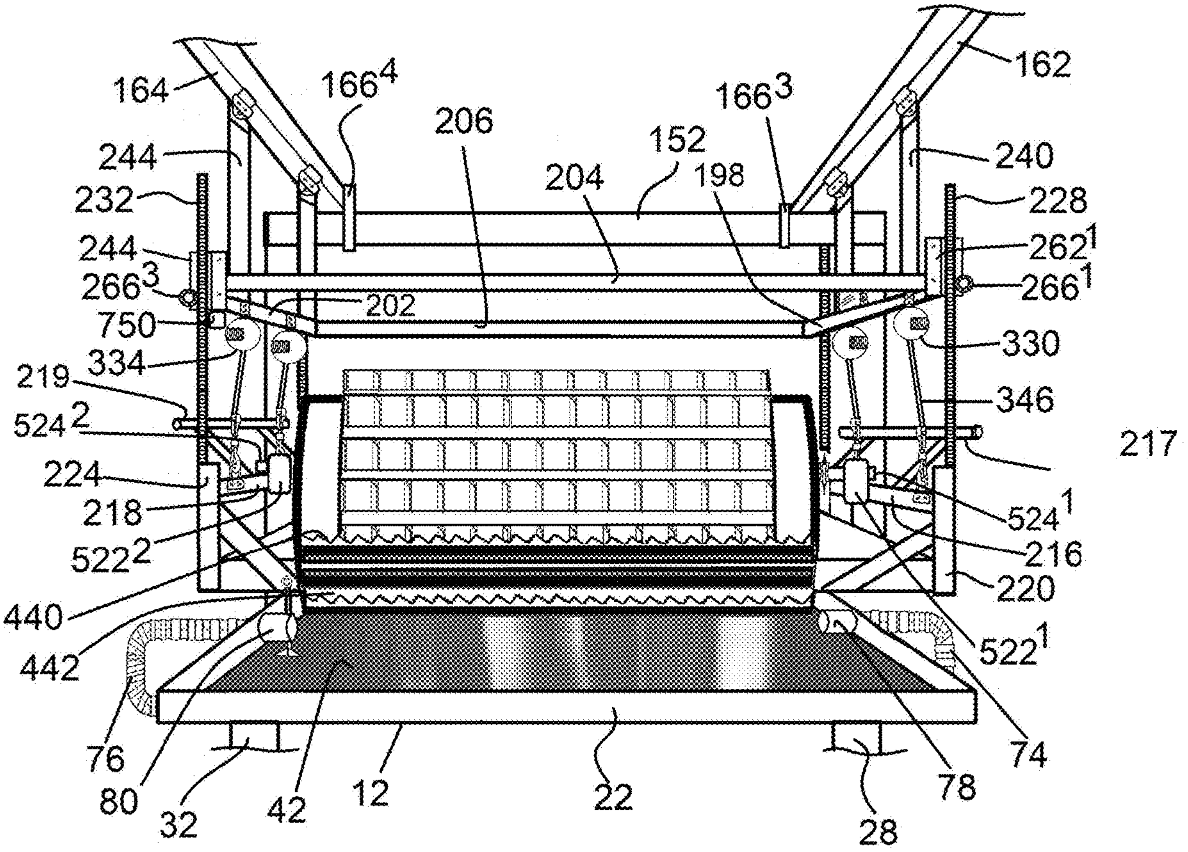
FIG. 6A is a first side perspective partial view of the rotary drum system for the formation of a gel infused pliant foam body showing the rotary drum and a gel bath contained within a metal gel basin, according to an embodiment of the present invention.

The first tributary gel supply pipe 74 and the second tributary gel supply pipe 76 facilitates simultaneous passing of the first stream of gel $40^1$ to flow from a front interior facing wall 82 to a rear interior facing wall 84 of the metal gel basin 36 and the second stream of gel $40^2$ to flow from the rear interior facing wall 84 to the front interior facing wall 82 of the metal gel basin 36 at a speed of flow to create a turbulence to mix the gel 40 withing the metal gel basin 36 and maintain a homeostasis of a 380° F. heated liquid gel $40^{380}$ streamed therein the metal gel basin 36 and to facilitate continuance of a predetermined volume of the 380° F. heated liquid gel $40^{380}$ indicated by a metal measurement plate 86 prostate perched on a metal stand a predetermined height from the metal gel basin floor 37, as depicted in FIG. 6A, and to replenish a reduced gel volume to the predetermined volume of the 380° F. heated liquid gel $40^{380}$.

As depicted in FIGS. 1A-1B, FIG. 1E, FIGS. 2A-2B, the control of a flow of the first stream of gel $40^1$ therethrough the first tributary gel supply pipe 74 is controlled by a first valve 88 operationally configured on the first tributary gel supply pipe 74. The control of a flow of the second stream of gel $40^2$ therethrough the second tributary gel supply pipe

76 is controlled by a second valve 90 operationally configured on the second tributary gel supply pipe 76 proximate to the main gel supply pipe 72.

The first tributary gel supply pipe 74 and the second tributary gel supply pipe 76 can be disposed at a centralized position above the metal gel basin 36 and, similarly, above the rear facing flat metal wall 20 of the metal gel basin 36 such that each of the dual streams of gel $40^{1-2}$ simultaneously and straightaway are turbulently introduced into the metal gel basin 36 of the gel heating metal table 12 fluidly connected to the main gel supply pipe 76 of the gel supply well 68 are heated by a planar heater device 92 of the metal gel basin 36 wherein the gel 40 advances to a predetermined volume of the 380° F. heated liquid gel $40^{380}$ wherein when the turbulent delivery and mixing of the gel sustains the 380° F. temperature of the 380° F. heated liquid gel $40^{380}$ of the gel bath 42. The planar heater device 92 and the extruder system are each operationally electrically connected to the electrical power supply 824. wherein the planar heater device 92 is operatively electrically connected to the planar heater device 92 wherein the planar heater device 92 can be powered by the electrical power supply 824 wherein the electrical power supply 824 is configured to carry high loads and includes fuses. The electrical power supply 824 can be a commercially available in an industrial size with output motor heater, auxiliary fan, trip limit, which is electrically operationally connected to the planar heating device and the extruder system 70. The electrical power supply 824 is configured with a 380-480V voltage range, heavy duty current at 623 Amps, heavy duty HP at 400 HP, and drives and fuses for the extruder system 70 and the temperature controller 98 operatively electrically connected to the planar heater device 92 within a range of 380° F.–400° F. thereby pre-heating the metal gel basin 36.

Interior walls of the gel supply well 68 can be treated with a non-stick perfluorocarbon coating selected from any one of a non-stick perfluorocarbons comprising polytetrafluoroethylene (PTFE), polyvinylidene fluoride (PVDF), fluorinated ethylene propylene (FEP), perfluoro alkoxy alkane (PFA), and ethylene tetrafluoroethytene (ETFE). Similarly, the metal gel basin floor 37, the front interior facing metal basin wall 44, the rear interior facing metal basin wall 46, and the first interior facing lateral metal basin side wall 48 and a second interior lateral metal basin side wall 50 of the can be treated with the non-stick perfluorocarbons comprising polytetrafluoroethylene (PTFE), polyvinylidene fluoride (PVDF), fluorinated ethylene propylene (FEP), perfluoro alkoxy alkane (PFA), and ethylene tetrafluoroethylene (ETFE).

The treatment of the interior walls of the gel supply well 68, together with the treatment of the metal gel basin floor 37, the front interior facing metal basin wall 44, the rear interior facing metal basin wall 46 of the metal gel basin 36, and the first interior facing lateral metal basin side wall 48 and a second interior lateral metal basin side wall 50 of the metal gel basin 36 is beneficial where the non-stick perfluorocarbons comprising polytetrafluoroethylene (PTFE), polyvinylidene fluoride (PVDF), fluorinated ethylene propylene (FEP), perfluoro alkoxy alkane (PFA), and ethylene tetrafluoroethylene (ETFE) prevents clogging of the gel 40 within the gel supply well 68 and the metal gel basin 36 promoting the advancement of the gel 40 flow freely therethrough the first tributary gel supply pipe 74 and maneuvering the second valve 90 of the second tributary gel supply pipe 76 and into the metal gel basin 36.

FIGS. 1A-1B, and FIG. 1E, FIGS. 2A-2B, depicts the rotary drum system for the formation of a gel infused pliant foam body 10 includes the planar heater device 92 including two electrodes being electrically conductive are each operationally electrically connected to the electrical power supply 824. The planar heater device 92 includes a temperature controller actuator $36^{A}$ having an on-temperature mode and an off-temperature mode which, also, allows a user to increase and decrease the temperature to a range from 0° to $500^{0}$ of the gel 40 contained within the gel bath 42 within the metal gel basin 36.

The electrical conduit 96 is insulated in a non-electric conductive ultrahigh molecular weight polyethylene tube, as depicted in FIG. 13, wherein the planar heater device 92 is mounted externally to an exterior surface of the flat metal table bottom 16 of the gel heating metal table 12 by which a controlled temperature is generated to enable by way of thermal conduction of the metal gel basin bottom wall 111 of the metal gel basin 36 of the gel heating metal table 12 which is configured with a multilayered composite core 800 including the superior composite 804 and an inferior composite 806 configured with the non-naturally occurring ion-intercalated MXene film 802 layered therebetween the superior composite 804 and the inferior composite 806 of the multilayered composite core 800 of the metal gel basin 36.

In operation of the rotary drum system for the formation of a gel infused pliant foam body 10, the metal gel basin 36 of the gel heating metal table 12 is heated by way of the planar heater device 92 enabling the gel 40 to be heated within a range including 380° F.-400° F. to provide the heated liquid gel $40^{380}$ required in coating the one or more pliant foam core bodies in the formation of a heated gel infused pliant foam core body $52^{GI}$ implementing the gel infused pliant foam body method 1000 including process Steps 1001-1056.

Upon completion of the operation of the rotary drum system for the formation of a gel infused pliant foam body 10 implementing the method 1000 including the process steps 1001-1056 in the formation of the heated gel infused pliant foam core body $52^{GI}$ and the gel infused pliant foam core body $52^{GFB}$ the planar heater device 92 is manipulated to 0° by way of it temperature controller actuator $36^{A}$ to cool a volume of remnant heated liquid down to a cooler temperature, namely, ambient temperature.

FIG. 13, with reference to FIGS. 1A-1B, FIG. 1E, FIGS. 2A-2B, depicts the gel heating metal table cover 100 for the metal gel basin 36 of the gel heating metal table 12. The gel heating metal table cover 100 is manufactured with a steel plate welding table top cover configured with a at least six solid 10-gauge cover panels layered with a top steel wall 102, a bottom steel wall 104, a front steel wall 106, a rear steel wall 108, a first steel side wall 107, and a second steel side wall 109. The first steel side wall 107 includes two peripheral metal wheels 110, 112, as depicted in FIG. 13, a first front peripheral metal wheel 110 and a first rear peripheral metal wheel 112 wherein the first front peripheral metal wheel 110 and the first rear peripheral metal wheel 112 are each configured with a first wheel depth and first wheel width capable of being rollably inserted therein the first roller track 26 of the gel heating metal table 12, and the second steel side wall 108 includes two peripheral metal wheels 114, 116 including a second front peripheral metal wheel 114 and a second rear peripheral metal wheel 116 wherein the second front peripheral metal wheel 114 is configured with a second wheel depth and a second wheel width capable of being rollably inserted therein the second roller track 27 of the gel heating metal table 12 such that the gel heating metal table cover 100 can be rolled-on in a forward motion to cover the metal gel basin 36 of the gel heating metal table 12 wherein when the gel heating metal table 12 is not in use and can be rolled-off in a reverse direction to uncover the metal gel basin 36 wherein when the metal gel basin 36 of the gel heating metal table 12 is in use. The gel heating metal table cover 100 includes a removeable weighted rubber mat 118 to safeguard a user against touching a heated surface of the gel heating metal table 12.

The gel heating metal table 12 and the metal gel basin 36 is manufactured with any one of the metals selected from the group comprising, stainless steel, aluminum, copper, iron, cast iron, or any combination thereof.

Figure 5A:
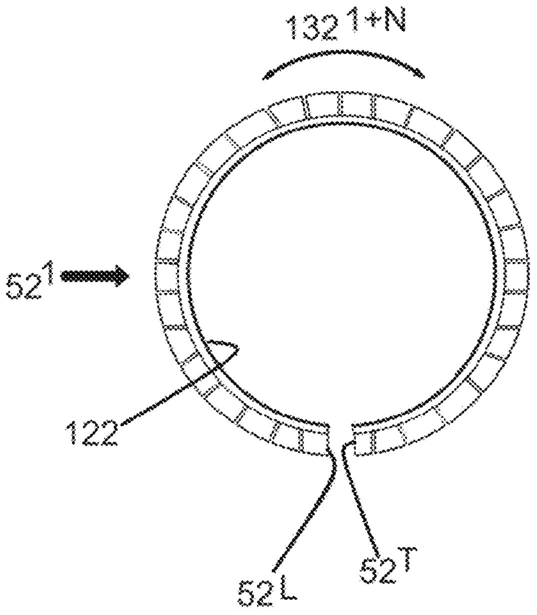
FIG. 5A is a side perspective view of a pliant foam core body of the rotary drum system for the formation of a gel infused pliant foam body, according to an embodiment of the present invention.
Figure 5B:
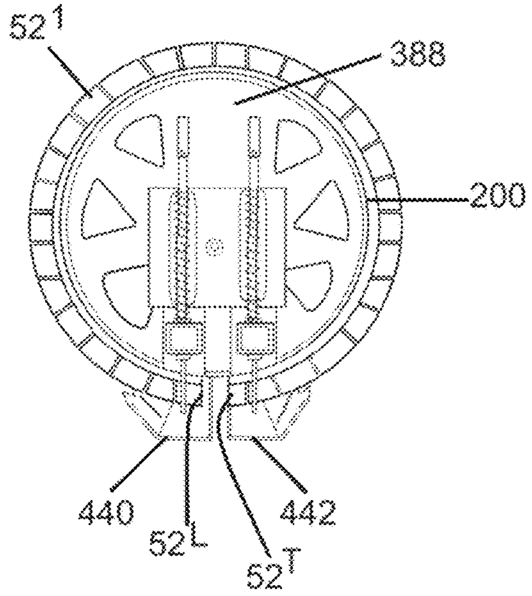
FIG. 5B is a side perspective view of the pliant foam core body of FIG. 5A mounted on the rotary drum of the rotary drum system for the formation of a gel infused pliant foam body, according to an embodiment of the present invention.
Figure 8A:
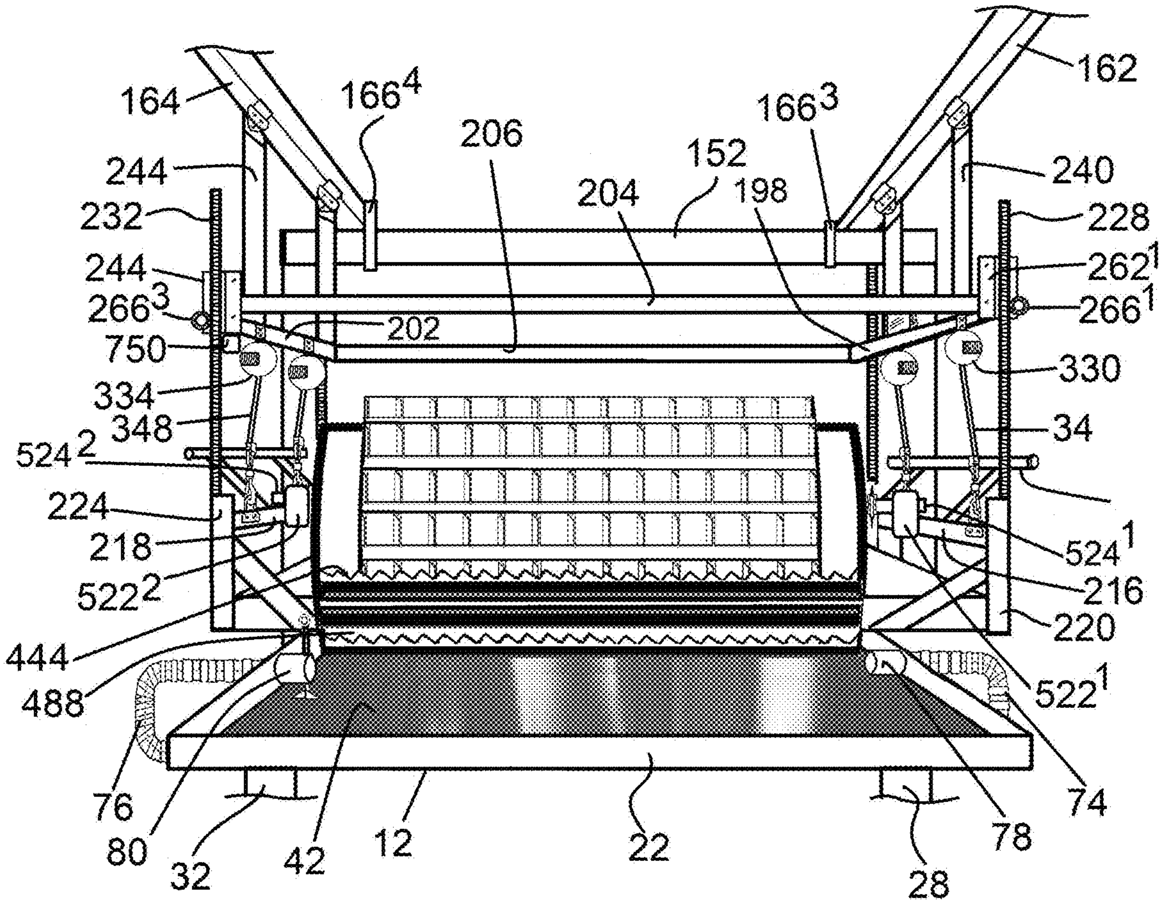
FIG. 8A is a first side perspective partial view of the rotary drum system for the formation of a gel infused pliant foam body of FIG. 6A showing the pliant foam core body of FIG. 5A-5B mounted circumferentially on the rotary drum, according to an embodiment of the present invention.
Figure 8B:
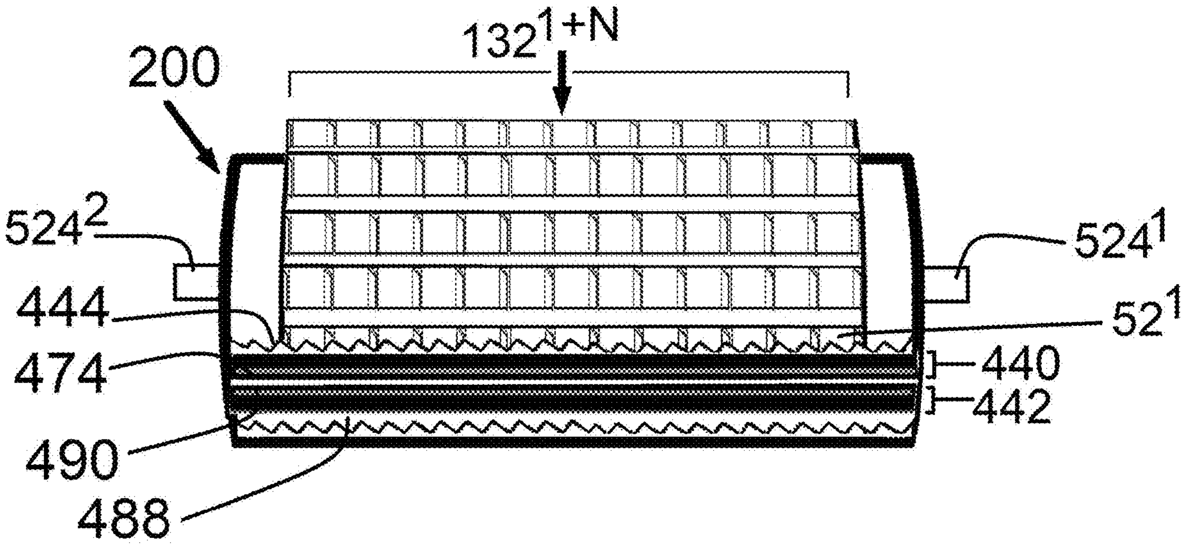
FIG. 8B is a first side perspective view of the rotary drum with the pliant foam core body of FIG. 8A mounted circumferentially on the rotary drum, according to an embodiment of the present invention.
Figure 8C:
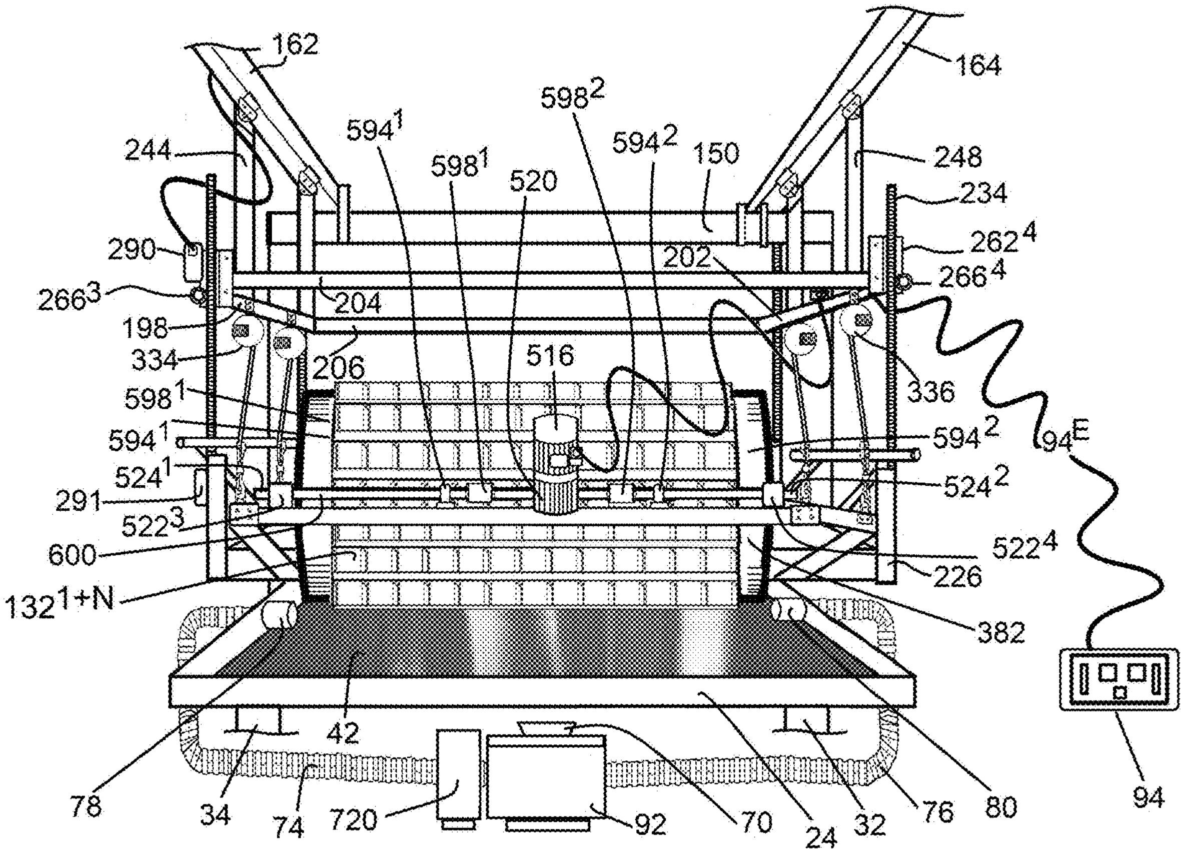
FIG. 8C is a second side perspective view of the rotary drum system for the formation of a gel infused pliant foam body showing the pliant foam core body of FIG. 5A-5B mounted circumferentially on the rotary drum, according to an embodiment of the present invention.

FIGS. 5A-5B, and FIGS. 8A-8C depict the pliant foam core body 52 implemented in the operation of the rotary drum system for the formation of a gel infused pliant foam body 10. In particular, FIG. 5A depicts a side perspective view of the pliant foam core body 51 prior to being mounted on the rotary drum 200. FIG. 5B depicts a side perspective view of the pliant foam core body 52 mounted on the rotary drum 200 where the rotary drum 200 is shown in a side perspective view depicting the first planar circular side wall 388 of the rotary drum 200. FIG. 8A depicts the pliant foam core body 52 mounted on the rotary drum 200 where FIG. 8A is first side perspective partial view of the rotary drum system for the formation of a gel infused pliant foam body 10 showing the pliant foam core body 52 mounted circumferentially on the rotary drum 200. FIG. 8B depicts the pliant foam core body 52 mounted on the rotary drum 200 where the rotary drum is shown from a first side perspective view. FIG. 8C depicts the pliant foam core body 52 mounted on the rotary drum 200 depicted in a partial perspective second side view of the rotary drum system for the formation of the gel infused pliant foam body 10.

The pliant foam core body 52 includes a leading end $\mathbf{52}^{L}$ and a trailing end $\mathbf{52}^{T}$ pliant foam core body 52 as shown in FIGS. 5A-5B and FIG. 8B. The pliant foam core body 52 is capable of circuitous bending into a circumferential shape having a pliant foam core body 52 thickness, a pliant foam core body length, and a pliant foam core body width, a pliant foam core body square footage, a top pliant foam core body portion 120 and a bottom pliant foam core body portion 122. The top pliant foam core body portion 120 and the bottom pliant foam core body portion of the 122 of the pliant foam core body 52 is porous and joined by two lateral porous side walls 124, 126 a first lateral porous side wall 124 and an opposing second lateral porous side wall 126 and two longitudinal porous side walls 128, 130 a front longitudinal porous side wall 128, and a rear longitudinal porous side wall 130. The top pliant foam core body portion 120 includes a first square footage and the bottom pliant foam core body portion 122 includes a second square footage wherein the second square footage is equal to the first square footage of the top pliant foam core portion 120 of the pliant foam core body 52.

The plurality of pliant foam core bodies $\mathbf{52}^{1+N}$ can be manufactured from a material selected from anyone of the group comprising, pliant foam, silicone, vinyl pliant foam, rubber, polyethylene, polyethylene terephthalate, polyvinyl alcohol, polypropylene, polystyrene, polycarbonate, polyamide, and resins and any combinations thereof.

Each of the pliant foam core body 52 of the plurality of pliant foam core bodies $\mathbf{52}^{1+N}$ a series of a plurality of extended cubes $\mathbf{132}^{1+N}$ are configured within the top pliant core body portion 120 of the pliant foam core body 52. Each of the plurality of extended cubes $\mathbf{132}^{1+N}$ of the series of the plurality of extended cubes 1321N are configured equally sized and symmetrically disposed an equal distance from each other aligned in a plurality of rows and a plurality of columns interconnected by a plurality recessed channels $\mathbf{134}^{1+n}$ bordered by an adjourned peripheral rim 136. Each of the plurality of extended cubes $\mathbf{132}^{1+N}$ is configured with an exterior cube surface, a cube thickness which is less than the thickness of the pliant foam core body 52. The bottom pliant foam core body portion 122 includes a thickness less than the cube thickness.

Figure 1D:
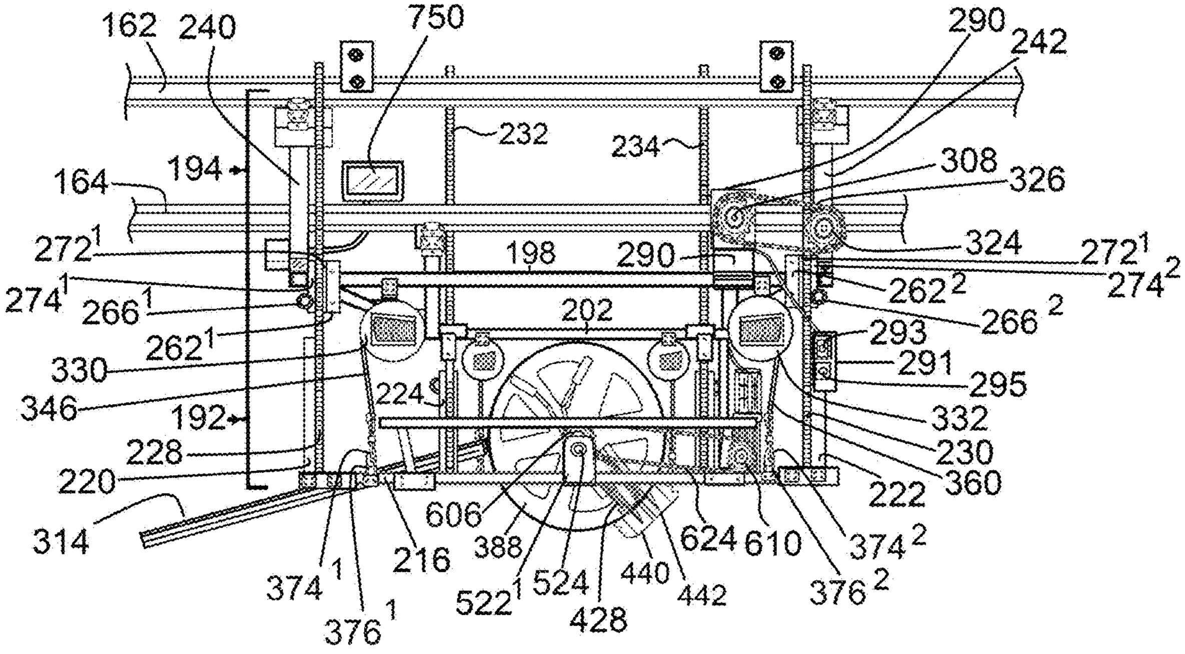
FIG. 1D is a partial perspective view of the rotary drum system for the formation of a gel infused pliant foam body of FIG. 1A and FIG. 1B, according to an embodiment of the present invention.
Figure 1E:
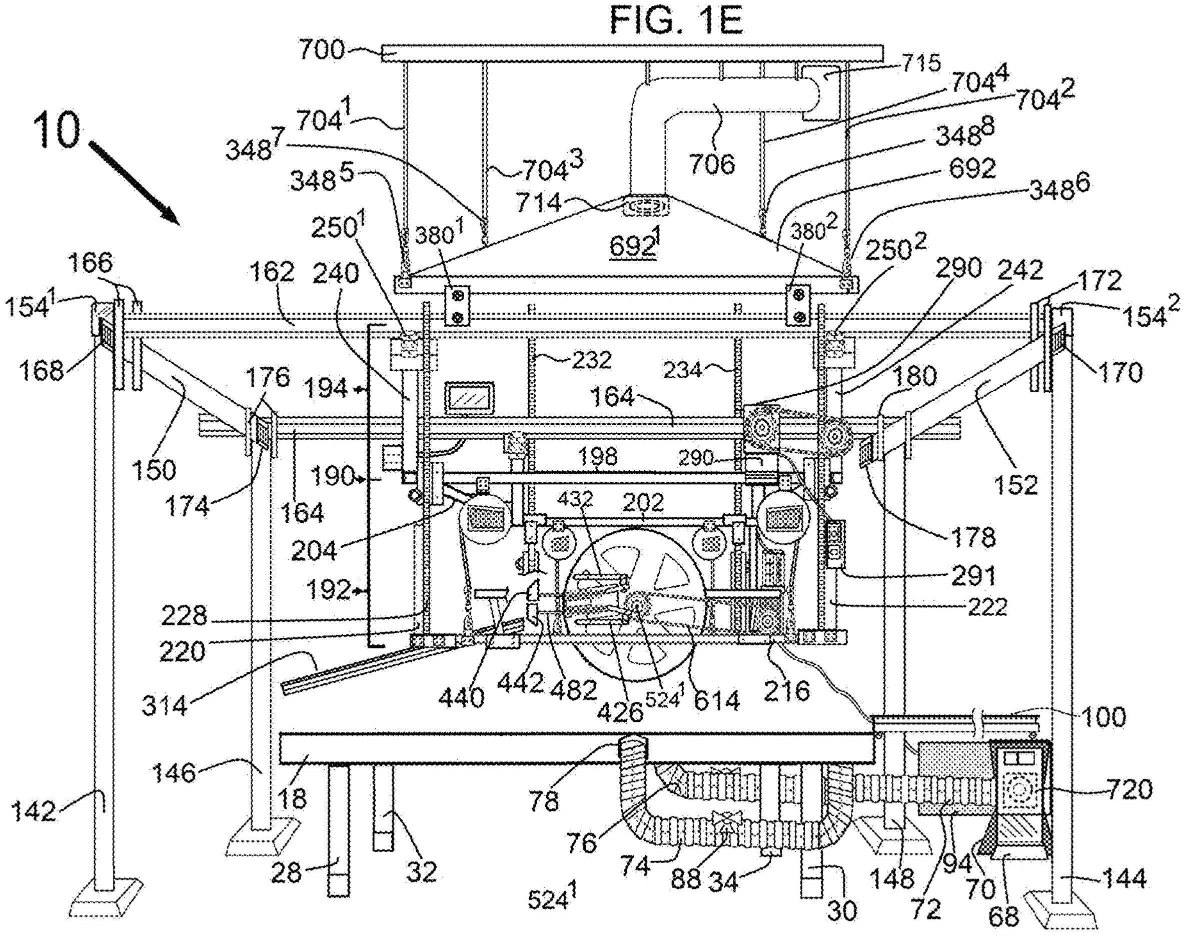
FIG. 1E is a front perspective view of the rotary drum system for the formation of a gel infused pliant foam body, according to an embodiment of the present invention.
Figure 2C:
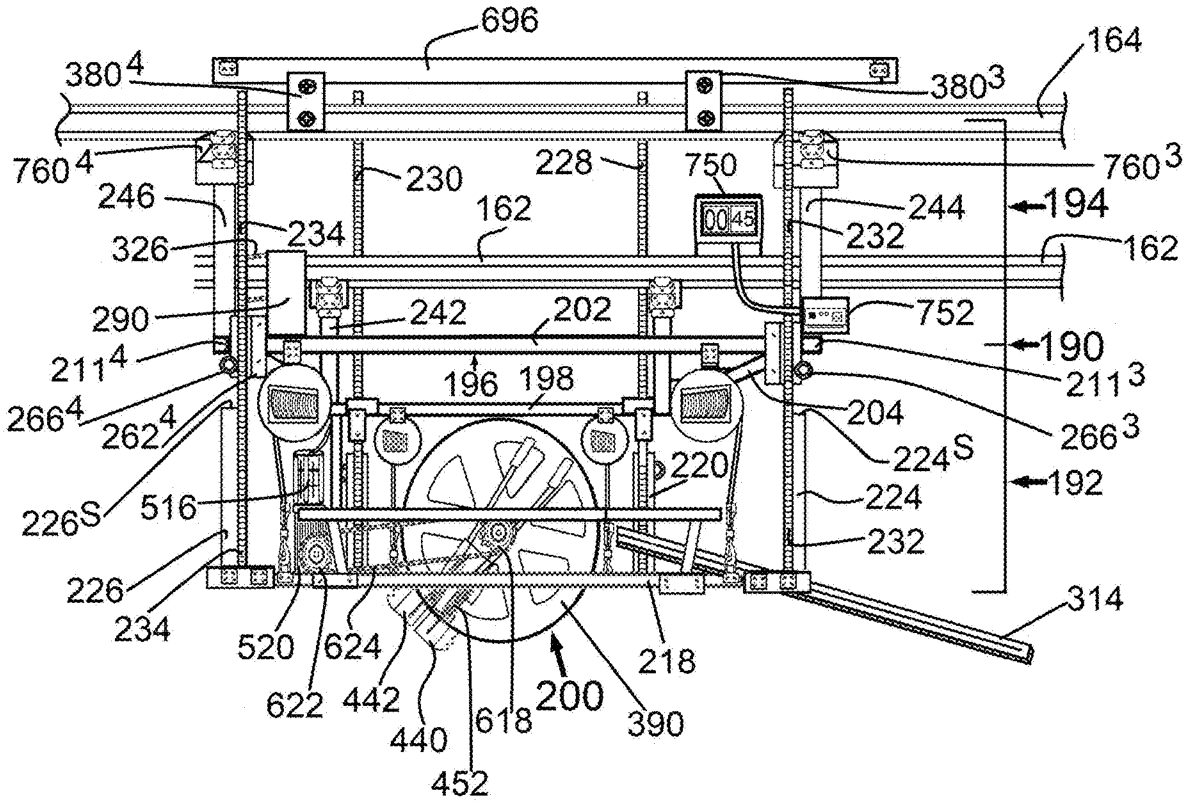
FIG. 2C is a partial perspective view of the rotary drum system for the formation of a gel infused pliant foam body of FIG. 2A, according to an embodiment of the present invention.
Figure 2D:
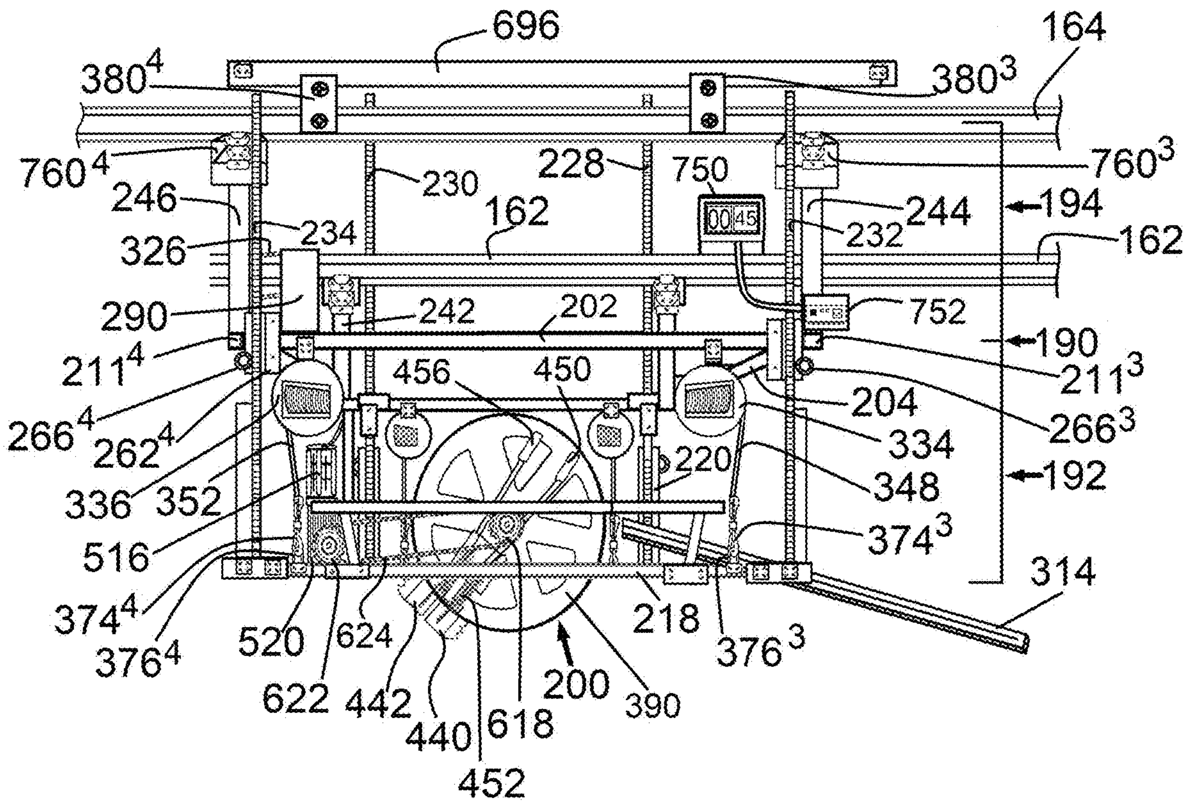
FIG. 2D is a partial perspective view of the rotary drum system for the formation of a gel infused pliant foam body of FIG. 2A, according to an embodiment of the present invention.

FIGS. 1A-1B, FIG. 1E, and FIGS. 2A-2B depict the overhead double-beam bridge crane 140 as implemented in rotary drum system for the formation of a gel infused pliant foam body 10. FIGS. 1A-1B depicts the front perspective view of the overhead double-beam bridge crane 140 as implemented in the pliant foam body gel infusion system 10 and FIGS. 2A-2B depicts the rear perspective view of the overhead double-beam bridge crane 140 as implemented in the rotary drum system for the formation of a gel infused pliant foam body 10. FIGS. 1C-1D, depicts a partial perspective front view of the overhead double-beam bridge crane 140 and FIGS. 2B-2C depicts a partial perspective front view of the overhead double-beam bridge crane 140 and FIG. 2D depicts a partial perspective rear view of the overhead double-beam bridge crane 140.

Looking to FIGS. FIGS. 1A-1B, FIG. 1E, and FIGS. 2A-2D, the overhead double-beam bridge crane 140, is configured including four upright metal box columns 142, 144, 146, 148, a first upright metal box column 142, a second upright metal box column 144, a third upright metal box column 146, a fourth upright metal box column 148, a first metal link beam 150, and a second metal link beam 152.

A front end $\mathbf{150}^{F}$ of the first metal link beam 150 is fixedly attached to a top end $\mathbf{142}^{T}$ of the first upright metal box column 142 byway of a first bolted column end cap plate $\mathbf{154}^{1}$ and a rear end $\mathbf{150}^{R}$ of the first metal link beam 150 is fixedly attached to a top end $\mathbf{146}^{T}$ of the third upright metal box column 146 by way of a second bolted column end cap plate $\mathbf{154}^{2}$.

A front end $\mathbf{152}^{F}$ of the second metal link beam 152 is fixedly attached to a top end $\mathbf{144}^{T}$ of the second upright metal box column 144 byway of a third bolted column end cap plate $\mathbf{154}^{3}$ and a rear end $\mathbf{152}^{R}$ of the second metal link beam 152 is fixedly attached to a top end $\mathbf{148}^{T}$ of the fourth upright metal box column 148 byway of a fourth bolted column end cap plate $\mathbf{154}^{4}$ The overhead double beam bridge crane 140 is configured with two I-beam bridges a front I-beam bridge 162 and a rear I-beam bridge 164 positioned a predetermined distance apart and parallel to each other fixedly attached oriented oligomeric to the first metal link beam 150 and the second metal link beam 152.

A first end $\mathbf{162}^{1}$ of the front I-beam bridge 162 is fixedly attached by way of a first bolted I-beam end plate $\mathbf{166}^{1}$ to a first end stop 168 disposed at the front end $\mathbf{150}^{F}$ of the first metal link beam 150 and an opposing second end $\mathbf{162}^{2}$ of the front I-beam bridge 162 is fixedly attached to a second end stop 170 disposed at the front end $\mathbf{152}^{F}$ of the second metal link beam 152 by way of a second bolted I-beam end plate $\mathbf{166}^{2}$.

A first end $\mathbf{164}^{1}$ of the rear I-beam bridge 164 is fixedly attached to a third end stop 174 disposed at a rear end $\mathbf{150}^{R}$ of the first metal link beam 150 by way of a third bolted I-beam end plate $\mathbf{166}^{3}$ and an opposing second end $\mathbf{164}^{2}$ of the rear I-beam bridge 164 is fixedly connected to a fourth end stop 178 disposed at the rear end $\mathbf{152}^{R}$ of the second metal link beam 152 by way of a fourth bolted I-beam end plate $\mathbf{166}^{4}$ whereby a unified major framed open space is circumscribed to abide the rotary drum 200.

Referring to FIGS. 1A-1E, FIGS. 2A-2D, the rotary drum anchorage conveyor frame 190 is configured integrated therein the unified major framed open space of the overhead double beam bridge 162 to support the rotary drum 200. The rotary drum anchorage conveyor frame 190 comprises a lower conveyor frame 192 and an upper conveyor frame 194 fixedly joined coplanar to each other configured having a rectangular shaped structure being disposed in a transverse plane. Whereby, a unified minor framed open space is circumscribed within the unified major framed open space wherein a unified duple framed open space is formed to abide for the rotary drum 200. The lower conveyor frame 192 of the rotary drum anchorage conveyor frame 190 and the upper conveyor frame 194 of the rotary drum anchorage conveyor frame 190 includes a conjunct frame 196.

The conjunct frame 196 includes a front joist 198 and a rear joist 202 being horizontally oriented a parallel distance from each other, a first lateral side joist 204, an opposing second lateral side joist 206 being perpendicularly oriented relative to the front joist 198 and the rear joist 202, respectively.

The front joist 198 and the rear joist 202 are each fixedly attached to the first lateral side joist 204 and the opposing second lateral side joist 206 by way of four 90° cast aluminum channel joiner fitting connectors $\mathbf{208}^{1\text{-}4}$, a first 90° cast aluminum channel joiner fitting connector $\mathbf{208}^{1}$, a second 90° cast aluminum channel joiner fitting connector $\mathbf{208}^{2}$, a third 90° cast aluminum channel joiner fitting connector $\mathbf{208}^{3}$, a fourth 90° cast aluminum channel joiner fitting connector $\mathbf{208}^{4}$ whereby four cast aluminum corners $\mathbf{211}^{1\text{-}4}$, a first cast aluminum corner $\mathbf{211}^{1}$, a second cast aluminum corner $\mathbf{211}^{2}$, a third cast aluminum corner $\mathbf{211}^{3}$, and a fourth cast aluminum corner $\mathbf{211}^{4}$ of the conjunct frame 196 are formed.

The lower conveyor frame 192 includes a front cross bar 216, a rear cross bar 218, wherein the front cross bar 216 and the rear cross bar 218 being horizontally oriented a distance apart from each other such that the front cross bar 216 is a first vertical distance plumb to the front joist 198 of the conjunct frame 196 and the rear cross bar 218 is a second vertical distance plumb to the rear joist of the conjunct frame 196. The lower conveyor frame 192, also, is configured with four lower support posts vertically oriented 220, 222, 224, 226, a first lower support post 220, a second lower support post 222, a third lower support post 224, and a fourth lower support post 226. The lower conveyor frame 192 includes four auxiliary frames including four lifting masts 228, 230, 232, 234, vertically oriented, a first lifting mast 228, a second lifting mast 230, a third lifting mast 232, a fourth lifting mast 234.

Referring to FIGS. FIGS. 1A-1E, FIGS. 2A-2D, the front cross bar 216 and the rear cross bar 218 provide structural support for two rigid handles, a first rigid handle 217 and a second rigid handle 219, respectively. As depicted in FIGS. 1A=1D, the first rigid handle 217 includes a first upper handle bar 221 having a first side rail $\mathbf{221}^{1}$ and a second side rail $\mathbf{221}^{2}$ allowing the first upper handle 221 to extend in an obtuse angle from the front cross bar 216 wherein the first side rail $\mathbf{221}^{1}$ and the second side rail $\mathbf{221}^{2}$ is rigidly affixed to the first the front cross bar 216 by welding. Similarly, as illustrated in FIGS. 2A-2D, the rear cross bar 218 includes a second upper handle bar 223 having a first side rail $\mathbf{223}^{1}$ and a second side rail $\mathbf{223}^{2}$ allowing the second upper handle bar 223 to extend in an obtuse angle from the rear cross bar 218 wherein the first side rail $\mathbf{223}^{1}$ and the second side rail $\mathbf{223}^{2}$ is rigidly affixed to the rear cross bar 218 by welding.

Returning to FIGS. FIGS. 1A-1E, FIGS. 2A-2D, the first lower support post 220 of the lower conveyor frame 192 is fixed vertically aligned to the first overhead metal post 240, wherein the first lower support post 220 includes a superior end $\mathbf{220}^{5}$ and an inferior end $\mathbf{220}^{1}$. The inferior end $\mathbf{220}^{1}$ of the first lower support post 220 is fixedly bolted immediate to a first end $\mathbf{216}^{1}$ of the front cross bar 216 of the lower conveyor frame 192 by way of a first iron face plate $\mathbf{236}^{1}$. The superior end $\mathbf{220}^{s}$ of the first lower support post 220 is a first unfixed end with at least one foot of freedom relative to the first overhead metal post 240 of the upper conveyor frames 194 allowing the lower conveyor frame 192 to be lifted and lowered relative to the upper conveyor frame 194 by way of the rack and pinion gear system $\mathbf{260}^{1+N}$ thereby enabling the rotary drum 200 to be lifted and lowered into the gel bath 42 contained therein the metal gel basin 36 of the gel heating meta table 12.

The second lower support post 222 of the lower conveyor frame 192 is fixed congruent to the second overhead metal post 242, wherein the second lower support post 222 includes a superior end $\mathbf{222}^{s}$ and an inferior end $\mathbf{222}^{I}$. The inferior end $\mathbf{222}^{I}$ of the second lower support post 222 is fixedly bolted immediate to the second end of the front cross bar 216 of the lower conveyor frame by way of a second iron face plate $\mathbf{236}^{2}$. The superior end $\mathbf{222}^{s}$ of the second lower support post 222 is a second unfixed end with at least one foot of freedom relative to the second overhead metal post 242 of the upper conveyor frame 192 allowing the lower conveyor frame 192 to be lifted and lowered relative to the upper conveyor frame 194 by way of the second rack and pinion gear system $\mathbf{260}^{2}$ synchronously with the first rack and pinion gear system $\mathbf{260}^{1}$ thereby enabling the rotary drum 200 to be lifted and lowered into the gel bath 42 contained therein the metal gel basin 36 of the gel heating metal table 12.

The third lower support post 224 of the lower conveyor frame 192 is fixed congruent to the third overhead metal post 244, wherein the third lower support post 224 includes a superior end $\mathbf{224}^{s}$ and an inferior end $\mathbf{224}^{I}$. The inferior end $\mathbf{224}^{I}$ of the third lower support post 224 is fixedly bolted to a first end $\mathbf{218}^{1}$ of the rear cross bar 218 of the lower conveyor frame byway of a third iron face plate $\mathbf{236}^{3}$. The superior end $\mathbf{224}^{s}$ of the third lower support post 224 is a third unfixed end with at least one foot of freedom relative to the third overhead metal post 244 of the upper conveyor frame 194 allowing the lower conveyor frame 192 to be lifted and lowered relative to the upper conveyor frame 194 by way of the third rack and pinion gear system $\mathbf{260}^{3}$ synchronously with the first rack and pinion gear system $\mathbf{260}^{1}$ and the second rack and pinion gear system $\mathbf{260}^{2}$ thereby enabling the rotary drum 200 to be lifted and lowered into the gel bath 42 contained therein the metal gel basin 36 of the gel heating metal table 12.

The fourth lower support post 226 of the lower conveyor frame 192 is fixed congruent to the fourth overhead metal post 246 of the upper conveyor frame 194, where the fourth lower support post 226 includes a superior end $\mathbf{226}^{s}$ and an inferior end $\mathbf{226}^{I}$. The inferior end $\mathbf{226}^{I}$ of the fourth lower support post 226 is fixedly bolted immediate to a second end $\mathbf{218}^{2}$ of the rear cross bar 218 of the lower conveyor frame 192 by way of a fourth iron face plate $\mathbf{236}^{4}$. The superior end 2266 of the fourth lower support post 226 is an unfixed end with at least one foot of freedom relative to the fourth overhead metal post 246 of the upper conveyor frame 194 allowing the lower conveyor frame 192 to be lifted and lowered relative to the upper conveyor frame 194 by way of the fourth rack and pinion gear system $\mathbf{260}^{4}$ synchronously with the first rack and pinion gear system 260$^{1}$, the second rack and pinion gear system 260$^{2}$, and the third rack and pinion gear system 260$^{3}$ hereby enabling the rotary drum 200 to be lifted and lowered into the gel bath 42 contained therein the metal gel basin 36 of the gel heating metal table 12.

The upper conveyor frame 194 includes the four overhead metal posts 240, 242, 244, 246 which are vertically oriented, including the first overhead metal post 240, the second overhead metal post 242, the third overhead metal post 244, the fourth overhead metal post 246. The first overhead metal post 240, of the upper conveyor frame 194 includes a distal end 240$^{D}$ and a proximal end 240$^{P}$ wherein the distal end 240$^{D}$ of the first overhead metal post 240 is fixedly bolted to a first corresponding portion of the front I-beam bridge 162 by way of a first plain push trolly 250$^{1}$ having a first set of two cast iron wheels being rivet locked by way of welding a first pair of mounting button rivets 760$^{1}$ to each side of the first plain push trolly 250$^{1}$ prevent movement of the first plain push trolley 250$^{1}$ along the front I-beam bridge 162. The proximal end 240$^{P}$ of the first overhead metal post 240 is fixedly bolted to a first end 198$^{1}$ of the front joist 198 of the conjunct frame 196 by way of a first steel to steel strong tie 252$^{1}$ or steel to steel yield link.

The second overhead metal post 242 of the upper conveyor frame 194 is positioned coaxial to the second lower support post 222 of the lower conveyor frame 192, wherein a distal end 242$^{D}$ of the second overhead metal post 242 is fixedly bolted to a second corresponding portion of the front I-beam bridge 162 by way of a second plain push trolley 250$^{2}$ having a second set of two cast iron wheels being rivet locked by way of welding a second pair of mounting button rivets 760$^{2}$ on each side of the second plain push trolley 250$^{2}$ to prevent movement of the second plain push trolley 250$^{2}$ along the front I-beam bridge 162 and a proximal end 242$^{P}$ of the second overhead metal post 242 is fixedly bolted to a second end 198$^{2}$ of the front joist 198 of the conjunct frame 196 by way of a second steel to steel strong tie 252$^{2}$ or a second steel to steel yield link.

The third overhead metal post 244 is positioned coaxial to the third lower support post 222 of the lower conveyor frame 192 wherein a distal end 244$^{D}$ of the third overhead metal post 244 is fixedly bolted to a first corresponding portion of the rear I-beam bridge 164 by way of a third plain push trolley 250$^{3}$ having a third set of two cast iron wheels being rivet locked by way of welding a third pair of mounting button rivets 760$^{3}$ on each side of the third plain push trolley 250$^{3}$ to prevent movement of the third plain push trolley 250$^{3}$ along the rear I-beam bridge 164 and a proximal end 244$^{P}$ of the third overhead metal post 244 is fixedly bolted to a first end 202$^{1}$ of the rear joist 202 conjunct frame 196 by way of a third steel to steel strong tie 252$^{3}$ or a third steel to steel yield link.

The fourth overhead metal post 246 is positioned coaxial to the fourth lower support post 226 of the lower conveyor frame 192, wherein a distal end 246$^{D}$ of the fourth overhead metal post 246 is fixedly bolted to a second corresponding portion of the rear I-beam bridge 164 byway of a fourth plain push trolley 250$^{4}$ having a fourth set of two cast iron wheels being rivet locked byway of welding a fourth pair of mounting button rivets 760$^{4}$ on each side of the fourth plain push trolley 250$^{2}$ to prevent movement of the fourth plain push trolley 256 along the rear I-beam bridge 164 and a proximal end 246$^{P}$ of the fourth overhead metal post 246 is fixedly bolted to a second end 202$^{2}$ of the rear joist 202 of the conjunct frame 196 byway of a fourth steel to steel strong tie 252$^{3}$ or a fourth steel to steel yield link.

FIGS. 1A-1E, FIGS. 2A-2D shows each of the four lifting masts 228, 230, 232, 234, of the lower conveyor frame 190, the first lifting mast 228, the second lifting mast 230, the third lifting mast 232, the fourth lifting mast 234 is vertically oriented aligned adjacent to each of the four corresponding four lower support posts 220, 222, 224, 226. The first lifting mast 228 is integrated with a first rack and pinion gear system 260$^{1}$, the second lifting mast 230 is integrated with a second rack and pinion gear system 260$^{2}$, the third lifting mast 232 is integrated with a third rack and pinion gear system 260$^{3}$, and the fourth lifting mast 234 is integrated with a fourth rack and pinion gear system 260$^{4}$.

Each of the rack and pinion gear systems 260$^{1-4}$ includes a lift carriage 262$^{1-4}$, a gear rack 264$^{1-4}$ mechanically operative with a mateable pinion 266$^{1-4}$, mechanically operatively connected to a first lateral pinion axle 268 and a second lateral pinion axle 270. Each of the lift carriages 262$^{1-4}$ includes the gear rack 264$^{1-4}$ which is vertically telescopically oriented therein a first linear guide 272$^{1+N}$, a second linear guide 274$^{1+N}$, of each of the lift carriage 214$^{1-4}$ to engage with a plurality of gear rack teeth 214$^{1-4}$ configured within each of the gear racks 264$^{1-4}$ of each the lift carriages 262$^{1-4}$.

Each of the gear rack 264$^{1-4}$ has an upward end 264$^{1-4}$ and a downward end 264$^{D1-4}$. Each of the mateable pinions 266$^{1-4}$ is configured having a plurality of pinion teeth 212$^{1-4}$ circumferentially aligned around a pinion crown 280$^{1-4}$ to enable an operable rotatable mesh between each of a corresponding plurality of gear rack teeth 214$^{1-4}$ of each of the gear racks 264$^{1-4}$ of each of the first rack and pinion gear system 260$^{1}$, the second rack and pinion gear system 260$^{2}$, the third rack and pinion gear system 260$^{3}$, the fourth rack and pinion gear system 260$^{4}$ wherein each of the mateable pinions 266$^{1-4}$ include a pinion borehole 282$^{1-4}$ transversely configured therethrough each of the pinon crowns 280$^{1-4}$.

The first lateral pinion axle 268 is positioned a first vertical plumb distance below and parallel to the first lateral side joist 204 of the conjunct frame 196 of the rotary drum anchorage conveyor frame 190 and the second lateral pinion axle 270 is positioned a second vertical plumb distance below and parallel to the opposing second lateral side joist 206 of the conjunct frame 196 of the rotary drum anchorage conveyor frame 190 wherein the second vertical plumb distance is equal to the first vertical plumb distance.

A first end 268$^{1}$ of the first lateral pinion axle 268 is rotationally coupled to a first pinion borehole 284 of a first mateable pinion 266$^{1}$ of a first gear rack 264$^{1}$ of the first rack and pinion gear system 260$^{1}$ integrated with the first lower support post 220 and a second end of the first lateral pinion axle 268 is rotationally coupled to a third pinion borehole 288 of a third gear rack 264$^{3}$ of the third rack and pinion gear system 260$^{3}$ integrated with the third lower support post 224, and a first end 270$^{1}$ of the second lateral pinion axle 270 is rotationally coupled to a second pinion borehole 286 of a second mateable pinion 266$^{2}$ of a second gear rack 264$^{2}$ of the second rack and pinion gear system 260$^{2}$ integrated with the second lower support post 222 and a second end of the second lateral pinion axle 270 is rotationally coupled to a fourth pinion borehole of a fourth mateable pinion 266$^{4}$ of a fourth gear rack 264$^{4}$ of the fourth rack and pinion gear system integrated with the fourth lower support post 226 such that as the rotary drum 200 is lowered and lifted the first lateral pinion axle 268 and the second lateral pinion axle 270 synchronously causes the first mateable pinion 266$^{1}$ and the third mateable pinion 266$^{3}$, the second mateable pinion 266$^{2}$ and the fourth mateable pinion 266$^{4}$ to rotate in unison enabling the operable rotatable mesh between each of a first plurality of pinion teeth 212$^1$ of a first mateable pinion 266$^1$ and a first plurality of gear rack teeth 214$^{1-4}$ of the first gear rack 264$^1$ of the first rack and pinion gear system 260$^1$, a second plurality of pinion teeth 212$^2$ of a second mateable pinion 266$^2$ and a second plurality of gear rack teeth 214$^2$ of the second gear rack 264$^2$ of the second rack and pinion gear system 260$^2$, a third plurality of pinion teeth 212$^3$ of a third mateable pinion 266$^3$ and a third plurality of gear rack teeth 214$^3$ of a third gear rack 264$^3$ of the third rack and pinion gear system 260$^3$, a fourth plurality of pinion teeth 212$^4$ of a fourth mateable pinion 266$^4$ and a fourth plurality of gear rack teeth 214$^4$ of a fourth gear rack 264$^4$ of the fourth rack and pinion gear system 260$^4$, in a vertical direction from each of the four gear racks 264$^{1-4}$ downward ends to their upward ends or from each of the four gear racks 264$^{1-4}$ upward ends 264$^{U1-4}$ to their downward ends 264$^{D1-4}$.

Referring to FIG. 1C-1D, together with FIGS. 1A-1B, the rack and pinion motor 290 in operation is implemented to lower the rotary drum 200 in a downward vertical direction towards the metal gel basin 36 of the gel heating metal table 12 and to lift the rotary drum 200 in a reverse upward vertical direction away from the metal gel basin 36 wherein the rack and pinion motor 290 is controlled by a dual direction rack and pinion actuator 291 having a down-control knob 293 to cause movement in a downward vertical direction to lower the rotary drum 200 into the gel bath metal gel basin 36 and an up-control knob 295 to control a reverse movement of an upward vertical direction to lift the rotary drum 200 in a position away from the metal gel basin 36.

The rack and pinion motor 290 includes a rack and pinion motor body 292 permanently affixed on a rack and pinion motor support body 294 by way of welding wherein the rack and pinion motor support body 294 includes a rack and pinion motor central support aperture 296 wherein the rack and pinion motor support body 294 is permanently affixed to the front joist 198 of the conjunct frame 196 of the rotary drum anchorage conveyor frame 190 proximate to the opposing second lateral side joist 206 of the conjunct frame 196 operationally connected to the second mateable pinion 266$^2$ of the second gear rack 264$^2$ of the second rack and pinion gear system 260$^2$ positioned adjacent to the second lower support post 222.

The rack and pinion motor 290 includes a rack and pinion electrical gear box 298 operably electrically wired via a rack and pinion cable electrical cable 99 to the electrical power source 94 concurrently operably electrically wired to a rack and pinion motor drive 300 integrally connected to a first rack and pinion output shaft 302 which is coaxial to a first rack and pinion axle 304 wherein a terminal end 304$^T$ of the first rack and pinion axle 304 provides a first rack and pinion sprocket mount 306 whereon a first rack and pinion sprocket 308 is mounted thereon.

A fifth trunnion 522$^5$ permanently bolted to the second overhead metal post 242 proximate to the rack and pinion motor 290 is configured with a second rack and pinion output shaft 312 which is coaxial to a second rack and pinion axle 320 wherein a terminal end of the second rack and pinion axle 320 provides a second rack and pinion sprocket mount 322 whereon a second rack and pinion sprocket 324 is mounted thereon wherewith a rack and pinion drive chain 326 is operationally mechanically rotationally engages the first rack and pinion sprocket 308 and the second rack and pinion sprocket 324 wherein the first rack and pinion sprocket 308 is guarded by a first rack and pinion actuating cylinder disc 326 and the second rack and pinion sprocket 324 is guarded by a second rack and pinion actuating cylinder disc 328. The fifth trunnion 522$^5$ includes the trunnion locking mechanism comprising including a screw locking lever 210$^{1+N}$.

As illustrated in FIGS. 1A-1E, FIGS. 2A-2D, four spring balancers 330, 332, 334, 336, to maintain a stable position of the rotary drum 200 wherein each of the four spring balancers 330, 332, 334, 336, is configured with a fixed drum 338, 340, 342, 344, having an immobilized rotation, wherein each of the four spring balancers includes a rigid steel wire rope 346, 348, 350, 352, having a pre-set distance of 1.5 meters, and a prone pull weight of 15-25 kg capacity range such that the rotary drum 200 can be balanced in a posited plane parallel in relation to the metal gel basin 36 of the gel heating metal table 12 to prevent distortion of each of an infused gel layer on each of the pliant foam core body 52 of the plurality of pliant foam core bodies 52$^{1+N}$.

A first spring balancer 330 includes a first end 330$^1$ and a second end 330$^2$ wherein the first end 330$^1$ includes a first hook connector 376$^1$ of a plurality of hook connectors 376$^{1+N}$ which is rigidly attached byway of a first bolted flanged metal face plate 356$^1$ to a first corner 198$^1$ of the front joist 198 of the conjunct frame 196 of the rotary drum anchorage conveyor frame 190 and the second end 30$^2$ of the first spring balancer 330 includes a first rigid steel wire rope 346 having a first carabiner snap clip 374$^1$ of a plurality of carabiner snap clips 374$^{1+N}$ which is rigidly coupled to a first stainless steel square plate eye hook 350$^{1+N}$ fixedly attached to a corresponding first corner 216$^{1C}$ of the front cross bar 216 of the rotary drum anchorage conveyor frame 190.

A second spring balancer 332 includes a first end 332$^1$ and a second end 332$^2$ wherein the first end 332$^1$ includes a second hook connector 376$^2$ which is rigidly attached by way of a second bolted flanged metal face plate 356$^2$ to a second corner 198$^2$ of the front joist 198 of the conjunct frame 196 of the rotary drum anchorage conveyor frame 190 and the second end of the second spring balancer 332 includes a second rigid steel wire rope 360 having a second carabiner snap clip 374$^2$ which is rigidly coupled to a second stainless steel square plate eye hook 350$^2$ fixedly attached to a corresponding second corner 216$^{2C}$ of the front cross bar 216 of the rotary drum anchorage conveyor frame 190.

A third spring balancer 366 includes a first end 366$^1$ and a second end 366$^2$ wherein the first end 366$^1$ includes a third hook connector 376$^3$ which is rigidly attached byway of a third bolted flanged metal face plate 356$^3$ to a first corner 202$^1$ of the rear joist 202 of the conjunct frame 196 of the rotary drum anchorage conveyor frame 190 and the second end 366$^2$ of the third spring balancer 366 includes a third rigid steel wire rope 350 having a third carabiner snap clip 374$^3$ which is fixedly coupled to a third stainless steel square plate eye hook 350$^3$ fixedly attached to a corresponding first corner 218$^{1c}$ of the rear cross bar 218 of the rotary drum anchorage conveyor frame 190.

A fourth spring balancer 368 includes a first end 368$^1$ and a second end 368$^2$ wherein the first end 368$^1$ includes a fourth hook connector 376$^4$ which is rigidly attached by way of a fourth bolted flanged metal face plate 356$^4$ to a second corner of the rear joist 202 of the conjunct frame 196 of the rotary drum anchorage conveyor frame 190 and the second end 368$^2$ of the third spring balancer 368 includes a fourth rigid steel wire rope 352 having a fourth carabiner snap clip 374$^4$ which is rigidly coupled to a fourth stainless steel square plate eye hook 354$^4$ fixedly attached to a corresponding second corner 218$^{2C}$ of the rear cross bar 218 of the rotary drum anchorage conveyor frame 190.

Figure 7:
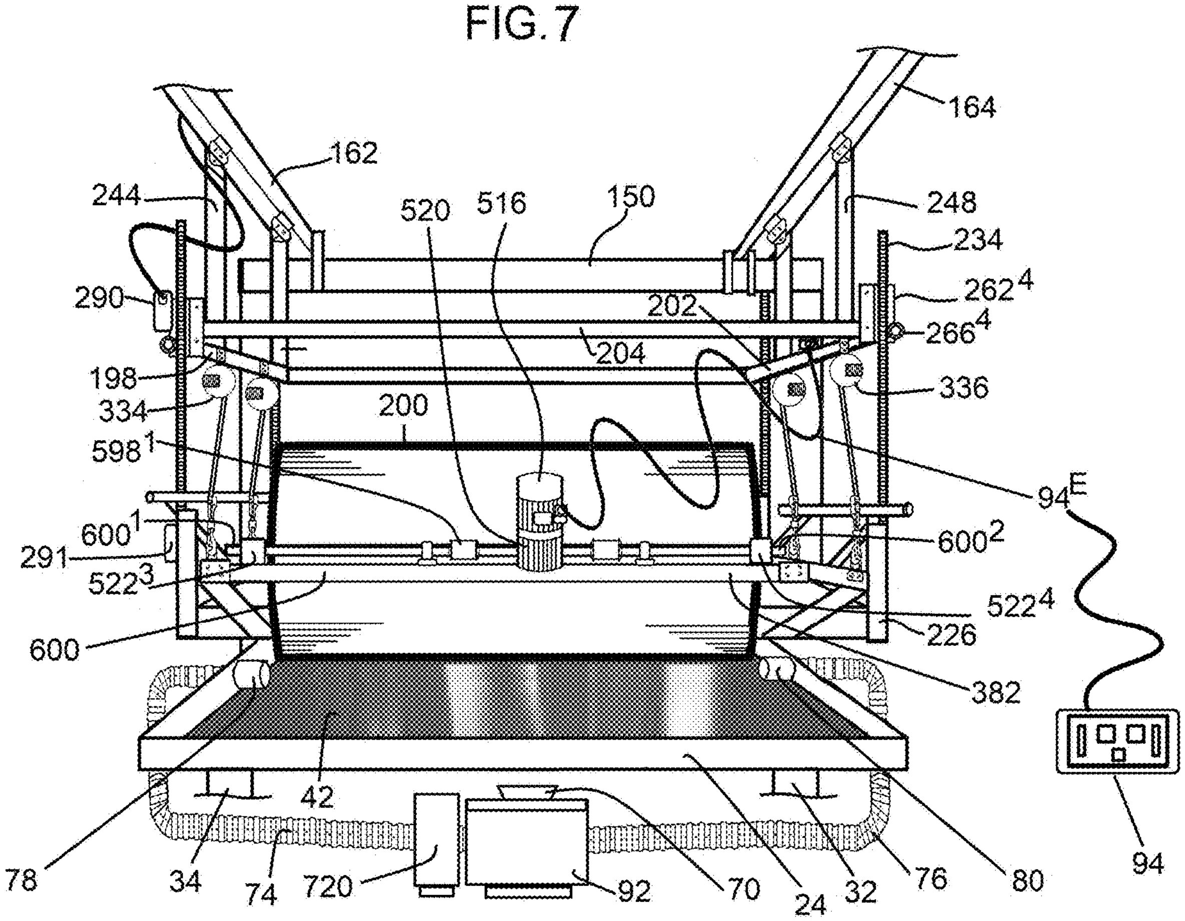
FIG. 7 is a second side perspective partial view of the rotary drum system for the formation of a gel infused pliant foam body showing the rotary drum, the gel bath contained within the metal gel basin, a rotary drum motor, a second rotary drum cylindrical drum axle supported on a lateral axle support beam, according to an embodiment of the present invention.
Figure 10:
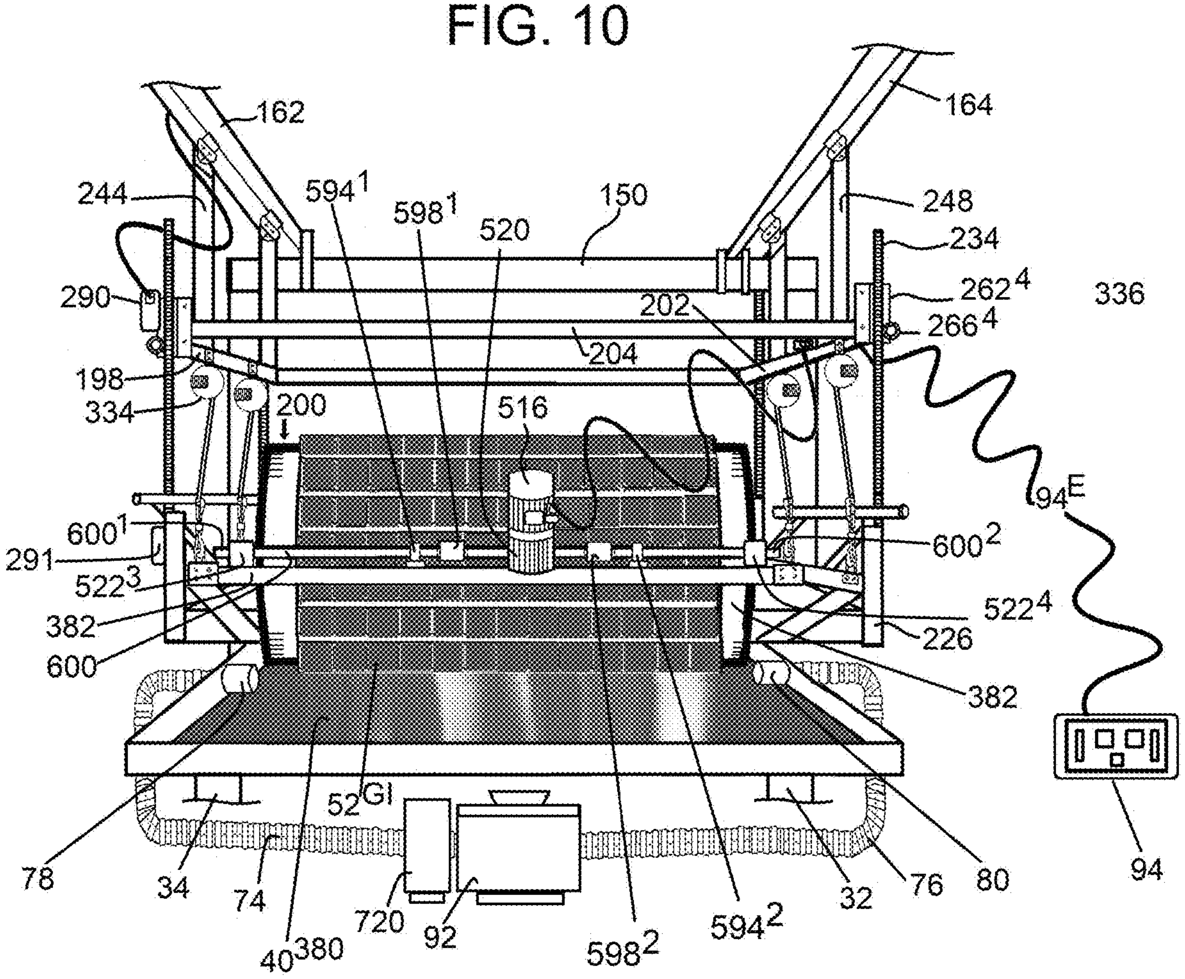
FIG. 10 is a second side perspective partial view of the rotary drum system for the formation of a gel infused pliant foam body showing the gel infused pliant foam core body of FIG. 9, according to an embodiment of the present invention.

Turning to FIGS. 7, 8C, and FIG. 10, a lateral axle support beam 382 manufactured with steel having a longitudinal length, a front end $382^F$ and a rear end $382^R$, the front end $382^E$ of the lateral axle support beam 382 is permanently bolted at the second end $216^2$ of the front cross bar 216 of the rotary drum anchorage conveyor frame 190 byway of a first 90° steel beam clamp $384^1$ and the rear end $382^R$ of the lateral axle support beam 382 is permanently bolted to the second end $218^2$ of the rear cross bar 218 of the rotary drum anchorage frame 190 by way of a second 90° steel beam clamp $384^2$.

Figure 6B:
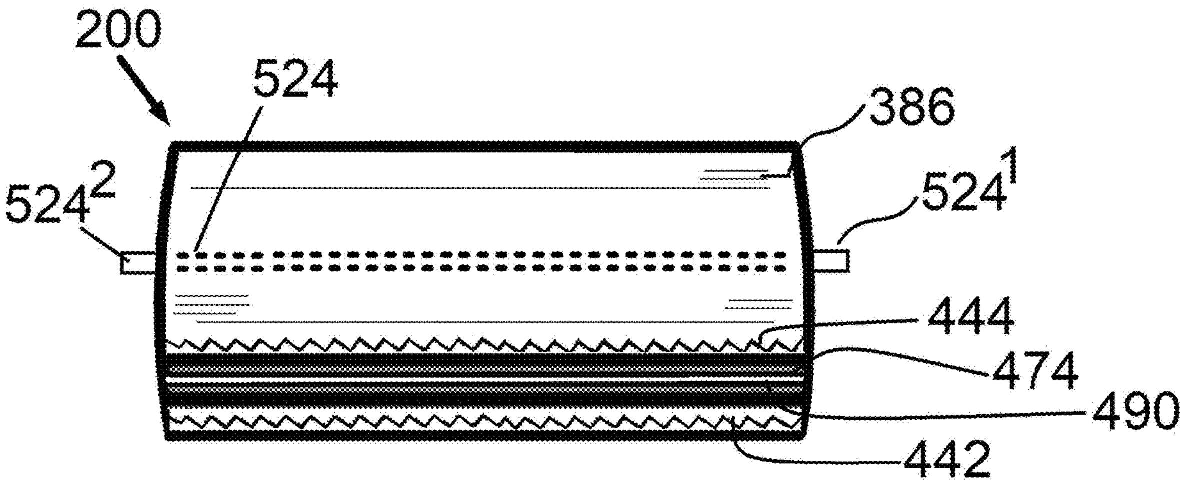
FIG. 6B is a perspective view of the rotary drum of the rotary drum system for the formation of a gel infused pliant foam body of FIG. 6A showing a first rotary drum cylindrical drive axle extended therethrough the rotary drum, according to an embodiment of the present invention.

As particularly depicted in FIGS. 6A, 7, 8A and 8C, the rotary drum 200 is moveably aligned vertically above the metal gel basin 36. FIG. 6A is a first side perspective view of the rotary drum 200 aligned above the metal gel basin 36 wherein the metal gel basin includes the gel bath 42 contained therein. FIG. 6B depicts a first side perspective view of the rotary drum 200 standing alone in reference to FIG. 6A. FIG. 8A is a first side perspective of the rotary drum 200 wherein the pliant foam core body 52 being selected to be processed in the operation of the rotary drum system for the formation of a gel infused pliant foam body 10 is mounted thereon the rotary drum 200 wherein the rotary drum 200 is positioned lifted above the gel bath 42 within the metal gel basin 36. FIG. 8B depicts the rotary drum 200 as shown standing alone, with reference to FIG. 8A, illustrating the pliant foam core body 52 mounted thereon with reference to FIG. 8A. FIG. 7 is a second side perspective view of the rotary drum 200 disposed above the gel bath 42 contained within the metal gel basin 36 showing the rotary drum motor 516 mounted on the lateral axle support beam 382, all of which is discussed in more detail, below.

Figures 3A, 3B:
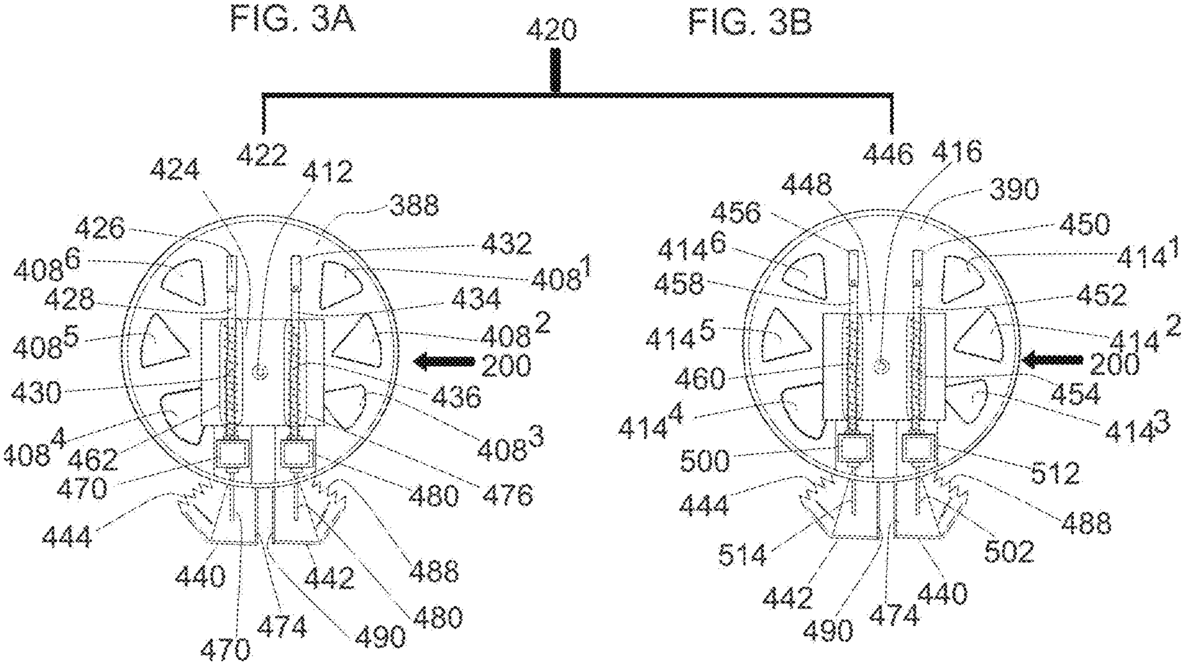
FIG. 3A is a planar view of a first planar circular side wall of a rotary drum of the rotary drum system for the formation of a gel infused pliant foam body, according to an embodiment of the present invention.
FIG. 3B is planar view of a second planar circular side wall of the rotary drum of the rotary drum system for the formation of a gel infused pliant foam body, according to an embodiment of the present invention.
Figure 4:
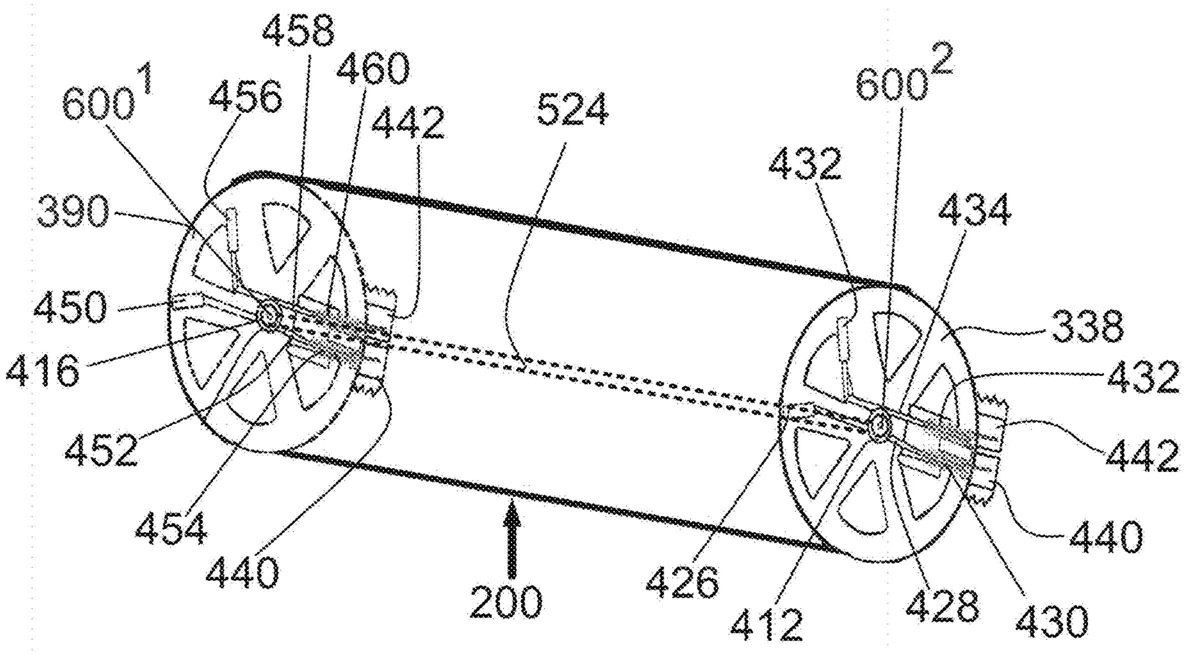
FIG. 4 is a side perspective view of the rotary drum of the rotary drum system for the formation of a gel infused pliant foam body, according to an embodiment of the present invention.

FIGS. 3A-3B, FIG. 4, FIG. 5B, FIGS. 6A-6B, FIG. 7, illustrate aspects of the rotary drum 200 of the rotary drum system for the formation of a gel infused pliant foam body 10. The rotary drum 200 includes a circumferential metal drum casing 386, as shown in FIG. 6B, along a longitudinal axis. The rotary drum 200 includes a first planar circular side wall 388 and a second planar circular side wall 390 at opposed longitudinal ends, as depicted in FIGS. 3A-3B, and FIG. 4, a first longitudinal end 392 and a second longitudinal end 394, separated by a first longitudinal length $L^1$. The circumferential metal drum casing 386 of the rotary drum 200 defines an interior hollow cylindrical volume wherein the rotary drum 200 includes a longitudinal cut-out 396, as shown in FIG. 6B, spanning a second longitudinal length from the first planar circular side wall 388 to the second planar circular side wall 390 wherein the second longitudinal length $L^2$ of the longitudinal cut-out 396 is measured being less than the first longitudinal length $L^1$ of the circumferential metal drum casing 386 of the rotary drum 200.

The longitudinal cut-out 396 includes a top rim 398, a bottom rim 400, integrally configured with a first marginal side wall 402, and a second marginal side 404 wall wherein the first marginal side wall 402 is proximate to the first planar circular side wall 388 of the circumferential metal drum casing 386 of the rotary drum 200 and the second marginal side wall 404 is proximate to the second planar circular side wall 390 of the circumferential metal drum casing 386 of the rotary drum 200.

FIG. 3A is a planar view of a first planar circular side wall 388 of a rotary drum 200 of the rotary drum system for the formation of a gel infused pliant foam body 10, and FIG. 3B is a planar view of a second planar circular side wall 390 of the rotary drum 200 of the rotary drum system for the formation of a gel infused pliant foam body 10. FIG. 4 depicts a perspective side view of the rotary drum 200 showing the first planar circular side wall 388 planar view of a first planar circular side wall 388 and the second planar circular side wall 390 disposed at each of the first longitudinal end 392 and a second longitudinal end 394 of the longitudinal length of the rotary drum 200.

Looking to FIGS. 3A-3B and FIG. 4, with reference to FIGS. 1A-1E, FIGS. 2A-2D, and FIG. 5B, the first planar circular side wall 388 of the rotary drum 200 includes a first recessed rotary drum frame 406 including a first set of six triangular cut-outs $408^{1+n}$ disposed about a first central annular ring 412 and wherein the second planar circular side wall 390 includes a second recessed rotary drum frame 410 including a second set of six triangular cut-outs $414^{1+N}$ disposed around a second central annular ring 416 wherein the first set of six triangular cut-outs $408^{1+N}$ and the second set of six triangular cut-outs 414 provide circulation of ambient air to prevent overheating of the interior hollow cylindrical volume of the rotary drum 200.

Referring to FIGS. 3A-3B, and FIG. 4, with reference to FIGS. 1A-1E, FIGS. 2A-2D, and FIG. 5B, the dual gripping effector 420 comprises a first gripping effector 422 and a second gripping effector 446. The first gripping effector 422 comprises a first master rigid plate 424; a first handle 426 operationally connected to a first all-thread 428 encased in a first compression spring 430; a second handle 432 operationally connected to a second all-thread 434 encased in a second compression spring 436; a first gripping jaw 440 and a second gripping jaw 442.

The second gripping effector 446 comprises a second master rigid plate 448; a third handle 450 operationally connected to a third all-thread 452 encased in a third compression spring 454; a fourth handle 456 operationally connected to a fourth all-thread 458 encased in a fourth compression spring 460; the first gripping jaw 440; and the second gripping jaw 442.

The first master rigid plate 424 is permanently bolted to a central portion of the first planar circular side wall 388 of the circumferential metal drum casing 386 of the rotary drum 200 wherein the first master rigid plate 424 is configured having a rectangular shape including a top edge, a bottom edge, a first side edge and a second side edge wherein the first master rigid plate 424 rigidly supports the first all-thread 428 and the second all-thread 434.

The first all-thread 428 is operationally telescopically arranged to slide within a first barrel bolt 462 being affixed to a first side portion of the first master rigid plate 424. The first all-thread 428 includes a first elongated shaft 468 having a first shaft top portion $468^T$ having a first shaft top portion $468^T$ vertical length and a first shaft bottom portion $468^B$ having a first shaft bottom portion $468^B$ vertical length, respectively.

The first shaft top portion 4687 of the first elongated shaft 468 of the first all-thread 428 includes a first 180° rotation steel pipe joint 460 which is operationally mechanically coupled to the first handle 426 of the first gripping effector 422 by way of a first rotary bolt $466^1$ wherein the first handle 426 includes a first casing grip 464.

The first shaft bottom portion $468^B$ of the first elongated shaft 468 of the first all-thread 428 is encircled with a first compression spring 430 extending the first shaft bottom portion $468^B$ vertical length of the first elongated shaft 468 wherein a first terminal distal end of the first shaft bottom portion $468^B$ as one with a corresponding distal end of the first compression spring 430 is bolted and threaded therethrough atop wall aperture of a top wall of a first rolled steel square tubing 470.

The first gripping jaw 440 is removably affixed to a bottom wall of the first rolled steel square tubing 470 by way of a first steel rod 472 having a proximal end $472^P$ and a distal end $472^D$ wherein the proximal end $472^P$ of the first steel rod 472 is removably threaded and bolted therethrough a bottom wall aperture of the bottom wall of the first rolled steel square tubing 470. The distal end $472^D$ of the first steel rod 472 extends downward therethrough a first open marginal side edge $392^1$ of the first longitudinal end 392 of the longitudinal cut-out 396 of the circumferential metal drum casing 386 of the rotary drum 200 wherein a terminal edge of the distal end $472^D$ of the first steel rod 472 is integrally welded plumb to a first congruent marginal interior portion $440^{MI1}$ of the first gripping jaw 440 of the dual gripping effector 420 interconnecting the first elongated shaft 468 of the first gripping effector 422 with the first gripping jaw 440.

The first 180° rotation steel pipe joint 460 of the first handle 426 of the first gripping effector 422 allows for an operable mechanical rotation of the first handle 426 about a first shaft top header $468^H$ of the first shaft top portion $468^T$ the first elongated shaft 468 of the first all-thread 428 to actuate a downward movement and an upward movement of the first gripping jaw 440 of the dual gripping effector 420. The first gripping jaw 440 of the dual gripping effector 420 is configured with a first top margin portion $440^T$ and a first bottom margin portion $440^B$.

The first top margin portion $440^T$ of the first gripping jaw 440 is integrally configured with a first semi-annular foot $440^{FT}$ bordered with a first rigged teeth edge 444, wherein the first semi-annular foot $440^{FT}$ includes a first longitudinal foot length equal to the first longitudinal length $L^1$ of the circumferential metal drum casing 386 of the rotary drum 200 wherein the first semi-annular foot $440^{FT}$ curves towards the circumferential metal drum casing 386 such that the first rigged teeth edge 444 of the first griping jaw 440 is oriented in an upward direction facing the circumferential metal drum casing 386 of the rotary drum 200.

The first bottom margin portion $440^B$ of the first gripping jaw 440 includes a first smooth straight edge 474 integrally confluently configured a first semi-annular distance from the first rigged teeth edge 444 of the first gripping jaw 440 wherein the first smooth straight edge 474 of the first gripping jaw 440 extends horizontally and parallel equal to the first longitudinal foot length $L^{1RT}$ of the first rigged teeth edge 444 of the first gripping jaw 440.

The second all-thread 434 is operationally telescopically arranged to slide therein a second barrel bolt 476 affixed to the first master rigid plate 424 at or about 2.00-4.00 inches congruent to the right of the first all-thread 428 having the second barrel bolt 476 affixed to the first master rigid plate 424. The second all-thread 434 includes a second elongated shaft 478 having a second shaft top portion $478^T$ and a second shaft bottom portion $478^B$ wherein the second shaft top portion $478^T$ is configured with a second shaft top portion vertical length equal to the first top shaft portion vertical length of the first elongated shaft 468 and the second shaft bottom portion $478^B$ is configured with a second shaft portion vertical length equal to the first shaft bottom portion $468^B$ vertical length.

The second shaft top portion $478^T$ of the second elongated shaft 478 of the second all-thread 434 includes a second 180° rotation steel pipe joint 480 which is operationally mechanically coupled to the second handle 432 of the second gripping effector 446 by way of a second rotary bolt $466^2$. The second handle 432 includes a second casing grip 482 wherein the second shaft bottom portion $478^B$ of the second elongated shaft 478 of the second all-thread 434 is encircled with a second compression spring 436 extending the vertical length of the second shaft bottom portion 478 of the second elongated shaft 478 wherein a second terminal distal end $478^D$ of the second shaft bottom portion $478^B$ as one with a corresponding distal end of the second compression spring 436 is bolted and threaded therethrough a top wall aperture of a top wall of a second rolled steel square tubing 480.

The second gripping jaw 442 is removably affixed to a bottom wall of the second rolled steel square tubing 480 by way of a second steel rod 482 having a proximal end $482^P$ and a distal end $482^D$ wherein the proximal end $482^P$ of the second steel rod 482 is removably threaded and bolted therethrough a bottom wall aperture of the bottom wall of the second rolled steel square tubing 480. The second steel rod 482 extends downward therethrough a second open marginal side edge $392^2$ of the first longitudinal end 392 of the longitudinal cut-out 396 of the circumferential metal drum casing 386 of the rotary drum 200 wherein the second open marginal side edge $392^2$ is disposed parallel at or about 2.0 inches from the first open marginal side edge $392^1$ wherein the distal end $482^D$ of the second steel rod 482 is integrally welded plumb to a first congruent marginal interior portion $442^{MI1}$ of the second gripping jaw 442 of the dual gripping effector 420 interconnecting the second elongated shaft 478 to the second gripping jaw 442.

The second 180° rotation steel pipe joint 480 of the first gripping effector 422 allows for the operable mechanical rotation of the second handle 432 about a second shaft top header $478^H$ of the second elongated shaft 478 of the second all-thread 434 to actuate a downward movement and an upward movement of the second gripping jaw 442 of the dual gripping effector 420. The second gripping jaw 442 is integrally configured with a second top margin portion $442^T$ and a second bottom margin portion $442^B$. The second bottom margin portion $442^B$ of the second gripping jaw 442 includes a second semi-annular foot $442^{FT}$ bordered with a second rigged teeth edge 488, wherein the second semi-annular foot $442^{FT}$ includes a longitudinal length equal to the longitudinal length of the circumferential metal drum casing 386 of the rotary drum 200 wherein the second semi-annular foot $442^{FT}$ curves downward towards the circumferential metal drum casing 386 of the rotary drum 200 such that the second rigged teeth edge 488 of the second griping jaw 442 is oriented in a downward direction facing the circumferential metal drum casing 386 of the rotary drum 200.

The second top margin portion $442^T$ of the second gripping jaw 442 includes a second smooth straight edge 490 integrally confluently configured a second semi-annular distance from the second rigged teeth edge 488 of the second gripping jaw 442 wherein the second semi-annular distance is equal to the first semi-annular distance wherein the second smooth straight edge 490 of the second gripping jaw 442 extends horizontally and parallel equal to the longitudinal length of the second rigged teeth edge 488 of the second gripping jaw 442 wherein the second smooth straight edge 490 of the second gripping jaw 442 is oriented facing the first smooth straight edge 474 of the first gripping jaw 440.

The second gripping effector 446 includes the second master rigid plate 448 having a rectangular shape including a top edge, a bottom edge, a first side edge and a second side edge wherein the second master rigid plate 448 is bolted to a central portion of the second planar circular side wall 390 of the circumferential metal drum metal casing 386 of the rotary drum 200 wherein the second gripping effector 446 includes the third all-thread 452 and the fourth all-thread 458. The third all-thread 452 is operationally telescopically arranged to slide therein a third barrel bolt 492 to a first side portion of the second master rigid plate 448 wherein the third all-thread 452 includes a third elongated shaft 494 having a third shaft top portion $494^T$ and a third shaft bottom portion $494^B$ wherein the third shaft top portion $494^T$ is configured with a vertical length equal to the first shaft top portion $468^T$ vertical length of the first shaft top portion $468^T$ of the first all-thread 428 and the third shaft bottom portion $494^B$ is configured with a vertical length equal to the first shaft bottom portion $468^B$ vertical length of the first shaft bottom portion $468^B$ of the first elongated shaft 468 of the first all-thread 428.

The third shaft top portion $494^T$ of the third elongated shaft 494 includes a third 180° rotation steel pipe joint 496 which is operationally mechanically coupled to the third handle 450 of the second gripping effector 446 by way of a third rotary bolt $466^3$ wherein the third handle 450 includes a third casing grip 498. The third shaft bottom portion $494^B$ of the third elongated shaft 494 of the third all-thread 452 is encircled with a third compression spring 454 extending a vertical length of the third shaft bottom portion $468^B$ wherein a third terminal distal end $468^D$ of the third shaft bottom portion $494^B$ as one with a corresponding distal end $454^D$ of the third compression spring 454 is threaded and bolted therethrough a top wall aperture $500^{TA}$ of a top wall of a third rolled steel square tubing 500.

The first gripping jaw 440 is removably affixed to a bottom wall of the third rolled steel square tubing 500 by way of a third steel rod 502 having a proximal end $500^P$ and a distal end $500^D$ wherein the proximal end $500^P$ of the third steel rod 502 is removably threaded and bolted therethrough a bottom wall aperture $500^{BA}$ of the bottom wall of the third rolled steel square tubing 500. The distal end $500^D$ of the third steel rod 500 extends downward therethrough a third open marginal side edge $392^3$ of the second longitudinal end 394 of the longitudinal cut-out 396 of the rotary drum 200 wherein the third open marginal side edge $392^3$ of the longitudinal cut-out 396 of the rotary drum 200 is disposed at the second longitudinal end 394 of the circumferential metal drum casing 386 of the rotary drum 200 in longitudinal alignment to the first open marginal side edge $392^1$ of the first longitudinal end 392 of the longitudinal cut-out 396 of the circumferential metal drum casing 386 of the rotary drum 200 wherein the distal end of the third steel rod 500 is integrally welded plumb to a second congruent marginal interior portion $440^{MI2}$ of the first gripping jaw 440 of the dual gripping effector 420 interconnecting the third elongated shaft 494 of the third all-thread 452 to the first gripping jaw 440. The third 180° rotation steel pipe joint 496 of the second gripping effector 446 allows for the operable mechanical rotation of the third handle 450 about a third shaft top header $494^H$ of the third elongated shaft 494 third all-thread 452 to actuate the downward movement of the first gripping jaw 440 of the dual gripping effector 420.

The fourth all-thread 458 of the second gripping effector 446 is operationally telescopically arranged to slide therein a fourth barrel bolt 504 to a second side portion of the second master rigid plate 448 positioned at or about 2.00-4.00 inches to the right of the third all-thread 452 affixed therein the second master rigid plate 448. The fourth all-thread 458 having an fourth elongated shaft 506 having a fourth shaft top portion $506^T$ and a fourth shaft bottom portion $506^B$ wherein the fourth elongated shaft top portion $506^T$ is configured with a vertical length equal in length to the second shaft top portion vertical length of the second all-thread 434 and the fourth shaft bottom portion 506 includes a vertical length equal to the second shaft bottom portion vertical length of the second all-thread 434. The fourth shaft top portion $506^T$ of the fourth elongated shaft 506 includes a fourth 180° rotation steel pipe joint 508 which is operationally mechanically coupled to the fourth handle 456 of the second gripping effector 446 byway of a fourth rotary bolt $466^4$ wherein the fourth handle 456 includes a fourth casing grip 510.

The fourth shaft bottom portion $506^B$ of the fourth elongated shaft 506 of the fourth all-thread 458 is encircled with a fourth compression spring 460 extending a vertical length of the fourth shaft bottom portion $506^B$ wherein a fourth terminal distal end $506^D$ of the fourth shaft bottom portion $506^B$ as one with a corresponding distal end of the fourth compression spring 460 is threaded and bolted, therethrough, a top wall aperture of a top wall of a fourth rolled steel square tubing 512.

The second gripping jaw 442 is removably affixed to a bottom wall of the fourth rolled steel square tubing 512 by way of a fourth steel rod 514 having a proximal end $514^P$ and a distal end $514^D$ wherein the proximal end $514^P$ of the fourth steel rod 514 is removably threaded and bolted therethrough a bottom wall aperture of the bottom wall of the fourth rolled steel square tubing 512. Wherein, the fourth steel rod 514 extends downward therethrough a fourth open marginal side edge $392^4$ of the second longitudinal end 394 of the longitudinal cut-out 396 of the rotary drum 200 wherein the fourth open marginal side edge $392^4$ is disposed parallel and at or about 2.0 inches from the third open marginal side edge $392^3$ of the rotary drum 200 wherein the distal end $514^D$ of the fourth steel rod 514 is integrally welded plumb to a second congruent marginal interior portion $442^{MI2}$ of the second gripping jaw 442 of the dual gripping effector 420 interconnecting the fourth elongated shaft 506 of the fourth all-thread 458 to the second gripping jaw 442.

The fourth 180° rotation steel pipe joint 508 of the second gripping effector 446 allows for the operable mechanical rotation of the fourth handle 456 about a fourth shaft top header $506^H$ of the fourth elongated shaft 506 of the fourth all-thread 458 to actuate the up and down movement of the second gripping jaw 442 of the dual gripping effector 420.

The first all-thread 428 and the third all-thread 452 are counterparts to each other and the second all-thread 434 and the fourth all-thread 458 are counterparts to each other such that the first all-thread 428 and the third all-thread 452 are operationally implemented in synchrony with each other.

The first handle 426 of the first gripping effector 422 allows for the operable mechanical rotation of the first handle 426 about the first shaft top header $468^H$ of the first elongated shaft 468 of the first all-thread 428 to actuate the downward movement and the upward movement of the first gripping jaw 440 of the dual gripping effector 420, and, synchronously, the third handle 450 of the second gripping effector 446 of the dual gripping effector 420 allows for the operable mechanical rotation of the third handle 450 of the second gripping effector 446 about the third shaft top header $452^H$ of the third elongated shaft 452 of the third all-thread 452 of the second gripping effector 446 to synchronously actuate the downward movement and upward movement of the first gripping jaw 440 of the dual gripping effector 420 such that a counterclockwise rotation of the first handle 426 about the first shaft top header $428^H$ of the first all-thread 428 causes the first all-thread 428 of the first gripping effector 422 to move downward having the first compression spring 430 relax and lengthen and in synchrony therewith a clockwise rotation of the third handle 450 about the third shaft top header $494^H$ of the third elongated shaft 494 third all-thread 452 of the second gripping effector 446 causes the third all-thread 452 to move downward having the third compression spring 454 relax and lengthen whereby the first gipping jaw 440 moves in the downward direction in a range of 0.50 inch to 5.00 inches distance measured away from the circumferential metal drum casing 386 of the rotary drum 200 forming a first gap 201 in a range of 0.50 inch to 5.00 inches between the first gripping jaw 440 and the circumferential metal drum casing 386 of the rotary drum 200 wherein the leading end 52' of an any one of a pliant foam core body $\mathbf{52}^{1}$ of the plurality of the pliant foam core bodies $\mathbf{52}^{1+N}$ is received therein the first gap 201 wherein the bottom pliant foam core body portion 122 of the any one of the pliant foam core body $\mathbf{52}^{1}$ is contiguous with the circumferential metal drum casing 386 of the rotary drum 200 and having the plurality of extended cubes $\mathbf{132}^{1+N}$ in an upright facing position, as depicted in FIGS. 5A-5B, with reference to FIG. 4, 6A, and FIG. 8A-8B.

The second handle 432 of the first gripping effector 422 allows for the operable mechanical rotation of the second handle 432 about the second shaft top header $\mathbf{478}^{H}$ of the second all-thread 434 to actuate the downward movement and the upward movement of the second gripping jaw 442 of the dual gripping effector 420 and synchronously the fourth handle 456 of the second gripping effector 446 of the dual gripping effector 420 allows for the operable mechanical rotation of the fourth handle 456 about the fourth shaft top header $\mathbf{506}^{H}$ of the fourth elongated shaft 506 fourth all-thread 458 to synchronously actuate the downward movement and the upward movement of the second gripping jaw 442 of the dual gripping effector 420 such that a clockwise rotation of the second handle 432 about the second shaft top header $\mathbf{478}^{H}$ of the second elongated shaft 478 of the second all-thread 434 causes the second all-thread 434 to move in the downward direction having the second compression spring 436 relax and lengthen and in synchrony therewith a counterclockwise downward movement of the fourth handle 456 about the fourth shaft top header $\mathbf{506}^{H}$ of the fourth elongated shaft 506 fourth all-thread 458 causes the fourth all-thread 458 to move in the downward direction having the fourth compression spring 460 relax and lengthen whereby the second gripping jaw 442 moves in the downward direction in a range of 0.50 inch to 5.00 inches distance measured away from the circumferential metal drum casing 386 of the rotary drum 200 forming a second gap 203 in a range of 0.50 inch to 5.00 inches between the second gripping jaw 442 and the circumferential metal drum casing 386 of the rotary drum 200 whereby the pliant foam core body 52 being wrapped about the rotary drum 200 having the plurality of extended cubes $\mathbf{132}^{1+N}$ in an upright facing position, the trailing end $\mathbf{52}^{T}$ of the pliant foam core body 52 is received therethrough the second gap 203, as depicted in FIGS. 5A-5B, with reference to FIG. 4, 6A, and FIG. 8A-8B.

The first handle 426 of the first gripping effector 422 allows for the operable mechanical rotation of the first handle 426 about the first shaft top header $\mathbf{468}^{H}$ of the first elongated shaft 468 of the first all-thread 428 in a clockwise direction to actuate the first gripping jaw 440 of the dual gripping effector 420 to move in the upward direction towards the circumferential metal drum casing 386 of the rotary drum 200 and synchronously the third handle 450 of the second gripping effector 446 of the dual gripping effector 420 allows for the operable mechanical rotation of the third handle 450 about the third shaft top header $\mathbf{494}^{H}$ of the third elongated shaft 494 third all-thread 452 in a counterclockwise direction to synchronously actuate the movement of the first gripping jaw 440 of the dual gripping effector 420 in the upward direction towards the circumferential metal drum casing 386 of the rotary drum 200 such that a clockwise rotation of the first handle 426 about the first shaft top header $\mathbf{468}^{H}$ of the first elongated shaft 468 of the first all-thread 428 causes the first all-thread 428 to move upward having the first compression spring 430 compress and shorten and in synchrony therewith the counterclockwise rotation of the third handle 450 about the third shaft top header $\mathbf{494}^{H}$ of the third elongated shaft 494 third all-thread 452 causes the third all-thread 452 to move upward having the third compression spring 454 compress and shorten whereby the first gipping jaw 440 moves in the upward direction towards the circumferential metal drum casing 386 of the rotary drum 200 operably to close the first gap 201 between the first gripping jaw 440 and the circumferential metal drum casing 386 of the rotary drum 200 while gripping the leading end $\mathbf{52}^{L}$ of the pliant foam core body 52 removably retained therebetween the first gripping jaw 440 and the circumferential metal drum casing 386 of the rotary drum 200.

The second handle 432 of the first gripping effector 422 allows for the operable mechanical rotation of the second handle 432 about the second shaft top header $\mathbf{478}^{H}$ of the second elongated shaft 478 of the second all-thread 434 in a counterclockwise direction to actuate the movement of the second gripping jaw 442 of the dual gripping effector 420 in an upward direction towards the circumferential metal drum casing 386 of the rotary drum 200 and synchronously the fourth handle 456 of the second gripping effector 446 of the dual gripping effector 420 allows for the operable mechanical rotation of the fourth handle 456 about the fourth shaft top header $\mathbf{506}^{H}$ of the fourth elongated shaft 506 of the fourth all-thread 458 in a clockwise rotation to synchronously actuate the upward movement of the second gripping jaw 442 of the dual gripping effector 420 such that the counterclockwise rotation of the second handle 432 causes the second all-thread 434 to move upward having the second compression spring 436 compress and shorten and in synchrony therewith the clockwise rotation of the fourth handle 456 causes the fourth all-thread 458 to move upward having the fourth compression spring 460 compress and shorten whereby the second gipping jaw 442 moves in the upward direction towards the circumferential metal drum casing 386 of the rotary drum 200 operably to close the second gap 203 between the second gripping jaw 442 and the rotary drum 200 while gripping the trailing end $\mathbf{52}^{T}$ of the pliant foam core body 52 removably retained therebetween the second gripping jaw 442 and the circumferential metal drum casing 386 of the rotary drum 200, as shown in FIGS. 5A-5B. Referring to FIGS. 7, 8C, 10, a second side partial perspective view of the rotary drum system for the formation of a gel infused pliant foam body 10, with reference to FIGS. 2A-2D, the rotary drum motor 516 is permanently mounted on a rotary drum motor support body 520 having a rotary drum motor central support aperture 518. The rotary drum motor support body 520 is permanently affixed to the lateral axle support beam 382 proximate to the rotary drum anchorage conveyor frame 190 whereby the lateral axle support beam 382 is inserted therethrough the rotary drum motor central support aperture 518. As depicted in FIGS. 1A-1D, FIG. 6A, FIG. 8A, FIG. 9, a first trunnion $\mathbf{522}^{1}$ having a first support aperture $\mathbf{522}^{1A}$ is affixed centrally on the front cross bar 216 and a second trunnion $\mathbf{522}^{2}$ having a second support aperture $\mathbf{522}^{2A}$ is affixed centrally on the rear cross bar 218 rectilinearly aligned to the first support aperture $\mathbf{522}^{1A}$ of the first trunnion $\mathbf{522}^{1}$, as depicted in FIGS. 2B, FIG. 7, FIG. 8C, FIG. 10.

As depicted in FIG. 4, FIGS. 6A-6B, FIG. 8A, FIG. 9, FIG. 10, with reference to FIGS. 1A-1E, 2A-2D, a first rotary drum cylindrical drive axle 524 is mounted therethrough the first central annual ring 412 of the first planar circular side wall 388 of the rotary drum 200. The first rotary drum cylindrical drive axle 524 extends therethrough the longitudinal axis of the hollow cylindrical volume of the rotary drum 200 to a second central annular ring 416 of the second planar circular side wall 390 of the rotary drum 200. In this manner a second end 524$^2$ of the first rotary drum cylindrical drive axle 524 projects axially from the second central annular ring 416 of the second planar circular side wall 388 extending axially therethrough the second support aperture 522$^{2A}$ of the second trunnion 522$^2$ to provide a second rotary drum sprocket mount 530 and a first end 524$^2$ of the first rotary drum cylindrical drive axle 524 projects axially from a first central annular ring 412 of the first planar circular side wall 388 of the rotary drum extending therethrough the first support aperture 522$^{1A}$ of the first trunnion 522$^1$ to provide a first rotary drum sprocket mount 592.

As depicted in FIGS. 7, 8C, and FIG. 10, a third trunnion 522$^3$ having a third support aperture 522$^{3A}$ is permanently affixed to the front end 382$^F$ of the lateral axle support beam 382 and a fourth trunnion 522$^4$ having a fourth support aperture 522$^{4A}$ is permanently affixed to the rear end 382$^R$ of the lateral axle support beam 382 wherein the third support aperture 522$^{3A}$ of the third trunnion 522$^3$ is rectilinearly aligned to the fourth support aperture 522$^{4A}$ of the fourth trunnion 522$^4$.

Referring to FIGS. 7, 8C, and FIG. 10, a first drive shaft center support bearing 594$^1$ having a front side 594$^{1F}$, a rear side 594$_{1R}$, and a first drive shaft center support bearing aperture 594$^{1A}$, wherein the first drive shaft center support bearing 594$^1$ is permanently affixed to the lateral axle support beam 382 a first lateral distance from the third trunnion 522$^3$ wherein the first drive shaft center support aperture 594$^{1A}$ of the first drive shaft center support bearing 594$_1$ is rectilinearly aligned with the third support aperture 522$^{3A}$ of the third trunnion 522$^3$.

A second drive shaft center support bearing 594$^2$ having a front side 594$^{2F}$, a rear side 594$^{2R}$, and a second drive shaft center support bearing aperture 594$^{2A}$ wherein the second drive shaft center support bearing 594$^2$ is permanently affixed to the lateral axle support beam 382 a second lateral distance from the fourth trunnion 522$^4$ wherein the second drive shaft center support bearing aperture 594$^{2A}$ is rectilinearly aligned with the fourth support aperture 522$^{4A}$ of the fourth trunnion 522$^4$ wherein the first lateral distance is equal to the second lateral distance.

A first differential pilot bearing 598$^1$ having a front side 598$^{1F}$, a rear side 598$^{1R}$ and a first differential pilot bearing aperture 598$^{1A}$ wherein the first differential pilot bearing 598$^1$ is affixed to the lateral axle support beam 382 proximate to the rear side 594$^{1R}$ of the first drive shaft center support bearing 594$^1$ wherein the first differential pilot bearing aperture 598$^{1A}$ is rectilinearly aligned to the first drive shaft center support bearing aperture 594$^{1A}$ A of the first drive shaft center support bearing 594.

A second differential pilot bearing 598$^2$ having a front side 598$^{2F}$, a rear side 598$^{2R}$ and a second differential pilot bearing aperture 598$^{2A}$ wherein the second differential pilot bearing 598$^2$ is affixed to the lateral axle support beam 382 proximate to the rear side of the second drive shaft center support bearing 594$^2$ wherein the second differential pilot bearing aperture 598$^{2A}$ is rectilinearly aligned to the second drive shaft center support bearing aperture 594$^{2A}$ of the second drive shaft center support bearing 594$^2$.

FIGS. 7 and 8C, depict a second rotary drum cylindrical drive axle 600 having a first axial end 600$^1$ and a second axial end 600$^2$ is rotatably mounted on the lateral axle support beam 382 horizontally longitudinally parallel to the rotary drum 200 wherein the second axial end 600$^2$ of the second rotary drum cylindrical drive axle 600 is inserted therethrough the third support aperture 522$^{3A}$ of the third trunnion 522$^3$ extending therethrough the first drive shaft center support bearing aperture 594$^{1A}$ A of the first drive shaft center support bearing 594 extending therethrough the first differential pilot bearing aperture 598$^{1A}$ of the first differential pilot bearing 598$^1$ therethrough the rotary drum motor central support aperture 518 of the rotary drum motor support body 520 of the rotary drum motor 516 extending therethrough the second differential pilot bearing aperture 594$^{2A}$ of the second differential pilot bearing 598$^2$ and therethrough the second drive shaft center support bearing aperture 594$^{2A}$ of the second drive shaft center support bearing 594$^2$ and therethrough the fourth support aperture 522$^{4A}$ of the fourth trunnion 522$^4$ such that the first end 600$^1$ of the second rotary drum cylindrical drive axle 600 projects axially from the third support aperture 522$^{3A}$ of the third trunnion 522$^3$ to provide a third rotary drum sprocket mount 612 and the second end 600$^2$ of the second rotary drum cylindrical drive axle 600 projects axially from the fourth support aperture 522$^{4A}$ of the fourth trunnion 522$^4$ to provide a fourth rotary drum sprocket mount 620.

A first rotary drum sprocket 606 is rotatably mounted on the first rotary drum sprocket mount 592 of the first end 524$^1$ of the first rotary drum cylindrical drive axle 524 and a third rotary drum sprocket 610 is rotatably mounted on the third rotary drum sprocket mount 612 of the first axial end 600$^1$ of the second rotary drum cylindrical drive axle 600 wherewith a first rotary drive chain 614 engages the first rotary drum sprocket 606 and the third rotary drum sprocket 610 wherein a first rotary drive chain plate cover 616 is mounted thereon the first rotary drum sprocket 606 and the third rotary drum sprocket 610 to shield the first rotary drive chain 614.

A second rotary drum sprocket 618 is rotatably mounted on the second rotary drum sprocket mount 530 of the second end 524$^2$ of the first rotary drum cylindrical drive axle 524 and a fourth rotary drum sprocket 622 is rotatably mounted on the fourth rotary drum sprocket mount 620 of the second axial end 600$^2$ of the second rotary drum cylindrical drive axle 600 wherewith a second rotary drive chain 624 engages the second rotary drum sprocket 618 and the fourth rotary drum sprocket 622 wherein a second rotary drive chain plate cover 626 is mounted thereon the second rotary drum sprocket 618 and the fourth rotary drum sprocket 622 to shield the second rotary drive chain 624.

In another exemplary embodiment of the present invention, the first rotary drive chain 614 which engages the first rotary drum sprocket 606 and the third rotary drum sprocket 610 can be replaced with a first 90-degree double cardan universal joint and a second 90-degree double cardan universal joint. The first end of the first 90-degree double cardan universal joint is rotatably connected to the first end 524$^1$ of the rotary drum cylindrical drive axle 524 and the second end of the first 90-degree double cardan universal joint is rotatably connected to the first end 600$^1$ of the second rotary drum cylindrical drive axle 600. A first end of the second 90-degree double cardan universal joint is rotatably connected to the second end 524$^2$ of the rotary drum cylindrical drive axle 524 and a second end of the second 90-degree double cardan universal joint is rotatably connected to the second end 600$^2$ of the second rotary drum cylindrical drive axle 600.

The first trunnion $522^1$, the second trunnion $522^2$, the third trunnion $522^3$, and the fourth trunnion $522^4$ each includes a trunnion locking mechanism comprising including a screw locking lever 210. The rotary drum motor 516, as depicted in FIGS. 2A-2D, FIG. 7, FIG. 8C, and FIG. 10, is implemented to rotate the rotary drum 200 in 360° rotations when in operation wherein the rotary drum motor 516. The rotary drum motor 516 is controlled by a rotary drum motor single speed actuator 630 having an on-switch and an off-switch to control an on-mode rotation and an off-mode rotation of the rotary drum 200. The rotary drum motor 516 includes a rotary drum motor electrical gear box 632 (not shown) operably electrically wired $94^E$ to the electrical power source 94 concurrently operably electrically wired to a rotary drum motor drive (not shown) integrally connected to a first rotary drum motor output shaft 634 being coaxial with the second rotary drum cylindrical drive axle 600. The rotary drum motor 516 causes the second rotary drum cylindrical drive axle 600 to rotate to perpetuate the first rotary drum cylindrical drive axle 524 to rotate by way of the rotation of the third rotary drum sprocket 610 of the second rotary drum cylindrical drive axle 600 and the first rotary drum sprocket 606 of the first rotary drum cylindrical drive axle 524 mechanically operationally rotationally engaged by the first rotary drive chain 614. Synchronously, the fourth rotary drum sprocket 622 of the second rotary drum cylindrical drive axle 600 and the second rotary drum sprocket 618 of the first rotary drum cylindrical drive axle 524 rotates mechanically operationally rotationally engaged by the second rotary drive chain 624. The rotatory drum 200 can revolve at a rate of between approximated at 1.25-1.75 revolutions per minute (rpm). In an exemplary embodiment of the operation of the 10 the rotary drum 200 revolves at the rate of between 1.25-1.75 rpm being timed by the timer 750, as shown in FIGS. 2A-2D.

The timer 750 can be a digital timer relay/countdown timer, on-delay timer, featuring a timing setting range 0.01-9999 second/minute/hour, having high timing accuracy with supply voltages 85V-265V AC (110-240V AC) or 24V DC, 4-digit LED dual time display which is easy to read configured to display numbers counting to a predetermined time for tracking the duration of time the rotary drum 200 is rotating. The user can set the timer 750 and to monitor the timer 50 by way of manufacturer's timer firmware to stop at the time allotted for the rotary drum 200 to rotate at least 45 seconds to allow the rotary drum 200 to revolve 360° within the heated liquid gel $40^{380}$ of the gel bath 42 to allow the pliant foam core body mounted thereon the rotary drum 200 to be infused with the heated liquid gel $40^{380}$ of the gel bath 42. The timer 750 is powered by the electric power source 94.

When the rack and pinion motor 290, as depicted in FIGS. 1A-1E, is actuated byway of the down-control knob 293, as depicted in FIGS. 1C-1D, to rotate a third drive chain 636 around the first rack and pinion sprocket 308 and the second rack and pinion sprocket 324 operable to facilitate the downward descent of each of the first rack and pinion gear system $260^1$, the second rack and pinion gear system $260^2$, the third rack and pinion gear system $260^3$, and the fourth rack and pinion gear system $260^4$ to enable the downward vertical direction of the rotary drum 200 having the pliant foam core body 52 mounted thereon lowered into an upper portion of the 380° F. heated liquid gel $40^{380}$ of the gel bath 42 whereupon the subsequent rotation of the rotary drum 200 inducts suction of the 380° F. heated liquid gel $40^{380}$ into each of the plurality of extended cubes $132^{1+N}$ of the pliant foam core body 52, as depicted in FIG. 7, FIG. 9-12.

When the rotary drum motor 516, as depicted in FIGS. 7, FIG. 8C and FIG. 10, is actuated to the on-mode rotation the rotary drum motor 516 operates the rotation of the first rotary drive chain 614 around the first rotary drum sprocket 606 of the first rotary drum cylindrical drive axle 524 and the third rotary drum sprocket 610 of the second rotary drum cylindrical drive axle 600 synchronously to rotate the second rotary drive chain 624 around the second rotary drum sprocket 618 of the first rotary drum cylindrical drive axle 524 and the fourth rotary drum sprocket 622 of the second rotary drum cylindrical drive axle 600 to enable the continuous rotation of the rotary drum 200 at a single speed about a horizontal axis such that the pliant foam core body 52 being removably retained by the first gripping jaw 440 and the second gripping jaw 442 rotates thereon the rotary drum 200.

Figure 9:
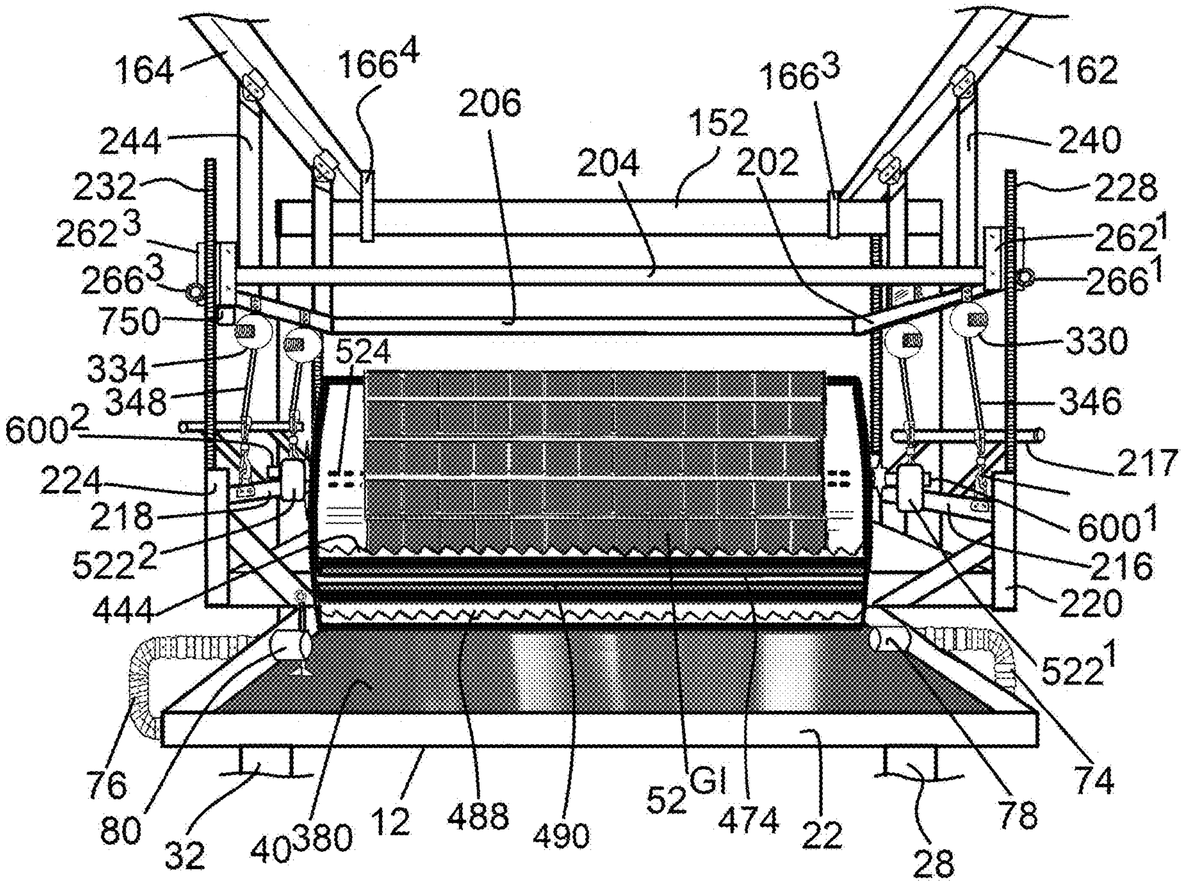
FIG. 9 is a first side perspective partial view of the rotary drum system for the formation of a gel infused pliant foam body showing a gel infused pliant foam core body, according to an embodiment of the present invention.

Referring to FIG. 6A, FIG. 8A, and FIG. 9, the gel position sensor 628 is disposed on a front facing metal wall $216^F$ of the front cross bar 216 wherein when the pliant foam core body 52 is gripped circumferentially around the rotary drum 200 and descends into the 380° F. heated liquid gel $40^{380}$ contained in the metal gel basin 36 of the gel heating metal table 12 the gel position sensor 628 detects a top surface of the 380° F. heated liquid gel $40^{380}$ whereby the position gel sensor 628 sends an electric sign alto the rack and pinion motor 290 whereby the descent of the rotary drum 200 is halted at the predetermined depth to prevent an unwanted retention of an influent of 380° F. heated liquid gel $40^{380}$ upon the exterior cube surfaces of the plurality of extended cubes $132^{1+N}$ and the outlying surfaces of each of the plurality of recessed channels $134^{1+n}$ of the pliant foam core body 52 such that as the rotary drum 200 continues to rotate 360° for 45 seconds so that each of the exterior cube surfaces of the plurality of extended cubes $132^{1+N}$ and the outlying surfaces of each of the plurality of recessed channels $134^{1+n}$ of the pliant foam core body 52 is infused with 380° F. heated liquid gel $40^{380}$ to a predetermined gel thickness to create a hydrophobic gel barrier over each of the exterior cube surfaces of each of the plurality of extended cubes $132^{1+N}$ of the series of the plurality of extended cubes $132^{1+N}$ and outlying surfaces of each of the plurality of recessed channels $134^{1+n}$ to form a heated gel infused pliant foam core body $52^{GI}$. The gel position sensor 628 is selected from the group comprising any one of potentiometric linear transducer sensors, laser position sensors, and contact position sensors.

Returning to FIGS. 6A and 8A, the gel position sensor 628 is illustrated perched in the heated liquid gel $40^{380}$ of the gel bath 42 contained therein the metal gel basin 36. The gel position sensor 628 includes an electrode array configured to acquire sensory signal pursuant to touch from the heated liquid gel $40^{380}$ of the gel bath 42. When the sensory signal is acquired by the electrode array an alarm is triggered to halt the lowering of the rotary drum 200 with the pliant foam core body 52 mounted thereon being further immersed into the heated liquid gel $40^{380}$ of the gel bath 42 contained therein the metal gel basin 36.

In further operation of the rotary drum system for the formation of a gel infused pliant foam body 10, the rack and pinion motor 290 being actuated by turning the up-control knob 295 such that the rotary drum 200 having the gel infused pliant foam core body 52 removably retained thereon is lifted in the reverse upward vertical direction to a higher position therefrom the metal gel basin 36 as the rotary drum 200 continues to rotate.

Referring to FIGS. 9-12, with reference to FIGS. 3A-4, the first handle 426 of the first gripping effector 422 is rotated in the counterclockwise direction and synchronously the third handle 450 of the second gripping effector 446 of the dual gripping effector 420 is rotated in the clockwise direction to actuate the movement of the first gripping jaw 440 in the downward direction such that the first gripping jaw 440 moves away from the circumferential metal drum casing 386 of the rotary drum 200 whereby the leading end $52^L$ of the gel infused pliant foam core body $52^{GI}$ is released from the first gripping jaw 440 whereby the leading end $52^L$ of the heated gel infused pliant foam core body $52^{GI}$ advances to the heated gel infused pliant foam core body lift 314.

Figure 11:
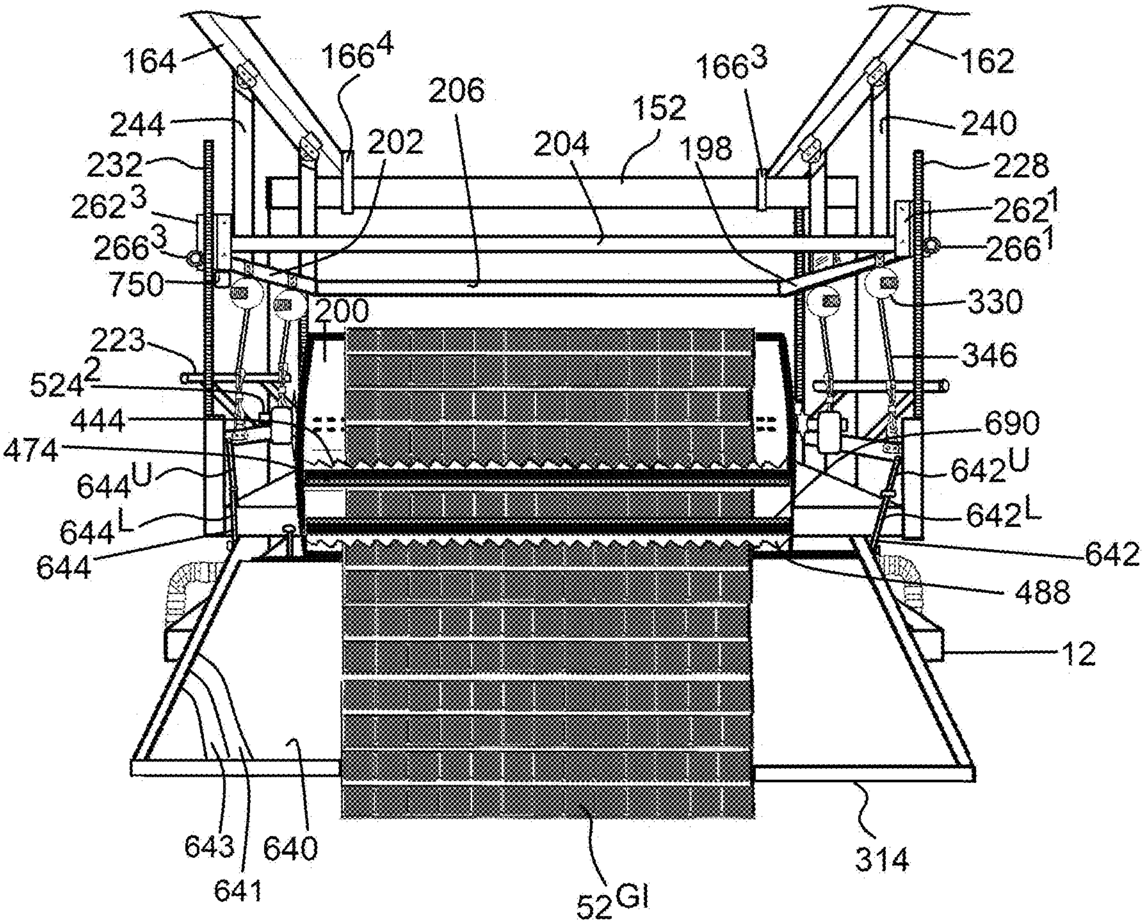
FIG. 11 is a first side perspective partial view of the rotary drum system for the formation of a heated gel infused pliant foam body showing the gel infused pliant foam core body of FIG. 9 being maneuvered onto a heated gel infused pliant foam core body lift, according to an embodiment of the present invention.
Figure 12:
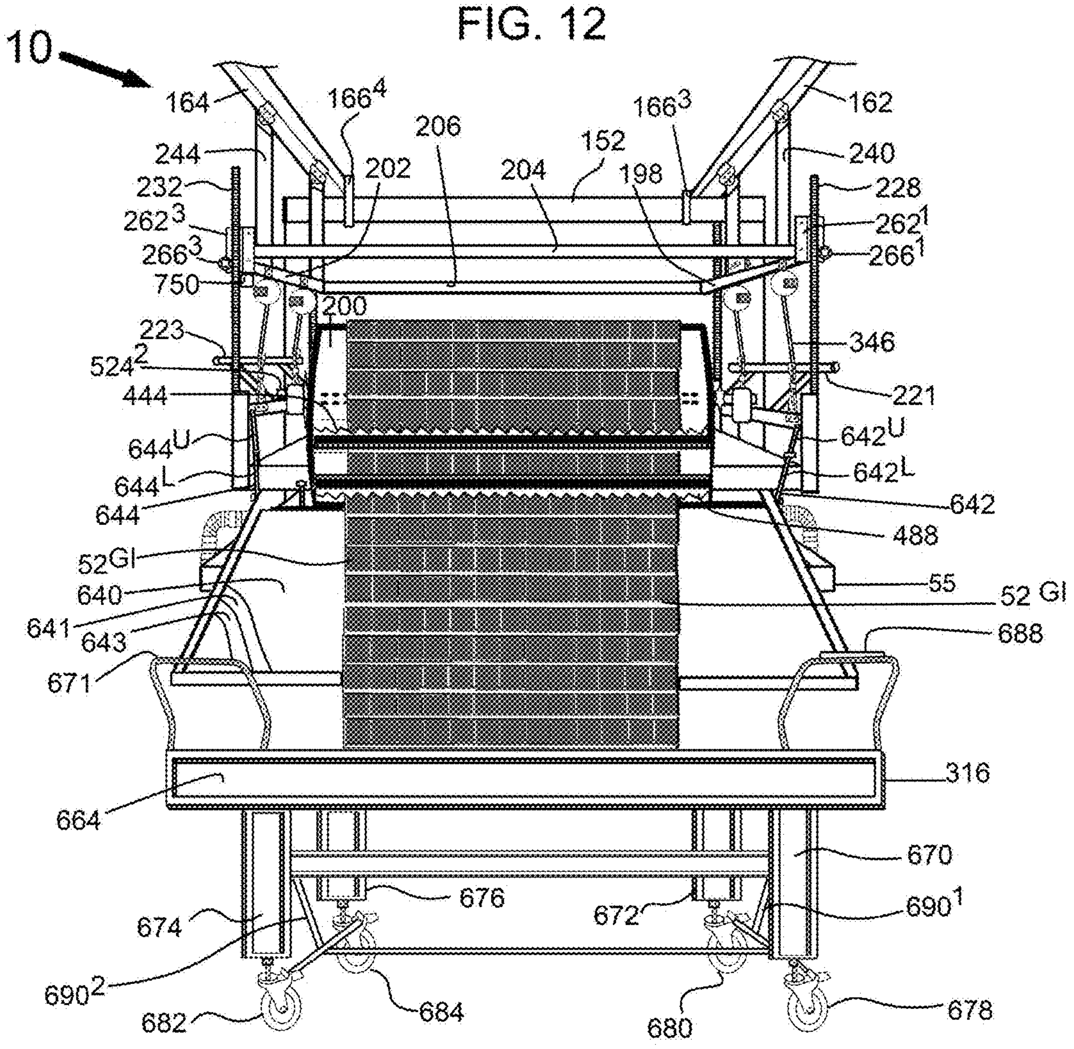
FIG. 12 is a first side perspective partial view of the rotary drum system for the formation of a gel infused pliant foam body showing the heated gel infused pliant foam core body of FIG. 9 being maneuvered onto the heated gel infused pliant foam core body lift of FIG. 11 being maneuvered onto a heated gel infused pliant foam core body resting and transport table, according to an embodiment of the present invention.

Referring to FIGS. 11-12, with reference to FIGS. 3A-4, FIGS. 9-10, and FIGS. 1A-2D, the second handle 432 of the first gripping effector 422 is rotated in the clockwise direction and synchronously the fourth handle 456 of the second gripping effector 446 of the dual gripping effector 420 is rotated in the counterclockwise direction to actuate the movement of the second gripping jaw 442 in the downward direction such that the second gripping jaw 442 moves away from the circumferential metal drum casing 386 of the rotary drum 200 whereby the trailing end $52^T$ of the heated gel infused pliant foam core body $52^{GI}$ is released from the second gripping jaw 442 whereby the trailing end $52^T$ of the heated gel infused pliant foam core body $52^{GI}$ hindmost to the leading end $52^L$ of the heated gel infused pliant foam core body $52^{GI}$ advances to the heated gel infused pliant foam core body lift 314 as the leading end $52^L$ of the heated gel infused pliant foam core body $52^{GI}$ advances to the heated gel infused pliant foam core body resting and transport table 316.

Referring to FIG. 11-12, the heated gel infused pliant foam core body lift 314 includes a rectangular slide 638 having a top plate $638^{TP}$ and a bottom plate $638^{BP}$, a first side edge $314^{S1}$, a second side edge $314^{S2}$, a front side edge $314^{SF}$, and a rear side edge $314^{SR}$, wherein the top plate $638^{TP}$ is configured with a top anti-static high temperature mat 640 having two layers of elastomer wherein the first layer 641 is manufactured with a static dissipative rubber layer and the second layer 643 is manufactured with a bottom black carbon-loaded conductive scrim layer laminated to the static dissipative rubber layer configured with at least one metal snap 648 to connect to a common ground 650 connected to an electrical outlet 652 by way of a grounding cable 654 to provide protection against shock and electrical leakage current.

A leakage current is current that flows from an AC or DC circuit to the ground or another conductor. If the equipment or device is not grounded correctly, it is possible for current to flow through the human body. This is why it is vital to regulate and control leakage current for the electrical power supply 824. Safety standards help to reduce risks and keep patients and healthcare providers and support staff safe. Current that flows from either a DC or AC circuit to the ground, a chassis or any other conductive component in the absence of a grounding system is considered leakage current. Leakage current from the input or output cannot be avoided, but it must be controlled.

Turning attention to FIGS. 11-12, the heated gel infused pliant foam core body lift 314 is operatively connected to a first elbow arm connector 642 and a second elbow arm connector 644 wherein each of the first elbow arm connector 642 and the second elbow arm connector 644 is extendable at an angle downward from the second end $216^2$ of the front cross bar 216 of the rotary drum anchorage conveyor frame 190 and the second end $216^2$ of the rear cross bar 218 respectively. The first elbow arm connector 642 includes a first upper arm connector $642^U$ and a first lower arm connector $642^L$ and the second elbow arm connector 644 includes a second upper arm connector $644^U$ and a second lower arm connector $642^L$.

The first upper arm connector $642^U$ of the first elbow arm connector 642 is operatively connected to the second end $216^2$ of the front cross bar 216 of the rotary drum anchorage conveyor frame 190 by way of a first steel hinge $646^1$ and the first lower arm connector $642^L$ of the first elbow arm connector 642 is operatively connected to an upper portion of the first side edge $314^{S1}$ of the heated gel infused pliant foam core body lift 314 by way of a second steel hinge $646^2$. The second upper arm connector $644^U$ of the second elbow arm connector 644 is operatively connected to the second end $218^2$ of the rear cross bar 218 of the rotary drum anchorage conveyor frame 190 byway of a third steel hinge $646^3$ and the second lower arm connector $644^L$ of the second elbow arm connector 644 is operatively connected to an upper portion of the second side edge $314^{S2}$ of the heated gel infused pliant foam core body lift 314 by way of a fourth steel hinge $646^4$.

FIG. 12 depicts the heated gel infused pliant foam core body resting and transport table 316. The heated gel infused pliant foam core body resting and transport table 316 comprises a table structure including a stainless-steel body having a removable perforated rigid silicone non-slip table top 656 and a rigid silicone non-slip table bottom 658 joined by four rigid non-slip silicone walls 660, 662, 664, 666, including a rigid silicone non-slip front facing wall 660, a rigid silicone non-slip rear facing wall 662, a first rigid silicone non-slip side wall 664 and an opposing second rigid non-slip side wall 666 joined at four corners, wherein the first rigid silicone non-slip side wall 664 is configured with a front manual bar brake 668.

The table structure of the heated gel infused pliant foam core body resting and transport table 316 is supported by four insulated table support columns 670, 672, 674, 676, including a rigid silicone non-slip first front table support column 670, a second front rigid silicone non-slip front table support column 672, a first rigid silicone non-slip first rear table support column 674, and a second rear insulated table support column 676 wherein each of the four insulated table support columns 670, 672, 674, 676, are configured with a 360° swivel wheel, respectively, 678, 680, 682, 684, affixed to a terminal distal end of each of the four insulated table support columns 670, 672, 674, 676, wherein each of the 360° swivel wheels 678, 680, 682, 684, is integrated with a front handle bar break 688 and a rear handle bar break 671. Each of the 360° swivel wheels 678, 680, 682, 684, are selected from the group of 360° swivel wheels comprising simple braking pad and a shoehorn brake.

As depicted in FIG. 12, a braking rod 690 having a front braking rod 6901 and a rear braking rod $690^2$ locks each of the 360° swivel wheels 678, 680, 682, 684 and the braking rod 690 is actuated when the front handle bar brake 688 of the heated gel infused pliant foam core body resting and transport table 316 is pressed down to lever a back end of the braking rod 690 in an up position to cause the braking rod 690 to pull up and release pressure from each of the 360° swivel wheels 678, 680, 682, 684, thereby unlocking each of the 360° swivel wheels 678, 680, 682, 684.

In another embodiment of the dual gripping effector 420, the rotary drum system for the formation of a gel infused pliant foam body 10, further comprises a cutting device wherein the dual gripping effector includes the first rigged teeth edge 444 of the first gripping jaw 440 and the second rigged teeth edge 488 of the second gripping jaw 442 being sharpened to provide serrated blades to enable cutting of the pliant foam core body 52 to any of a variety designated sizes indicated by the variety of size markers including King, Queen, Double, and Twin, such that when each of the first gripping jaw 440 and the second gripping jaw 488 are raised and tightened against the pliant foam core body 52 the pliant foam core body 52 can be cut.

Referring to FIGS. 1A-1B, FIG. 1E, FIGS. 2A-2B, the rotary drum system for the formation of a gel infused pliant foam body 10 is configured with the exhaust hood 692. The exhaust hood 692, comprising a metal rectangular pyramid structure including four cohesive triangular metal panels $\mathbf{692}^1$, $\mathbf{692}^2$, $\mathbf{692}^3$, $\mathbf{692}^4$ being integrally welded together forming an apex and a rectangular base configured with a top opening at the apex having a circumferential cross section and a bottom opening integrated within the rectangular base 694 having a rectangular cross section wherein the bottom opening having an exterior facing peripheral rim having four sides, a front facing rim wall 696, a rear facing rim wall 698, a first lateral facing rim wall 670, a second lateral facing rim wall 672. The exhaust hood 692 can include a filter configured with aluminum mesh that is configured to be removed from the exhaust hood and cleaned or replaced with a new filter.

As depicted in FIGS. 1A-1B, FIG. 1E, FIGS. 2A-2B, the exhaust hood 692 is anchored to a metal ceiling ladder mount 700 permanently affixed to a ceiling 702 by way of a stainless-steel cable system 704 wherein the stainless steel cable system 702 is equipped with a plurality of 1.5 mm steel suspension cables $\mathbf{704}^{1+N}$ configured being disposed contiguous with the rectangular base of the exhaust hood 692 so that a first end of a first 1.5 mm steel suspension cable $\mathbf{704}^1$ is affixed to a first metal rung $\mathbf{700}^1$ of the metal ceiling ladder mount 700 and the second end of the first 1.5 mm steel suspension cable $\mathbf{704}^1$ is welded coaxial to a first end of the front facing rim wall 696 of the exhaust hood 692, a first end of a second 1.5 mm suspension cable $\mathbf{704}^2$ is affixed to a second metal rung $\mathbf{700}^2$ of the metal ceiling ladder mount 700 and the second end of the second 1. 50 mm steel suspension cable $\mathbf{704}^2$ is welded coaxial to a second end of the front facing rim wall 696 of the exhaust hood 692, a first end of a third 1.50 mm steel suspension cable $\mathbf{704}^3$ is affixed to a third metal rung $\mathbf{700}^3$ of the metal ceiling ladder mount 700 and the second end of the third 1.5 mm steel suspension cable $\mathbf{704}^3$ is welded coaxial to a first a first end of a third 1.5 mm steel suspension cable end of the rear facing rim wall 698 of the exhaust hood 692, a first end of a fourth 1.5 mm steel suspension cable $\mathbf{704}^{24}$ is affixed to a fourth metal rung $\mathbf{700}^4$ of the metal ceiling ladder mount 700 and a second end of the fourth 1.5 mm steel suspension cable $\mathbf{700}^4$ is welded coaxial to a second end of the rear facing rim wall 698 of the exhaust hood 692, a first end of a fifth 1.5 mm steel suspension cable $\mathbf{704}^5$ is affixed to a fifth metal rung $\mathbf{700}^5$ of the metal ceiling ladder mount 700 and a second end of the fifth 1.5 mm steel suspension cable $\mathbf{700}^5$ is welded coaxial to a top portion of a metal exhaust hood conduit 706.

A first channel connector plate $\mathbf{380}^1$ and a second channel plate $\mathbf{380}^2$ rigidly connects the front facing rim wall 696 of the exhaust hood to the front I-beam bridge 162 and a third channel connector plate $\mathbf{380}^3$ and a fourth channel connector plate $\mathbf{380}^4$ rear I-beam bridge 164 rigidly connects the rear facing rim wall 698 of the exhaust hood to the rear I-beam bridge 164. An open steel lattice framework 708 including a plurality of contiguous lateral metal rods 710 is integrated within the bottom opening of the exhaust hood 692 bounded by the exterior facing peripheral rim dimensioned with an open steel lattice framework 708 surface area of at least 84 inches×76 inches. The exhaust hood 692 and metal ceiling ladder mount 700 can be manufactured with any one of the metals selected from the group comprising, stainless steel, aluminum, copper, iron, cast iron, or any combination thereof.

The plurality of contiguous lateral metal rods 710 (not shown) of the open steel lattice framework 708 is configured symmetrically aligned a distance apart from each other in rows extending from the first lateral facing rim wall 670, the second lateral facing rim wall 672 of the entirety of the open steel lattice framework 708 wherein the circumferential top opening of the exhaust hood 692 is fluidly connected to a metal exhaust hood conduit 706 having a first conduit opening $\mathbf{706}^1$ and a second conduit opening $\mathbf{706}^2$ wherein the first conduit opening $\mathbf{706}^1$ is fluidly connected to a vacuum generator motor 714 configured with 1500 cubic feet per minute wherein the vacuum generator motor provides a predetermined force of airflow in fluid communication with the open steel lattice framework 708 configured to generate a predetermined vacuum pull therethrough the open steel lattice framework 708, wherein the second conduit opening $\mathbf{706}^2$ is fluidly connected to an interface 715, for example a window opening to an outside environment, delivering a stream of hot air into the outside environment. The vacuum generator motor 714 is operationally connected to an "ON"/"OFF" operation switch 716, wherein the predetermined vacuum pull is purged therethrough the open steel lattice framework 708 when the vacuum generator motor 714 is in an "ON" operation mode, and the predetermined vacuum pull is ceased when the vacuum generator motor 714 is in an "OFF" operation mode to enable pull of hot air being emitted from the 380° F. heated liquid gel $\mathbf{40}^{380}$ of the metal gel basin 36.

In an exemplary embodiment of the gel infused pliant foam core body $\mathbf{52}^{GFB}$ a quick reference code 718 is imprinted thereon a surface of gel infused pliant foam core body 52 by implementing a laser writer, including a H-Track $CO_2$ Laser Writer, a Delta UV Laser Writer, or an IBM $CO_2$ Laser Writer commercially available from Hartnett company, at H-Track CO2 Laser Writer-RW Hartnett Company wherein upon opening the quick reference code with a smart phone a patent number, or a patent application number, or a trademark registration number identified with the rotary drum system for the formation of a gel infused pliant foam body 10 and/or the gel infused pliant foam core body $\mathbf{52}^{GFB}$.

FIGS. 15A-15E depicts a diagrammatic representation in process flow diagrams of the process steps of a method 1000, including the process steps 1001-1056 for operation of the rotary drum system for the formation of a gel infused pliant foam body 10 producing a gel infused pliant foam core body $\mathbf{52}^{GI}$ including Steps 1-29, designated numerical at 1001-1056 according to an embodiment of the present invention.

The method 1000 for operation of the rotary drum system for the formation of a gel infused pliant foam body 10 producing a gel infused pliant foam core body includes the steps, comprising:

Step 1. 1001 providing the rotary drum system for the formation of the gel infused pliant foam body 10;

Step 2. 1002 providing any one of the gel pliant foam core body $\mathbf{52}^1$ of the plurality of pliant foam core bodies $\mathbf{52}^{1+N}$;

Step 3. 1004 rotating the first handle 426 of the first gripping effector 422 of the dual gripping effector 420 counterclockwise about the first shaft top header $\mathbf{428}^H$ of the first all-thread 428 and, simultaneously, rotating the third handle 450 of the second gripping effector 426 of the dual gripping effector 420 in a counterclockwise direction causing the opening of the first gripping jaw 440 of the dual gripping effector 420 away from the circumferential metal drum casing 386 along the first longitudinal length $L^1$ of the rotary drum 200 causing the first gap 201 between the first gripping jaw 440 and the rotary drum 200;

Step 4. 1006 feeding the leading end $52^1$ of the gel pliant foam core body 52 into the first gap 201 between the first gripping jaw 440 and the rotary drum 200 along an entirety of the first longitudinal length $L^1$ of the rotary drum 200;

Step 5. 1008 mounting the pliant foam core body 52 thereupon the rotary drum 200 oriented with the series of the plurality of extended cubes $132^{1+N}$ facing in an upright direction wherein the bottom flat surface of the bottom pliant foam core body portion 122 is in immediate contact with the circumferential metal drum casing 386 of the rotary drum 200;

Step 6. 1010 rotating the first handle 426 of the first gripping effector 422 about the first shaft top header $468^H$ of the first elongated shaft 468 of the first all-thread 428 in a clockwise direction to actuating the first gripping jaw 440 of the dual gripping effector 420 to move in the upward direction towards the circumferential metal drum casing 386 of the rotary drum 200 and synchronously rotating the third handle 450 of the second gripping effector 446 of the dual gripping effector 420 about the third shaft top header $494^H$ of the third elongated shaft 494 third all-thread 452 in a counterclockwise direction actuating the movement of the first gripping jaw 440 of the dual gripping effector 420 in the upward direction towards the circumferential metal drum casing 386 of the rotary drum 200 causing a clockwise rotation of the first handle 426 about the first shaft top header $468^H$ of the first elongated shaft 468 of the first all-thread 428 causing the first all-thread 428 to move upward having the first compression spring 430 compress and shorten and in synchrony therewith rotating the third handle 450 counterclockwise about the third shaft top header $494^H$ of the third elongated shaft 494 of the third all-thread 452 causing the third all-thread 452 to move upward having the third compression spring 454 compress and shorten causing the first gipping jaw 440 moves in the upward direction towards the circumferential metal drum casing 386 of the rotary drum 200 operably closing the first gap 201 between the first gripping jaw 440 and the circumferential metal drum casing 386 of the rotary drum 200 while gripping the leading end $52^L$ of the pliant foam core body 52 removably retained therebetween the first gripping jaw 440 and the circumferential metal drum casing 386 of the rotary drum 200;

Step 7. 1012 rotating the second handle 432 of the first gripping effector 422 about the second shaft top header $478^H$ of the second all-thread 434 such that a clockwise rotation of the second handle 432 about the second shaft top header $478^H$ of the second elongated shaft 478 of the second all-thread 434 causes the second all-thread 434 to move in the downward direction having the second compression spring 436 relax and lengthen and in synchrony therewith a counterclockwise downward movement of the fourth handle 456 about the fourth shaft top header $506^H$ of the fourth elongated shaft 506 fourth all-thread 458 causes the fourth all-thread 458 to move in the downward direction having the fourth compression spring 460 relax and lengthen whereby the second gripping jaw 442 moves in the downward direction in a range of 0.50 inch to 5.00 inches distance measured away from the circumferential metal drum casing 386 of the rotary drum 200 forming a second gap 203 in a range of 0.50 inch to 5.00 inches between the second gripping jaw 442 and the circumferential metal drum casing 386 of the rotary drum 200;

Step 8. 1014 feeding the trailing end $52^T$ of the pliant foam core body 52 into the second gap 203 between the second gripping jaw 442 and the circumferential metal drum casing 386 of the rotary drum 200 whereby the pliant foam core body 52 being wrapped about the rotary drum 200 maintaining the bottom flat surface of the bottom pliant foam core body portion 122 being in immediate contact with the circumferential metal drum casing 386 of the rotary drum 200 having the plurality of extended cubes $132^{1+N}$ being in an upright facing position;

Step 9. 1016 rotating simultaneously the second handle 432 of the first gripping effector 422 in a counterclockwise direction and synchronously rotating the fourth handle 456 of the second gripping effector 446 in a clockwise direction causing the upward movement of the second gripping jaw 442 of the dual gripping effector 420 against the trailing end $52^T$ of the pliant foam core body 52 thereby causing closing of the second gap 203 between the second gripping jaw 442 and the rotary drum 200 causing the trailing end $52^T$ of the pliant foam core body 52 to be removably gripped between the second gripping jaw 442 and the rotary drum 200;

Step 10. 1018 adjusting the temperature controller 98 operatively electrically connected to the planar heater device 92 within a range of 380° F.-400° F. thereby pre-heating the metal gel basin 36;

Step 11. 1020 maneuvering, simultaneously, the first valve 88 of the first tributary gel supply pipe 74 to be parallel to the first tributary gel supply pipe 74 and maneuvering the second valve 90 of the second tributary gel supply pipe 76 to be parallel to the second tributary gel supply pipe 76 of the dual gel supply pipe system 66 causing the opening of the first valve 88 and the second valve 90 of each of the first tributary gel supply pipe 74 and the second tributary gel supply pipe 76, respectively, fluidly connected to the gel supply well 68 causing the dual steam of the first stream of gel $40^1$ and the second stream of gel $40^2$ to enter into the metal gel basin 36 of the gel heating metal table 12 reaching the predetermined volume of gel 40 wherein control of the flow of the first stream of gel $40^1$ therethrough the first tributary get supply pipe 74 being controlled by the first valve 88 operationally configured on the first tributary gel supply pipe 74 and the second stream of gel $40^2$ being controlled by the second valve 90 operationally configured on the second tributary gel supply pipe 76 proximate to the get supply well 68 thereby providing the dual stream of gel $40^{1-2}$ being propelled by the variable frequency drive pump 720 to enter the metal get basin 36 allowing the get to reach the predetermined volume of gel 40 indicated by a metal measurement bar 722 disposed on an interior surface of the four upright perimetric metal walls 44, 46, 48, 50, of the metal gel basin 36;

Step 12. 1022 simultaneously maneuvering the first valve 88 of the first tributary gel supply pipe 74 to be perpendicular to the first tributary supply pipe 74 and maneuvering the second valve 90 of the second valve 90 of the second tributary supply pipe 76 to be perpendicular to the second tributary gel supply pipe 76 causing the closing of the first valve 88 of the first tributary gel supply pipe 74 and causing the closing the second valve 90 of the second tributary gel supply pipe 76 of the dual get supply pipe system 66 of the gel supply well 68 causing the dual stream of gel $\mathbf{40}^{1\text{-}2}$ of the first stream of gel $\mathbf{40}^{1}$ and the second stream of gel $\mathbf{40}^{2}$ to cease entering the metal gel basin 36 of the gel heating metal table 12;

Step 13. 1024 adjusting the temperature controller operatively electrically connected to the planar heater device 92 to 380° F. maintaining a 380° F. heated liquid gel $\mathbf{40}^{380}$ of the gel bath 42 contained therein the metal gel basin 36;

Step 14. 1026 turning the vacuum generator motor 714 to an "ON" operation mode by way of the ON"/"OFF" operation switch 716 providing the vacuum pulling force enabling rising hot air being emitted from the 380° F. heated liquid gel $\mathbf{40}^{380}$ bath within the metal gel basin 36 to flow therethrough the open steel lattice framework 708 of the bottom opening of the exhaust hood 692 therethrough first conduit opening $\mathbf{706}^{1}$ fluidly connected to the vacuum generator motor 714 and the second conduit opening $\mathbf{706}^{2}$ of the metal exhaust hood conduit 706 fluidly connected to the interface 715 delivering a stream of hot air into an outside environment;

Step 15. 1028 turning the down-control knob 293 of the dual direction rack and pinion actuator 291 causing the rotary drum 200 having the pliant foam core body 52 mounted and gripped thereon to move in the downward vertical direction into the 380° F. heated liquid gel $\mathbf{40}^{380}$ of the gel bath 42 contained therein the metal gel basin 36 of the gel heating metal table 12 wherein at the predetermined depth the gel position sensor 628 touching on the top surface of the 380° F. heated liquid gel $\mathbf{40}^{380}$ halts the downward vertical movement of the rotary drum 200 preventing the unwanted retention of the influent of the 380° F. heated liquid gel $\mathbf{40}^{380}$ upon the plurality of extended cubes $\mathbf{132}^{1+N}$ N of the pliant foam core body 52;

Step 16: 1030 actuating the on switch of the rotary drum motor single speed actuator 630 of the rotary drum motor 516 causing the rotation of the rotary drum 200 within the predetermined depth of the hot liquid gel bath 42 within the metal gel basin 36 in a single 360° rotation approximated at 1.25-1.75 revolutions per minute (rpm) facilitating forming a hydrophobic gel barrier of a predetermined thickness on the outer peripheral surfaces of each of the plurality of extended cubes $\mathbf{132}^{1+N}$ and on the outlying surfaces of each of the plurality of recessed channels $\mathbf{134}^{1+n}$ while retaining the top pliant core body portion 120 of the pliant foam core body 52 to be untouched by the 380° F. heated liquid gel $\mathbf{40}^{380}$ thereby forming a heated gel-infused pliant foam core body $\mathbf{52}^{GI}$;

Step 17. 1032 turning the up-control knob of the dual direction rack and pinion actuator 291 causing the rotary drum 200 having the heated gel-infused pliant foam core body $\mathbf{52}^{GI}$ mounted and gripped thereon to move in the upward vertical direction causing the heated gel-infused pliant foam core body $\mathbf{52}^{GI}$ being lifted out from the 380° F. heated liquid gel $\mathbf{40}^{380}$ of the gel bath 42;

Step 18. 1034 actuating the off switch of the rotary drum motor single speed actuator 630 of the rotary drum motor 516 causing the rotation of the rotary drum 200 to halt;

Step 19. 1036 rotating the first handle 426 of the first gripping effector 422 in the counterclockwise direction and, synchronously, rotating the third handle 450 of the second gripping effector 446 in a clockwise direction causing the opening of the first gripping jaw 440 away from the circumferential metal drum casing 386 of the rotary drum 200 opening the first gap 201 between the first gripping jaw 440 of the dual gripping effector 420 and the rotary drum 200 releasing the leading end $\mathbf{52}^{L}$ of the heated gel pliant foam core body $\mathbf{52}^{GI}$ from the first gripping jaw 440;

Step 20. 1038 maneuvering the leading end $\mathbf{52}^{L}$ of the heated gel pliant foam core body $\mathbf{52}^{GI}$ away from the rotary drum 200 positioning the heated gel infused pliant foam core body $\mathbf{52}^{GI}$ having the plurality of heated gel extended cubes $\mathbf{132}^{H1+N}$ facing in an upright direction wherein the bottom flat surface of the heated gel pliant foam core body $\mathbf{52}^{GI}$, is in immediate contact with the top anti-static high temperature mat 640 of the top plate $\mathbf{630}^{TP}$ of the heated gel infused pliant foam core body lift 314;

Step 21. 1040 rotating the second handle 432 of the first gripping effector 422 in a clockwise direction and the synchronously rotating the fourth handle 456 of the second gripping effector 446 in a counterclockwise direction causing the opening of the second gripping jaw 442 opening the second gap 203 between the second gripping jaw 442 and the circumferential metal drum casing 386 of the rotary drum 200 thereby releasing the trailing end $\mathbf{52}^{T}$ of the heated gel pliant foam core body $\mathbf{52}^{GI}$ from the second gripping jaw 442;

Step 22. 1042 maneuvering the trailing end $\mathbf{52}^{T}$ of the heated gel pliant foam core body $\mathbf{52}^{GI}$ away from the rotary drum 200 positioning the heated gel infused pliant foam core body $\mathbf{52}^{GI}$ extending from the leading end $\mathbf{52}^{L}$ to the trailing end $\mathbf{52}^{T}$ having the plurality of heated gel extended cubes $\mathbf{132}^{H1+N}$ facing in an upright direction wherein the bottom flat surface of the heated gel pliant foam core body $\mathbf{52}^{GI}$ portion is in immediate contact with the top anti-static high temperature mat 640 of the top plate $\mathbf{630}^{TP}$ of the heated gel infused pliant foam core body lift 314;

Step 23. 1044 placing the heated gel pliant foam core body $\mathbf{52}^{GI}$ in a level prone position having the plurality of heated gel plurality of extended cubes $\mathbf{132}^{H1+N}$ facing in the upright direction being supported by the heated gel infused pliant foam core body $\mathbf{52}^{GI}$ resting and transport table 316 allowing the heated gel pliant foam core body $\mathbf{52}^{GI}$ to rest for at least three minutes allowing the heated gel to cure so that each of the exterior cube surfaces of the plurality of extended cubes $\mathbf{132}^{1+N}$ and the outlying surfaces of each of the plurality of recessed channels $\mathbf{134}^{1+n}$ of the pliant foam core body 52 is infused with 380° F. heated liquid gel $\mathbf{40}^{380}$ to a predetermined gel thickness to create the hydrophobic gel barrier over each of the exterior cube surfaces of each of the plurality of extended cubes $\mathbf{132}^{1+N}$ of the series of the plurality of extended cubes $\mathbf{132}^{1+n}$ and outlying surfaces of each of the plurality of recessed channels $\mathbf{134}^{1+n}$ to form a heated gel infused pliant foam core body $\mathbf{52}^{GI}$;

Step 24. 1046 maintaining the heated gel infused pliant foam core body $\mathbf{52}^{GI}$ in a level prone position for at least three minutes at ambient temperature allowing the 380° F. heated liquid gel 40$^{380}$ to cure forming a gel infused pliant foam core body 52$^{GFB}$;

Step 25. 1048 repeating steps 1-24 until a predetermined number of gel infused pliant foam core bodies 52$^{GI}$ are formed;

Step 26. 1050 ejecting remnant gel from the metal gel basin 36 therethrough the first gel supply inlet port 78 and the second gel supply pipe inlet port 80 by injecting oil 728 into the metal gel basin 36 by way of one or more portable silicone double ply discharge hoses 730$^{1+n}$ wherein a first end of a first portable silicone double ply discharge hose 730$^{1}$ is removably attached to a first receiving port of an oil container 732 activated by an oil pump 734 and the second end of the first portable silicone double ply discharge hose 730$^{1}$ is removably attached to the first gel supply inlet port 78 wherein a first end of a second portable silicone double ply discharge hose 730$^{2}$ is removably attached to the second gel supply pipe inlet port 80 and the second end of the second portable silicone double ply discharge hose 730$^{2}$ is removably attached to a second receiving port of the oil container 732 activated by the oil pump 734 wherein when activated remnant gel 736 is ejected and disposed into a transportable rubber bin 738;

Step 27. 1052 rolling the gel heating metal table cover 100 onto the first roller track 26 and the second roller track 27 of the gel heating metal table 12 thereby enclosing the metal gel basin 36 of the gel heating metal table 12;

Step 28. 1054 securing the heated gel infused pliant foam core body resting and transport cover 318 onto the removable perforated rigid silicone non-slip tabletop 656 of the heated gel infused pliant foam core body resting and transport table 316 wherein the heated gel infused pliant foam core body resting and transport cover 318 is a fiberglass fire blanket; and Step 29. 1056 providing an imprint of a trademark specimen characterized with a color selected from any one of the group of colors comprising white, blue, and orange and imprinting the gel infused pliant foam core body with the imprint.

In another exemplary embodiment of the present invention, as depicted in a block diagram in FIGS. 16A-16E, a kit 900 is disclosed, the kit, comprising:

a rotary drum system for the formation of a gel infused pliant foam body 10; a gel heating metal table 12; a gel heating metal table cover 100; a gel heating metal table cover weighted rubber mat 118; a plurality of pliant foam core bodies 52$^{1+N}$; an overhead double-beam bridge crane 140; a rotary drum anchorage conveyor frame 190; a rack and pinion motor 290; a rotary drum 200; a rotary drum motor 516; a dual gripping effector 420; a gel position sensor 628; an exhaust hood 692; a heated gel infused pliant foam core body lift 314; a plurality of top anti-static high temperature mat 640; a heated gel infused pliant foam core body resting and transport table 316; a dual gel supply pipe system 66; a gel extruder system 70; a gel subscription for recurring delivery 902; a pliant foam core body subscription for recurring pliant foam core body delivery service 904; a gel foam core body system instruction manual 906 including a quick reference code 908 to access a manufacturer's instructions 910; a warranty 912; contact information 914; ion-intercalated MXene film subscription 916 for recurring delivery; a plurality of bolted column end cap plates 154$^{1+N}$; a plurality of I-beam end plates 166$^{1+N}$; a plurality of 90° cast aluminum channel joiner fitting connectors 208$^{1+N}$; a plurality of steel double joist holders 238$^{1+N}$; a plurality of plain push trolleys 256$^{1+N}$ being rivet locked; a plurality of iron face plates 236$^{1+N}$; a plurality of wheels 110, 112, 114, 116, adapted for the gel heating metal table cover 100; a plurality of 360° swivel wheels 678, 680, 682, 684, adapted for the heated gel infused pliant foam core body resting and transport table 316; a plurality of gripping effectors 420$^{1+N}$; a plurality of rolled steel square tubing 512; a plurality of rack and pinion drive chains 326$^{1+N}$; a plurality of first rotary drum drive chains 614; a plurality of second rotary drum drive chains 624; a plurality of sprockets 606, 618, 610, 622; a plurality of trunnions 522$^{1+N}$; a plurality of drive shaft center support bearings 594$^{1+N}$; a plurality of differential pilot bearings 598$^{1+N}$; a plurality of hook connectors 376$^{1+N}$; a plurality of carabiner snap clips 374$^{1+N}$; a plurality of rotary drum cylindrical drive axle 524$^{1+N}$, 600$^{1+N}$; a plurality of bolted flanged metal face plate 356$^{1+N}$; a plurality of I-beam end plates 166$^{4}$; a plurality of stainless steel square plate eye hook 354$^{1+N}$; quick reference code 908 label including intellectual property identifying registration numbers, or serial numbers, or certificate numbers, comprising any one of the group of intellectual property patents, trademarks, and copyright; Occupational Safety and Health Administration (OSHA) guidelines 918 for the planar heater device 92 and for the gel heating metal table 12; and gel product information sheets 920.

All of the features disclosed, claimed, and incorporated by reference herein, and all of the steps of any method or process so disclosed, may be combined in any combination, except combinations where at least some of such features and/or steps are mutually exclusive. Each feature disclosed in this specification may be omitted or replaced by alternative features serving the same, equivalent or similar purpose, unless expressly stated otherwise. Certain features may sometimes be used to advantage without a corresponding use of other features. Thus, unless expressly stated otherwise, each feature disclosed is an example only of a generic series of equivalent or similar features. Inventive aspects of this disclosure are not restricted to the details of the foregoing embodiments, but rather extend to any novel embodiment, or any novel combination of embodiments, of the features presented in this disclosure, and to any novel embodiment, or any novel combination of embodiments, of the steps of any method or process so disclosed.

Although specific examples have been illustrated and described herein, it will be appreciated by those of ordinary skill in the art that any arrangement calculated to achieve the same purpose could be substituted for the specific examples disclosed. This disclosure is intended to cover adaptations or variations of the present subject matter. Applicants intend to embrace all such alternatives, modifications, equivalents, and variations that are within the spirit and scope of the exemplary embodiments. Therefore, it is intended that the invention be defined by the attached claims and their legal equivalents, as well as the illustrative aspects. The above-described embodiments are merely descriptive of its principles and are not to be considered limiting. Further modifications of the invention herein disclosed will occur to those skilled in the respective arts and all such modifications are deemed to be within the scope of the inventive aspects.

What is claimed is:

1. A rotary drum system for formation of a gel infused pliant foam body, comprising:

a gel heating metal table;
a gel heating metal table cover;
a plurality of pliant foam core bodies;
an overhead double-beam bridge crane;
a rotary drum anchorage conveyor frame;
a rack and pinion motor;
a rotary drum;
a rotary drum motor;
a dual gripping effector;
a gel position sensor;
a timer;
an exhaust hood;
a heated gel infused pliant foam core body lift;
a heated get infused pliant foam core body resting and transport table;
the gel heating metal table, comprising:
a metal table structure having a rectangular shape configured with a multi-metal composite supported by four insulated metal columns including a first front insulated table metal column, a second front insulated table metal column, a first back insulated table metal column, a second back insulated table metal column, a flat metal table peripheral rim, a flat metal table bottom, a front facing flat metal wall, a rear facing flat metal wall, a first lateral flat metal side wall, an opposing second lateral flat metal side wall, wherewith a metal gel basin is formed therein;
wherein the first lateral flat metal side wall includes a first roller track configured with a first track depth and a first track width, and the opposing second lateral flat metal side wall includes a second roller track configured with a second track depth and a second track width equal to the first track depth and the first track width;
wherein the metal gel basin includes a cavity to contain a predetermined volume of gel incorporated in a gel bath, wherein the metal gel basin is configured with a metal gel basin floor supported by a metal gel basin bottom wall bound by four upright perimetric metal walls providing a peripheral top metal rim to the metal gel basin, the four upright perimetric metal walls including a front interior facing metal gel basin wall, a rear interior facing metal gel basin wall, and two interior lateral facing metal gel basin
walls, a first interior lateral metal gel basin side wall and a second interior lateral metal gel basin side wall enclosing the gel in the gel bath wherein the cavity is configured with a cavity opening dimensioned to receive any one of a pliant foam core body of the plurality of pliant foam core bodies circumferentially mounted on the rotary drum;
wherein the metal gel basin bottom wall of the metal gel basin of the gel heating metal table includes a multi-layered composite core configured therein with a non-naturally occurring ion-intercalated Mxene film, wherein the multilayered composite core includes a superior composite and an inferior composite configured with the non-naturally occurring ion-intercalated Mxene film layered therebetween the superior composite and the inferior composite of the multilayered composite core of the metal gel basin to provide enhanced electrical conductivity to the metal gel basin floor;
wherein the superior composite of the multilayered composite core of the metal gel basin bottom wall includes three layers, a first layer including a superior stainless steel plate, a second layer including a superior ultra-high-temperature ceramic plate, a third layer including a superior copper sheet wherein each of the superior stainless steel plate and the superior ultra-high-temperature ceramic plate, and the superior copper sheet are each dimensioned with an equal surface area having an equal square footage;
wherein the superior stainless steel plate is disposed having an exterior facing superior stainless steel wall and an interior facing superior stainless steel wall wherein the exterior facing superior stainless steel wall having a first surface area is configured being positioned to provide an entire surface area of the metal gel basin floor of the metal gel basin of the gel heating metal table to generate thermoconductive stability to the metal gel basin floor as the gel is being heated to 380° F. within the metal gel basin of the gel heating metal table;
wherein the inferior composite of the metal gel basin bottom wall includes three layers, a first layer including an inferior stainless steel plate, a second layer including an inferior ultra-high-temperature ceramic plate, a third layer including an inferior copper sheet, wherein each of the inferior stainless steel plate wherein the inferior ultra-high-temperature ceramic plate, and the inferior copper sheet are each dimensioned with an equal surface area having equal square footage;
wherein the inferior stainless steel plate is disposed having an exterior facing inferior stainless steel wall and an interior facing inferior stainless steel wall wherein the exterior facing inferior stainless steel wall is disposed facing and parallel to a floor of an industrial work area where the rotary drum system for the formation of the gel infused pliant foam body is being operated and housed;
wherein the non-naturally occurring ion-intercalated Mxene film can be selected from the group of a non-naturally occurring ion-intercalated Mxene film comprising: a non-naturally occurring copper (Cu) ion-intercalated Mxene film and a non-naturally occurring aluminum (AL) ion-intercalated Mxene film;
a dual gel supply pipe system, including a gel supply well, a gel extruder system, a main gel supply pipe, a first tributary gel supply pipe, and a second tributary gel supply pipe operationally fluidly connected to provide a dual stream of gel to the metal gel basin of the gel heating metal table regulated by a variable frequency drive pump configured within the gel supply well being actuated by an ON-OFF operating mode switch operationally electrically connected to an electrical power supply;
wherein a first gel supply pipe inlet port is disposed at a central portion of the front facing flat metal wall of the gel heating metal table therethrough the front interior facing metal gel basin wall of the metal gel basin configured compatible with the first tributary gel supply pipe fluidly connected to the main gel supply pipe fluidly connected to the gel supply well fluidly connected to the gel extruder system to enable a first stream of gel to flow into the metal gel basin therethrough the first gel supply pipe inlet port of the metal gel basin and a second gel supply pipe inlet port is disposed at a central portion of the rear facing flat metal wall of the gel heating metal table therethrough the rear interior facing metal gel basin wall of the metal gel basin configured compatible with the second tributary gel supply pipe fluidly connected to the main gel supply pipe fluidly connected to the gel supply well fluidly connected to the gel extruder system to enable a second stream of gel to flow into the metal gel basin therethrough the second gel supply pipe inlet port disposed at the central portion of the rear facing flat metal wall of the metal gel basin;

wherein the first tributary gel supply pipe and the second tributary gel supply pipe facilitates simultaneous passing of the first stream of gel and the second stream of gel to flow from the front interior facing wall to the rear interior facing metal gel basin wall of the metal gel basin at a speed of flow to create turbulence to mix the gel within the metal gel basin and to maintain a homeostasis of a 380° F. heated liquid gel streamed therein the metal gel basin wherein control of a flow of the first stream of gel therethrough the first tributary gel supply pipe being controlled by a first valve operationally configured on the first tributary gel supply pipe and wherein control of a flow of the second stream of gel therethrough the second tributary gel supply pipe is controlled by a second valve operationally configured on the second tributary gel supply pipe proximate to the main gel supply pipe;

an at least one planar heater device including two electrodes being electrically conductive is connected to the electrical power supply byway of an electrical conduit wherein the electrical conduit is insulated in a non-electric conductive ultrahigh molecular weight polyethylene tube wherein the at least one planar heater device is mounted externally to an exterior surface of the flat metal table bottom of the gel heating metal table by which a controlled temperature is generated to enable a flow and transfer of heat to the metal gel basin bottom wall therethrough to the metal gel basin floor of the metal gel basin by way of thermal conduction whereby a controlled temperature is regulated by a temperature controller operatively electrically connected to the at least one planar heater device;

the gel heating metal table cover is manufactured with a steel plate welding table top cover configured with a at least six solid 10-gauge cover panels having a top steel wall, a bottom steel wall, a first steel side wall, and a second steel side wall wherein the first steel side wall includes two peripheral metal wheels, a first front peripheral metal wheel and a first rear peripheral metal wheel wherein the first front peripheral metal wheel and the first rear peripheral metal wheel axially aligned wherein each of the first front peripheral metal wheel and the first rear peripheral metal wheel are configured with a first wheel depth and first wheel width capable of being rollably inserted therein the first roller track of the gel heating metal table, and the second steel side wall includes two peripheral metal wheels including a second front peripheral metal wheel and a second rear peripheral metal wheel axially aligned wherein the second front peripheral metal wheel is configured with a second wheel depth and a second wheel width capable of being rollably inserted therein the second roller track of the gel heating metal table such that the gel heating metal table cover can be rolled-on in a forward motion to cover the metal get basin of the get heating metal table wherein when the get heating metal table is not in use and can be rolled-off in a reverse direction to uncover the metal gel basin wherein when the metal gel basin of the get heating metal table is in use;

wherein the gel heating metal table cover includes a removeable weighted rubber mat to safeguard a user against touching a heated surface of the gel heating metal table;

the pliant foam core body having a leading end and a trailing end wherein the pliant foam core body is capable of circuitous bending into a circumferential shape having a pliant foam core body thickness, a pliant foam core body length, and a pliant foam core body width, a pliant foam core body square footage, a top pliant foam core body portion and a bottom pliant foam core body portion wherein the top pliant foam core body portion and bottom pliant foam core body portion being porous and joined by two lateral porous side walls, a first lateral porous side wall and an opposing second lateral porous side wall and two longitudinal porous side walls, a front longitudinal porous side wall, and a rear longitudinal porous side wall wherein the top pliant foam core body portion includes a first square footage and the bottom pliant foam core body portion includes a second square footage wherein the second square footage is equal to the first square footage of the top pliant foam core portion of the pliant foam core body;

wherein a series of a plurality of extended cubes are configured within the top pliant core body portion of the pliant foam core body wherein each of the plurality of extended cubes of the series of the plurality of extended cubes are configured equally sized and being symmetrically disposed an equal distance from each other aligned in a plurality of rows and a plurality of columns interconnected by a plurality recessed channels bordered by an adjourned peripheral rim, wherein each of the plurality of extended cubes is configured with an exterior cube surface, a cube thickness which is less than the thickness of the pliant foam core body and wherein the bottom pliant foam core body portion includes a thickness less than the cube thickness;

the overhead double-beam bridge crane, comprising:

four upright metal box columns, a first upright metal box column, a second upright metal box column, a third upright metal box column, a fourth upright metal box column, a first metal link beam, a second metal link beam, wherein a front end of the first metal link beam is fixedly attached to a top end of the first upright metal box column by way of a first bolted column end cap plate and a rear end of the first metal link beam is fixedly attached to a top end of the third upright metal box column byway of a second bolted column end cap plate, wherein a front end of the second metal link beam is fixedly attached to a top end of the second upright metal box column by way of a third bolted column end cap plate and a rear end of the second metal link beam is fixedly attached to a top end of the fourth upright metal box column byway of a fourth bolted column end cap plate;

two I-beam bridges including a front I-beam bridge and a rear I-beam bridge positioned a predetermined distance apart and parallel to each other fixedly attached oriented oligomeric to the first metal link beam and the second metal link beam;

a first end of the front I-beam bridge is fixedly attached by way of a first bolted I-beam end plate to a first end stop disposed at the front end of the first metal link beam and an opposing second end of the front I-beam bridge is fixedly attached to a second end stop disposed at the front end of the second metal link beam by way of a second bolted I-beam end plate, a first end of the rear I-beam bridge is fixedly attached to a third end stop disposed at the rear end of the first metal link beam by way of a third bolted I-beam end plate and an opposing second end of the rear I-beam bridge is fixedly connected to a fourth end stop disposed at the rear end of the second metal link beam by way of a fourth bolted I-beam end plate whereby a unified major framed open space is circumscribed to abide the rotary drum;

the rotary drum anchorage conveyor frame to support the rotary drum, comprising:

a lower conveyor frame and an upper conveyor frame fixedly joined coplanar to each other configured having a rectangular shaped structure being disposed in a transverse plane whereby a unified minor framed open space is circumscribed within the unified major framed open space wherein a unified duple framed open space is formed to abide for the rotary drum;

wherein the lower conveyor frame of the rotary drum anchorage conveyor frame and the upper conveyor frame of the rotary drum anchorage conveyor frame includes a conjunct frame;

wherein the conjunct frame includes a front joist and a rear joist being horizontally oriented a parallel distance from each other, a first lateral side joist, an opposing second lateral side joist being perpendicularly oriented relative to the front joist and the rear joist, respectively;

wherein the front joist and the rear joist are each fixedly attached to the first lateral side joist and the opposing second lateral side joist by way of four 90° cast aluminum channel joiner fitting connectors whereby four cast aluminum corners of the conjunct frame are formed;

wherein the lower conveyor frame includes a front cross bar, a rear cross bar, and four lower support posts vertically oriented, including a first lower support post, a second lower support post, a third lower support post, and a fourth lower support post configured with corresponding four lifting masts being vertically oriented, including a first lifting mast, a second lifting mast, a third lifting mast, and a fourth lifting mast wherein the front cross bar and the rear cross bar being horizontally oriented a distance apart from each other such that the front cross bar is a first vertical distance plumb to the front joist of the conjunct frame and the rear cross bar is a second vertical distance plumb to the rear joist of the conjunct frame;

wherein the first lower support post of the lower conveyor frame is fixed vertically aligned to the first overhead metal post of the upper conveyor frame, wherein the first lower support post includes a superior end and an inferior end wherein the inferior end of the first lower support post is fixedly bolted immediate to a first end of the front cross bar of the lower conveyor frame by way of a first iron face plate wherein the superior end of the first lower support post is a first unfixed end with at least one foot of freedom relative to the first overhead metal post of the upper conveyor frame allowing the lower conveyor frame to be lifted and lowered relative to the upper conveyor frame by way of the first rack and pinion gear system of the rack and pinion gear system thereby enabling the rotary drum to be lifted and lowered into the gel bath contained therein the metal get basin of the get heating metal table;

wherein the second lower support post of the lower conveyor frame is fixed congruent to the second overhead metal post of the upper conveyor frame, wherein the second lower support post includes a superior end and an inferior end wherein the inferior end of the second lower support post is fixedly bolted immediate to the second end of the front cross bar of the lower conveyor frame by way of a second iron face plate wherein the superior end of the second lower support post is a second unfixed end with at least one foot of freedom relative to the second overhead metal post of the upper conveyor frame allowing the lower conveyor frame to be lifted and lowered relative to the upper conveyor frame by way of the second rack and pinion gear system synchronously with the first rack and pinion gear system;

wherein the third lower support post of the lower conveyor frame is fixed congruent to the third overhead metal post, wherein the third lower support post includes a superior end and an inferior end wherein the inferior end of the third lower support post is fixedly bolted to a first end of the rear cross bar of the lower conveyor frame by way of a third iron face plate wherein the superior end of the third lower support post is a third unfixed end with at least one foot of freedom relative to the third overhead metal post of the upper conveyor frame allowing the lower conveyor frame to be lifted and lowered relative to the upper conveyor frame by way of the third rack and pinion gear system synchronously with the first rack and pinion gear system and the second rack and pinion thereby enabling the rotary drum to be lifted and lowered into the gel bath contained therein the metal gel basin of the gel heating metal table;

wherein the fourth lower support post of the lower conveyor frame is fixed congruent to the fourth overhead metal post of the upper conveyor frame, where the fourth lower support post includes a superior end and an inferior end wherein the inferior end of the fourth lower support post is fixedly bolted immediate to a second end of the rear cross bar of the lower conveyor frame by way of a fourth iron face plate wherein the superior end of the fourth lower support post is an unfixed end with at least one foot of freedom relative to the fourth overhead metal post of the upper conveyor frame allowing the lower conveyor frame to be lifted and lowered relative to the upper conveyor frame byway of the rack and pinion gear system thereby enabling the rotary drum to be lifted and lowered into the gel bath contained therein the metal gel basin of the gel heating metal table;

wherein the upper conveyor frame includes the four overhead metal posts which are vertically oriented, including the first overhead metal post, the second overhead metal post the third overhead metal post the fourth overhead metal post wherein the first overhead metal post of the upper conveyor frame includes a distal end and a proximal end wherein the distal end of the first overhead metal post is fixedly bolted to a first corresponding portion of the front I-beam bridge by way of a first plain push trolly having a first set of two cast iron wheels being rivet locked byway of welding a first pair of mounting button rivets to each side of the first plain push trolly to prevent movement of the first plain push trolley along the front I-beam bridge wherein the proximal end of the first overhead metal post is fixedly bolted to a first end of the front joist of the conjunct frame by way of a first steel to steel strong tie;

wherein, the second overhead metal post of the upper conveyor frame is positioned coaxial to the second lower support post of the lower conveyor frame, wherein a distal end of the second overhead metal post is fixedly bolted to a second corresponding portion of the front I-beam bridge byway of a second plain push trolley having a second set of two cast iron wheels being rivet locked byway of welding a second pair of mounting button rivets to each side of the second plain push trolly to prevent movement of the second plain push trolley along the front I-beam bridge and a proximal end of the second overhead metal post is fixedly bolted to a second end of the front joist of the conjunct frame by way of a second steel to steel strong tie;

wherein, the third overhead metal post is positioned coaxial to the third lower support post of the lower conveyor frame wherein a distal end of the third overhead metal post is fixedly bolted to a first corresponding portion of the rear I-beam bridge by way of a third plain push trolley having a third set of two cast iron wheels being rivet locked byway of welding a third pair of mounting button rivets to each side of the third plain push trolly to prevent movement of the third plain push trolley along the rear I-beam bridge and a proximal end of the third overhead metal post is fixedly bolted to a first end of the rear joist of the conjunct frame by way of a third steel to steel strong tie;

wherein the fourth overhead metal post is positioned coaxial to the fourth lower support post of the lower conveyor frame, wherein a distal end of the fourth overhead metal post is fixedly bolted to a second corresponding portion of the rear I-beam bridge by way of a fourth plain push trolley having a fourth set of two cast iron wheels being rivet locked by way of welding a fourth pair of mounting button rivets to each side of the fourth plain push trolly to prevent movement of the fourth plain push trolley along the rear I-beam bridge and a proximal end of the fourth overhead metal post is fixedly bolted to a second end of the rear joist of the conjunct frame by way of a fourth steel to steel strong tie;

wherein each of the four lifting masts of the lower conveyor frame, the first lifting mast, the second lifting mast, the third lifting mast, the fourth lifting mast is vertically oriented aligned adjacent to each of the four corresponding four lower support posts;

wherein the first lifting mast is integrated with a first rack and pinion gear system, the second lifting mast is integrated with a second rack and pinion gear system, the third lifting mast is integrated with a third rack and pinion gear system, and the fourth lifting mast is integrated with a fourth rack and pinion gear system;

wherein each of the rack and pinion gear systems includes, a lift carriage, a gear rack mechanically operative with a mateable pinion, mechanically operatively connected to a first lateral pinion axle and a second lateral pinion axle wherein each of the lift carriages includes the gear rack which is vertically telescopically oriented therein a first linear guide, and a second linear guide, of each of the lift carriages to engage with a plurality of gear rack teeth configured within each of the gear racks of each the lift carriages wherein each of the gear rack has an upward end and a downward end;

wherein each of the mateable pinions is configured with a plurality of pinion teeth circumferentially aligned around a pinion crown to enable an operable rotatable mesh between each of a corresponding plurality of gear rack teeth of each of the gear racks of each of the first rack and pinion gear system, the second rack and pinion gear system, the third rack and pinion gear system, the fourth rack and pinion gear system wherein each of the mateable pinions include a pinion borehole transversely configured therethrough each of the pinon crowns;

wherein each of the first lifting mast of the first lower support post, the second lifting mast of the second lower support post, the third lifting mast of the third lower support post, the fourth lifting mast of the fourth lower support post is integrated with a rack and pinion gear system including a first rack and pinion gear system, a second rack and pinion gear system, a third rack and pinion gear system, a fourth rack and pinion gear system, respectively;

wherein each of the rack and pinion gear systems includes, a lift carriage, a gear rack mechanically operative with a mateable pinion, mechanically operatively connected to a first lateral pinion axle and a second lateral pinion axle;

wherein each of the lift carriages includes a gear rack which is vertically telescopically oriented therein a first linear guide and a second linear guide of each of the lift carriages to engage with a plurality of gear rack teeth configured within each of the gear racks of the lift carriages wherein each of the gear rack has an upward end and a downward end;

wherein each of the mateable pinions is configured with a plurality of pinion teeth circumferentially aligned around a pinion crown to enable an operable rotatable mesh between each of a corresponding plurality of gear rack teeth of each of the gear racks of each of the first rack and pinion gear system, the second rack and pinion gear system, the third rack and pinion gear system, the fourth rack and pinion gear system wherein each of the mateable pinions include a pinion borehole transversely configured therethrough each of the pinon crowns;

wherein the first lateral pinion axle is positioned a first vertical plumb distance below and parallel to the first lateral side joist of the conjunct frame of the rotary drum anchorage conveyor frame and the second lateral pinion axle is positioned a second vertical plumb distance below and parallel to the opposing second lateral side joist of the conjunct frame of the rotary drum anchorage conveyor frame wherein the second vertical plumb distance is equal to the first vertical plumb distance;

wherein a first end of the first lateral pinion axle is rotationally coupled to a first pinion borehole of a first mateable pinion of a first gear rack of the first rack and pinion gear system integrated with the first lower support post and a second end of the first lateral pinion axle is rotationally coupled to a third pinion borehole of a third gear rack of the third rack and pinion gear system integrated with the third lower support post, and a first end of the second lateral pinion axle is rotationally coupled to a second pinion borehole of a second mateable pinion of a second gear rack of the second rack and pinion gear system integrated with the second lower support post and a second end of the second lateral axle is rotationally coupled to a fourth pinion borehole of a fourth mateable pinion of a fourth gear rack of the fourth rack and pinion gear system integrated with the fourth lower support post such that as the rotary drum is lowered and lifted wherein the first lateral pinion axle and the second lateral pinion axle synchronously causes the first mateable pinion and the third mateable pinion, the second mateable pinion and the fourth mateable pinion to rotate in unison enabling the operable rotatable mesh between each of a first plurality of pinion teeth of a first mateable pinion and a first plurality of gear rack teeth of the first gear rack of the first rack and pinion gear system, a second plurality of pinion teeth of a second mateable pinion and a second plurality of gear rack teeth of the second gear rack of the second rack and pinion gear system, a third plurality of pinion teeth of a third mateable pinion and a third plurality of gear rack teeth of the third gear rack of the third rack and pinion gear system, a fourth plurality of pinion teeth of a fourth mateable pinion and a fourth plurality of gear rack teeth of a fourth gear rack of the fourth rack and pinion gear system, in a vertical direction from each of the four gear racks downward end to each of their upward end or from each of the four gear racks upward end to each of their downward end;

wherein the rack and pinion motor in operation is implemented to lower the rotary drum in a downward vertical direction towards the metal gel basin of the gel heating lift-table and to lift the rotary drum in a reverse upward vertical direction away from the gel basin wherein the rack and pinion motor is controlled by a dual direction rack and pinion actuator having a down-control knob to cause the rotary drum to be lowered in a downward vertical direction into the gel bath within the metal gel basin and an up-control knob to control a reverse movement of an upward vertical direction to lift the rotary drum in a position away from the metal gel basin;

the rack and pinion motor includes a rack and pinion motor body permanently affixed on a rack and pinion motor support body wherein the rack and pinion motor support body includes a rack and pinion motor central support aperture wherein the rack and pinion motor body is permanently affixed to the front joist of the conjunct frame of the rotary drum anchorage conveyor frame proximate to the opposing second lateral side joist of the conjunct frame operationally connected to the second mateable pinion of the second gear rack of the second rack and pinion gear system;

wherein the rack and pinion motor includes a rack and pinion electrical gear box operably electrically wired to an electrical power source via a rack and pinion cable electrical cable concurrently operably electrically wired to a rack and pinion motor drive integrally connected to a first rack and pinion output shaft which is coaxial to a first rack and pinion axle wherein a terminal end of the first rack and pinion axle provides a first rack and pinion sprocket mount whereon a first rack and pinion sprocket is mounted thereon;

a rack and pinion actuating cylinder permanently bolted to the second lower support post proximate to the rack and pinion motor including a second rack and pinion output shaft which is coaxial to a second rack and pinion axle wherein a terminal end of the second rack and pinion axle provides a second rack and pinion sprocket mount whereon a second rack and pinion sprocket is mounted thereon wherewith a rack and pinion drive chain is operationally mechanically rotationally engages the first rack and pinion sprocket and the second rack and pinion sprocket wherein the first rack and pinion sprocket is guarded by a first rack and pinion actuating cylinder disc and the second rack and pinion sprocket is guarded by a second rack and pinion actuating cylinder disc;

four spring balancers to maintain a stable position of the rotary drum wherein each of the four spring balancers is configured with a fixed drum having an immobilized rotation, a rigid steel rigid steel wire rope having a pre-set distance of 1.5 meters, and a prone pull weight of 15-25 kg capacity range such that the rotary drum can be balanced in a posited plane parallel in relation to the metal gel basin of the gel heating metal table to prevent distortion of each of an infused gel layer on each of the pliant foam core body of the plurality of pliant foam core bodies;

wherein a first spring balancer includes a first end and a second end wherein the first end includes a first hook connector which is rigidly attached by way of a first bolted flanged metal face plate to a first corner of the front joist of the conjunct frame of the rotary drum anchorage conveyor frame and the second end of the first spring balancer includes a first rigid steel wire rope having a first carabiner snap clip which is rigidly coupled to a first stainless steel square plate eye hook fixedly attached to a corresponding first corner of the front cross bar of the rotary drum anchorage conveyor frame;

wherein a second spring balancer includes a first end and a second end wherein the first end includes a second hook connector which is rigidly attached by way of a second bolted flanged metal face plate to a second corner of the front joist of the conjunct frame of the rotary drum anchorage conveyor frame and the second end of the second spring balancer includes a second rigid steel wire rope having a second carabiner snap clip which is rigidly coupled to a second stainless steel square plate eye hook fixedly attached to a corresponding second corner of the front cross bar of the rotary drum anchorage conveyor frame;

wherein a third spring balancer includes a first end and a second end wherein the first end includes a third hook connector which is rigidly attached byway of a third bolted flanged metal face plate to a first corner of the rear joist of the conjunct frame of the rotary drum anchorage conveyor frame and the second end of the third spring balancer includes a third rigid steel wire rope having a third carabiner snap clip which is fixedly coupled to a third stainless steel square plate eye hook fixedly attached to a corresponding first corner of the rear cross bar of the rotary drum anchorage conveyor frame;

wherein a fourth spring balancer includes a first end and a second end wherein the first end includes a fourth hook connector which is rigidly attached byway of a fourth bolted flanged metal face plate to a second corner of the rear joist of the conjunct frame of the rotary drum anchorage conveyor frame and the second end of the third spring balancer includes a fourth rigid steel wire rope having a fourth carabiner snap clip which is rigidly coupled to a fourth stainless steel square plate eye hook fixedly attached to a corresponding second corner of the rear cross bar of the rotary drum anchorage conveyor frame;

a lateral axle support beam manufactured with steel having a longitudinal length, a front end and a rear end, the front end of the lateral axle support beam is permanently bolted to the second end of the front cross bar of the rotary drum anchorage conveyor frame by way of a first 90° steel beam clamp and the rear end of the lateral axle support beam is permanently bolted to the second end of the rear cross bar of the rotary drum anchorage frame byway of a second 90° steel beam clamp;

wherein the rotary drum is moveably aligned vertically above the metal gel basin, the rotary drum includes a circumferential metal drum casing along a longitudinal axis having a first planar circular side wall and a second planar circular side wall at opposed longitudinal ends, a first longitudinal end and a second longitudinal end, separated by a first longitudinal length, the circumferential metal drum casing defining an interior hollow cylindrical volume wherein the rotary drum includes a longitudinal cut-out spanning a second longitudinal length from the first planar circular side wall to the second planar circular side wall wherein the second longitudinal length of the longitudinal cut-out is measured being less than the first longitudinal length of the circumferential metal drum casing of the rotary drum;

wherein the longitudinal cut-out includes a top rim, a bottom rim, integrally configured with a first marginal side wall and a second marginal side wall wherein the first marginal side wall is proximate to the first planar circular side wall of the circumferential metal drum casing of the rotary drum and the second marginal side wall is proximate to the second planar circular side wall of the circumferential metal drum casing of the rotary drum;

wherein the first planar circular side wall includes a first recessed rotary drum frame including a first set of six triangular cut-outs disposed about a first central annular ring and wherein the second planar circular side wall includes a second recessed rotary drum frame including a second set of six triangular cut-outs disposed around a second central annular ring wherein the first set of six triangular cut-outs and the second set of triangular cut-outs provide circulation of ambient air to prevent overheating of the interior hollow cylindrical volume of the rotary drum;

wherein the dual gripping effector comprising:

a first gripping effector comprising:

a first master rigid plate;

a first handle operationally connected to a first all-thread encased in a first compression spring;

a second handle operationally connected to a second all-thread encased in a second compression spring;

a first gripping jaw; and a second gripping jaw;

a second gripping effector comprising:

a second master rigid plate;

a third handle operationally connected to a third all-thread encased in a third compression spring;

a fourth handle operationally connected to a fourth all-thread encased in a fourth compression spring;

wherein the first all-thread and the third all-thread are counterparts to each other and the second all-thread and the fourth all-thread are counterparts to each other such that the first all-thread and the third all-thread are operationally implemented in synchrony with each other;

the first gripping jaw; and the second gripping jaw;

wherein the first master rigid plate is permanently bolted to a central portion of the first planar circular side wall of the circumferential metal drum casing of the rotary drum wherein the first master plate is configured having a rectangular shape including a top edge, a bottom edge, a first side edge and a second side edge wherein the first master rigid plate rigidly supports the first all-thread and the second all-thread;

wherein the first all-thread is operationally telescopically arranged to slide within a first barrel bolt being affixed to a first side portion of the first master rigid plate;

wherein the first all-thread includes a first elongated shaft having a first shaft top portion having a first shaft top portion vertical length and a first shaft bottom portion having a first shaft bottom portion vertical length, respectively;

wherein the first shaft top portion of the first elongated shaft of the first all-thread includes a first 180° rotation steel pipe joint which is operationally mechanically coupled to the first handle of the first gripping effector by way of a first rotary bolt wherein the first handle includes a first casing grip;

wherein the first shaft bottom portion of the first elongated shaft of the first all-thread is encircled with a first compression spring extending the first shaft bottom portion vertical length of the first elongated shaft wherein a first terminal distal end of the first shaft bottom portion as one with a corresponding distal end of the first compression spring is bolted and threaded therethrough a top wall aperture of a top wall of a first rolled steel square tubing;

wherein the first gripping jaw is removably affixed to a bottom wall of the first rolled steel square tubing byway of a first steel rod having a proximal end and a distal end wherein the proximal end of the first steel rod is removably threaded and bolted therethrough a bottom wall aperture of the bottom wall of the first rolled steel square tubing;

wherein the distal end of the first steel rod extends downward therethrough a first open marginal side edge of the first longitudinal end of the longitudinal cut-out of the circumferential metal drum casing of the rotary drum wherein a terminal edge of the distal end of the first steel rod is integrally welded plumb to a first congruent interior portion of the first gripping jaw of the dual gripping effector interconnecting the first elongated shaft of the first gripping effector with the first gripping jaw;

wherein the first 180° rotation steel pipe joint of the first handle of the first gripping effector allows for an operable mechanical rotation of the first handle about a first shaft top header of the first shaft top portion of the first elongated shaft of the first all-thread to actuate a downward movement and an upward movement of the first gripping jaw of the dual gripping effector;

wherein the first gripping jaw of the dual gripping effector is configured with a first top margin portion and a first bottom margin portion;

wherein the first top margin portion of the first gripping jaw is integrally configured with a first semi-annular foot bordered with a first rigged teeth edge, wherein the first semi-annular foot includes a first longitudinal foot length equal to the first longitudinal length of the circumferential metal drum casing of the rotary drum wherein the first semi-annular foot curves towards the circumferential metal drum casing such that the first rigged teeth edge of the first griping jaw is oriented in an upward direction facing the circumferential metal drum casing of the rotary drum;

wherein the first bottom margin portion of the first gripping jaw includes a first smooth straight edge integrally confluently configured a first semi-annular distance from the first rigged teeth edge of the first gripping jaw wherein the first smooth straight edge of the first gripping jaw extends horizontally and parallel equal to the first longitudinal foot length of the first rigged teeth edge of the first gripping jaw;

wherein the second all-thread is operationally telescopically arranged to slide therein a second barrel bolt affixed to the first master rigid plate at or about 2.00-4.00 inches congruent to the right of the first all-thread having the second barrel bolt affixed to the first master rigid plate, wherein the second all-thread includes a second elongated shaft having a second shaft top portion and a second shaft bottom portion wherein the second shaft top portion is configured with a second shaft top portion vertical length equal to the first top shaft portion vertical length of the first elongated shaft and the second shaft bottom portion is configured with a second shaft portion vertical length equal to the first shaft bottom portion vertical length;

wherein the second shaft top portion of the second elongated shaft of the second all-thread includes a second 180° rotation steel pipe joint which is operationally mechanically coupled to the second handle of the second gripping effector by way of a second rotary bolt wherein the second handle includes a second casing grip;

wherein the second shaft bottom portion of the second elongated shaft of the second all-thread is encircled with a second compression spring extending the vertical length of the second shaft bottom portion of the second elongated shaft wherein a second terminal distal end of the second shaft bottom portion as one with a corresponding distal end of the second compression spring is bolted and threaded therethrough a top wall aperture of a top wall of a second rolled steel square tubing;

wherein the second gripping jaw is removably affixed to a bottom wall of the second rolled steel square tubing byway of a second steel rod having a proximal end and a distal end wherein the proximal end of the second steel rod is removably threaded and bolted therethrough a bottom wall aperture of the bottom wall of the second rolled steel square tubing;

wherein the second steel rod extends downward therethrough a second open marginal side edge of the first longitudinal end of the longitudinal cut-out of the circumferential metal drum casing of the rotary drum wherein the second open marginal side edge is disposed parallel at or about 2.0 inches from the first open marginal side edge wherein the distal end of the second steel rod is integrally welded plumb to a first congruent marginal interior portion of the second gripping jaw of the dual gripping effector interconnecting the second elongated shaft to the second gripping jaw;

wherein the second 180° rotation steel pipe joint of the first gripping effector allows for the operable mechanical rotation of the second handle about a second shaft top header of the second elongated shaft of the second all-thread to actuate a downward movement and an upward movement of the second gripping jaw of the dual gripping effector;

wherein the second gripping jaw is integrally configured with a second top margin portion and a second bottom margin portion;

wherein the second bottom margin portion of the second gripping jaw includes a second semi-annular foot bordered with a second rigged teeth edge, wherein the second semi-annular foot includes a longitudinal length equal to the longitudinal length of the circumferential metal drum casing of the rotary drum wherein the second semi-annular foot curves downward towards the circumferential metal drum casing of the rotary drum such that the second rigged teeth edge of the second griping jaw is oriented in a downward direction facing the circumferential metal drum casing of the rotary drum;

wherein the second top margin portion of the second gripping jaw includes a second smooth straight edge integrally confluently configured a second semi-annular distance from the second rigged teeth edge of the second gripping jaw wherein the second semi-annular distance is equal to the first semi-annular distance wherein the second smooth straight edge of the second gripping jaw extends horizontally and parallel equal to the longitudinal length of the second rigged teeth edge of the second gripping jaw wherein the second smooth straight edge of the second gripping jaw is oriented facing the first smooth straight edge of the first gripping jaw;

wherein the second gripping effector includes the second master rigid plate having a rectangular shape including a top edge, a bottom edge, a first side edge and a second side edge wherein the second master rigid plate is bolted to a central portion of the second planar circular side wall of the circumferential metal drum casing of the rotary drum wherein the second gripping effector includes the third all-thread and the fourth all-thread;

wherein the third all-thread is operationally telescopically arranged to slide therein a third barrel bolt to a first side portion of the second master rigid plate;

wherein the third all-thread includes a third elongated shaft having a third shaft top portion and a third shaft bottom portion wherein the third shaft top portion is configured with a vertical length equal to the first shaft top portion vertical length of the first shaft top portion of the first all-thread and the third shaft bottom portion is configured with a vertical length equal to the first shaft bottom portion vertical length of the first shaft bottom portion of the first elongated shaft of the first all-thread;

wherein the third shaft top portion of the third elongated shaft includes a third 180° rotation steel pipe joint which is operationally mechanically coupled to the third handle of the second gripping effector by way of a third rotary bolt wherein the third handle includes a third casing grip;

wherein the third shaft bottom portion of the third elongated shaft of the third all-thread is encircled with a third compression spring extending a vertical length of the third shaft bottom portion wherein a third terminal distal end of the third shaft bottom portion as one with a corresponding distal end of the third compression spring is threaded and bolted therethrough a top wall aperture of a top wall of a third rolled steel square tubing;

wherein the first gripping jaw is removably affixed to a bottom wall of the third rolled steel square tubing byway of a third steel rod having a proximal end and a distal end wherein the proximal end of the third steel rod is removably threaded and bolted therethrough a bottom wall aperture of the bottom wall of the third rolled steel square tubing;

wherein the third steel rod extends downward therethrough a third open marginal side edge of the second longitudinal end of the longitudinal cut-out of the circumferential metal drum casing of the rotary drum in longitudinal alignment to the first open marginal side edge of the longitudinal cut-out circumferential metal drum casing of the rotary drum wherein the distal end of the third steel rod is integrally welded plumb to a second congruent marginal interior portion of the first gripping jaw of the dual gripping effector interconnecting the third elongated shaft of the third all-thread to the first gripping jaw;

wherein the third 180° rotation steel pipe joint of the second gripping effector allows for the operable mechanical rotation of the third handle about a third shaft top header of the third elongated shaft of the third all-thread to actuate the downward movement of the first gripping jaw of the dual gripping effector;

wherein the fourth all-thread of the second gripping effector is operationally telescopically arranged to slide therein a fourth barrel bolt to a second side portion of the second master rigid plate positioned at or about 2.00-4.00 inches to the right of the third all-thread affixed therein the second master rigid plate;

wherein the fourth all-thread having a fourth elongated shaft having a fourth shaft upper portion and a fourth shaft lower portion wherein the fourth elongated shaft upper portion is configured with a vertical length equal in length to the second shaft upper portion vertical length of the second all-thread and the fourth shaft lower portion includes a vertical length equal to the second shaft lower portion vertical length of the second all-thread;

wherein the fourth shaft upper portion of the fourth elongated shaft includes a fourth 180° rotation steel pipe joint which is operationally mechanically coupled to the fourth handle of the second gripping effector by way of a fourth rotary bolt wherein the fourth handle includes a fourth casing grip;

wherein the fourth shaft bottom portion of the fourth elongated shaft of the fourth all-thread is encircled with a fourth compression spring extending a vertical length of the fourth shaft bottom portion wherein a fourth terminal distal end of the fourth shaft bottom portion as one with a corresponding distal end of the fourth compression spring is threaded and bolted therethrough a top wall aperture of a top wall of a fourth rolled steel square tubing;

wherein the second gripping jaw is removably affixed to a bottom wall of the fourth rolled steel square tubing byway of a fourth steel rod having a proximal end and a distal end wherein the proximal end of the fourth steel rod is removably threaded and bolted therethrough a bottom wall aperture of the bottom wall of the fourth rolled steel square tubing;

wherein the fourth steel rod extends downward therethrough a fourth open marginal side edge of the second longitudinal end of the longitudinal cut-out of the rotary drum wherein the fourth open marginal side edge is disposed parallel and at or about 2.0 inches from the third open marginal side edge of the rotary drum wherein the distal end of the fourth steel rod is integrally welded plumb to a second congruent marginal interior portion of the second gripping jaw of the dual gripping effector interconnecting the fourth elongated shaft of the fourth all-thread to the second gripping jaw;

wherein the fourth 180° rotation steel pipe joint of the second gripping effector allows for the operable mechanical rotation of the fourth handle about a fourth shaft top header of the fourth elongated shaft of the fourth all-thread to actuate the up and down movement of the second gripping jaw of the dual gripping effector;

wherein the first handle of the first gripping effector allows for the operable mechanical rotation of the first handle about the first shaft top header of the first elongated shaft of the first all-thread to actuate the downward movement and the upward movement of the first gripping jaw of the dual gripping effector, and, synchronously, the third handle of the second gripping effector of the dual gripping effector allows for the operable mechanical rotation of the third handle about the third shaft top header of the third all-thread to synchronously actuate the downward movement and upward movement of the first gripping jaw of the dual gripping effector such that a counterclockwise rotation of the first handle about the first shaft top header of the first all-thread causes the first all-thread to move downward having the first compression spring relax and lengthen and in synchrony therewith a clockwise rotation of the third handle about the third shaft top header of the third elongated shaft of the third all-thread causes the third all-thread to move downward having the third compression spring relax and lengthen whereby the first gipping jaw moves in the downward direction in a range of 0.50 inch to 5.00 inches distance measured away from the circumferential metal drum casing of the rotary drum forming a first gap in a range of 0.50 inch to 5.00 inches between the first gripping jaw and the circumferential metal drum casing of the rotary drum wherein the leading end of the pliant foam core body is received therein the first gap;

wherein the second handle of the first gripping effector allows for the operable mechanical rotation of the second handle about the second shaft top header of the second elongated shaft of the second all-thread to actuate the downward movement and the upward movement of the second gripping jaw of the dual gripping effector and synchronously the fourth handle of the second gripping effector of the dual gripping effector allows for the operable mechanical rotation of the fourth handle about the fourth shaft top header of the fourth all-thread to synchronously actuate the downward movement and the upward movement of the second gripping jaw of the dual gripping effector such that a clockwise rotation of the second handle about the second shaft top header of the second elongated shaft of the second all-thread causes the second all-thread to move in the downward direction having the second compression spring relax and lengthen and in synchrony therewith a counterclockwise downward movement of the fourth handle about the fourth shaft top header of the fourth elongated shaft of the fourth all-thread causes the fourth all-thread to move in the downward direction having the fourth compression spring relax and lengthen whereby the second gripping jaw moves in the downward direction in a range of 0.50 inch to 5.00 inches distance measured away from the circumferential metal drum casing of the rotary drum forming a second gap in a range of 0.50 inch to 5.00 inches between the second gripping jaw and the circumferential metal drum casing of the rotary drum whereby the pliant foam core body being wrapped about the rotary drum having the plurality of extended cubes in an upright facing position, the trailing end of the pliant foam core body is received therethrough the second gap;

wherein the first handle of the first gripping effector allows for the operable mechanical rotation of the first handle about the first shaft top header of the first elongated shaft of the first all-thread in a clockwise direction to actuate the first gripping jaw of the dual gripping effector to move in the upward direction towards the circumferential metal drum casing of the rotary drum and synchronously the third handle of the second gripping effector of the dual gripping effector allows for the operable mechanical rotation of the third handle about the third shaft top header of the third elongated shaft of the third all-thread in a counterclockwise direction to synchronously actuate the movement of the first gripping jaw of the dual gripping effector in the upward direction towards the circumferential metal drum casing of the rotary drum such that a clockwise rotation of the first handle about the first shaft top header of the first elongate shaft of the first all-thread causes the first all-thread to move upward having the first compression spring compress and shorten and in synchrony therewith the counterclockwise rotation of the third handle about the third shaft top header of the third all-thread causes the third all-thread to move upward having the third compression spring compress and shorten whereby the first gipping jaw moves in the upward direction towards the circumferential metal drum casing of the rotary drum operably to close the first gap between the first gripping jaw and the circumferential metal drum casing of the rotary drum while gripping the leading end of the pliant foam core body removably retained therebetween the first gripping jaw and the circumferential metal drum casing of the rotary drum;

wherein the second handle of the first gripping effector allows for the operable mechanical rotation of the second handle about the second shaft top header of the second elongated shaft of the second all-thread in a counterclockwise direction to actuate the movement of the second gripping jaw of the dual gripping effector in an upward direction towards the circumferential metal drum casing of the rotary drum and synchronously the fourth handle of the second gripping effector of the dual gripping effector allows for the operable mechanical rotation of the fourth handle about the fourth shaft top header of the fourth elongated shaft of the fourth all-thread in a clockwise rotation to synchronously actuate the upward movement of the second gripping jaw of the dual gripping effector such that the counterclockwise rotation of the second handle causes the second all-thread to move upward having the second compression spring compress and shorten and in synchrony therewith the counterclockwise rotation of the fourth handle causes the fourth all-thread to move upward having the fourth compression spring compress and shorten whereby the second gipping jaw moves in the upward direction towards the circumferential metal drum casing of the rotary drum operably to close the second gap between the second gripping jaw and the rotary drum while gripping the trailing end of the pliant foam core body removably retained therebetween the second gripping jaw and the circumferential metal drum casing of the rotary drum;

wherein the rotary drum motor is permanently mounted on a rotary drum motor support body having a rotary drum motor central support aperture wherein the rotary drum motor support body is permanently affixed to the lateral axle support beam of the rotary drum anchorage conveyor frame whereby the lateral axle support beam is inserted therethrough the rotary drum motor central support aperture;

a first trunnion having a first support aperture is affixed centrally on the rear cross bar and a second trunnion having a second support aperture is affixed centrally on the front cross bar rectilinearly aligned to the first support aperture of the first trunnion;

a first rotary drum cylindrical drive axle is mounted therethrough the first central annual ring of the first planar circular side wall of the rotary drum extending therethrough the longitudinal axis of the hollow cylindrical volume of the rotary drum to the second central annular ring of the second planar circular side wall of the rotary drum such that a second end of the first rotary drum cylindrical drive axle projects axially from the second central annular ring of the second planar circular side wall extending axially therethrough the second support aperture of the second trunnion to provide a second rotary drum sprocket mount and a first end of the first rotary drum cylindrical drive axle projects axially from the first central annular ring of the first planar circular side wall extending therethrough the first support aperture of the first trunnion to provide a first rotary drum sprocket mount;

a third trunnion having a third support aperture is permanently affixed to the front end of the lateral axle support beam and a fourth trunnion having a fourth support aperture is permanently affixed to the rear end of the lateral axle support beam wherein the third support aperture of the third trunnion is rectilinearly aligned to the fourth support aperture of the fourth trunnion;

a first drive shaft center support bearing having a front side, a rear side, and a first drive shaft center support bearing aperture, wherein the first drive shaft center support bearing is permanently affixed to the lateral axle support beam a first lateral distance from the third trunnion wherein the first drive shaft center support aperture is rectilinearly aligned with the third support aperture of the third trunnion;

a second drive shaft center support bearing having a front side, a rear side, and a second drive shaft center support bearing aperture wherein the second drive shaft center support bearing is permanently affixed to the lateral axle support beam a second lateral distance from the fourth trunnion wherein the second drive shaft center support bearing aperture is rectilinearly aligned with the fourth support aperture of the fourth trunnion wherein the first lateral distance is equal to the second lateral distance;

a first differential pilot bearing having a front side, a rear side and a first differential pilot bearing aperture wherein the first differential pilot bearing is affixed to the lateral axle support beam proximate to the rear side of the first drive shaft center support bearing wherein the first differential pilot bearing aperture is rectilinearly aligned to the first drive shaft center support bearing aperture of the first drive shaft center support bearing;

a second differential pilot bearing having a front side, a rear side and a second differential pilot bearing aperture wherein the second differential pilot bearing is affixed to the lateral axle support beam proximate to the rear side of the second drive shaft center support bearing wherein the second differential pilot bearing aperture is rectilinearly aligned to the second drive shaft center support bearing aperture of the second drive shaft center support bearing;

a second rotary drum cylindrical drive axle having a first axial end and a second axial end is rotatably mounted on the lateral axle support beam horizontally longitudinally parallel to the rotary drum wherein the second axial end of the second rotary drum cylindrical drive axle is inserted therethrough the third support aperture of the third trunnion extending therethrough the first drive shaft center support bearing aperture of the first drive shaft center support bearing extending therethrough the first differential pilot bearing aperture of the first differential pilot bearing therethrough the rotary drum motor central support aperture of the rotary drum support body of the rotary drum motor extending therethrough the second differential pilot bearing aperture of the second differential pilot bearing and therethrough the second drive shaft center support bearing aperture of the second drive shaft center support bearing and therethrough the fourth support aperture of the fourth trunnion such that the second axial end of the second rotary drum cylindrical drive axle projects axially from the fourth support aperture of the fourth trunnion to provide a fourth rotary drum sprocket mount and the first axial end of the second rotary drum cylindrical drive axle projects axially from the third support aperture of the third trunnion to provide a third rotary drum sprocket mount;

wherein a first rotary drum sprocket is rotatably mounted on the first rotary drum sprocket mount of the first end of the first rotary drum cylindrical drive axle and a third rotary drum sprocket is rotatably mounted on the third rotary drum sprocket mount of the first axial end of the second rotary drum cylindrical drive axle wherewith a first rotary drive chain engages the first rotary drum sprocket and the third rotary drum sprocket wherein a first rotary drive chain plate cover is mounted thereon the first rotary drum sprocket and the third rotary drum sprocket to shield the first rotary drive chain;

wherein a second rotary drum sprocket is rotatably mounted on the second rotary drum sprocket mount of the second end of the first rotary drum cylindrical drive axle and a fourth rotary drum sprocket is rotatably mounted on the fourth rotary drum sprocket mount of the second axial end of the second rotary drum cylindrical drive axle wherewith a second rotary drive chain engages the second rotary drum sprocket and the fourth rotary drum sprocket wherein a second rotary drive chain plate cover is mounted thereon the second rotary drum sprocket and the fourth rotary drum sprocket to shield the second rotary drive chain;

wherein the rotary drum motor is implemented to rotate the rotary drum in a 360° rotations when in operation wherein the rotary drum motor is controlled by a rotary drum motor single speed actuator having an on-switch and an off-switch to control an on-mode rotation and an off-mode rotation of the rotary drum;

wherein the rotary drum motor includes a rotary drum motor electrical gear box operably electrically wired to the electrical power source concurrently operably electrically wired to a rotary drum motor drive integrally connected to a first rotary drum motor output shaft being coaxial with the second rotary drum cylindrical drive axle to cause the second rotary drum cylindrical axle to rotate to perpetuate the first rotary drum cylindrical drive axle to rotate by way of the rotation of the third rotary drum sprocket of the second rotary drum cylindrical drive axle and the first rotary drum sprocket of the first rotary drum cylindrical drive axle mechanically operationally rotationally engaged about the first rotary drive chain and synchronously the fourth rotary drum sprocket of the second rotary drum cylindrical drive axle and the second rotary drum sprocket of the first rotary drum cylindrical drive axle to rotate mechanically operationally rotationally engaged by the second rotary drive chain;

wherein when the rack and pinion motor is actuated byway of the down-control knob to rotate a third drive chain around the first rack and pinion sprocket and the second rack and pinion sprocket operable to facilitate the downward descent of each of the first rack and pinion gear system, the second rack and pinion gear system, the third rack and pinion gear system, and the fourth rack and pinion gear system to enable the downward vertical direction of the rotary drum having the pliant foam core body mounted thereon lowered into an upper portion of the 380° F. heated liquid gel of the gel bath whereupon the subsequent rotation of the rotary drum inducts suction of the 380° F. heated liquid gel into each of the plurality of extended cubes of the pliant foam core body;

wherein when the rotary drum motor is actuated to the "on" mode rotation the rotary drum motor operates the rotation of the first rotary drive chain around the first rotary drum sprocket of the first rotary drum cylindrical drive axle and a third rotary drum sprocket of the second rotary drum cylindrical drive axle synchronously to rotate the second rotary drive chain around a second sprocket of the first rotary drum cylindrical drive axle and a fourth rotary drum sprocket of the second rotary drum cylindrical drive axle to enable the continuous rotation of the rotary drum at a single speed about a horizontal axis such that the pliant foam core body being removably retained by the first gripping jaw and the second gripping jaw rotates thereon the rotary drum;

the gel position sensor is disposed on a front facing metal wall of the front cross bar wherein when the pliant foam core body is gripped circumferentially around the rotary drum and descends into the 380° F. heated liquid gel contained in the metal gel basin of the gel heating metal table the gel position sensor detects a top surface of the 380° F. heated liquid gel whereby the gel position sensor sends an electric signal to the rack and pinion motor whereby the descent of the rotary drum is halted at the predetermined depth to prevent an unwanted retention of an influent of 380° F. heated liquid gel upon the exterior cube surfaces of the plurality of extended cubes and the outlying surfaces of each of the plurality of recessed channels of the pliant foam core body such that as the rotary drum continues to rotate 360° for at least 45 seconds monitored by the timer so that each of the exterior cube surfaces of the plurality of extended cubes and the outlying surfaces of each of the plurality of recessed channels pliant foam core body is infused with 380° F. heated liquid gel to a predetermined gel thickness to create a hydrophobic gel barrier over each of the exterior cube surfaces of each of the plurality of extended cubes of the series of the plurality of extended cubes and outlying surfaces of each of the plurality of recessed channels to form a heated gel infused pliant foam core body;

the rack and pinion motor being actuated by turning the up-control knob such that the rotary drum having the heated gel infused pliant foam core body removably retained thereon is lifted in the reverse upward vertical direction to a higher position therefrom the metal gel basin as the rotary drum continues to rotate;

wherein the first handle of the first gripping effector is rotated in the counterclockwise direction and synchronously the third handle of the second gripping effector of the dual gripping effector is rotated in the clockwise direction to actuate the movement of the first gripping jaw in the downward direction such that the first gripping jaw moves away from the circumferential metal drum casing of the rotary drum whereby the leading end of the heated gel infused pliant foam core body is released from the first gripping jaw whereby the leading end of the heated gel infused pliant foam core body advances to the heated gel infused pliant foam core body lift;

wherein the second handle of the first gripping effector is rotated in the clockwise direction and synchronously the fourth handle of the second gripping effector of the dual gripping effector is rotated in the counterclockwise direction to actuate the movement of the second gripping jaw in the downward direction such that the second gripping jaw moves away from the circumferential metal drum casing of the rotary drum whereby the trailing end of the heated gel infused pliant foam core body is released from the second gripping jaw whereby the trailing end of the heated gel infused pliant foam core body hindmost to the leading end of the heated gel infused pliant foam core body advances to the heated gel infused pliant foam core body lift as the leading end of the heated gel infused pliant foam core body advances to the heated gel infused pliant foam core body resting and transport table;

wherein the heated gel infused pliant foam core body lift includes a rectangular slide having a top plate and a bottom plate, a first side edge and a second side edge, a front side edge, and a rear side edge, wherein the top plate is configured with a top anti-static high temperature mat having two layers of elastomer wherein the first layer is manufactured with a static dissipative rubber layer and the second layer is a bottom black carbon-loaded conductive scrim layer laminated to the static dissipative rubber layer configured with at least one metal snap to connect to a common ground connected to an electrical outlet by way of a grounding cable to provide protection against shock and electrical leakage;

wherein, the heated gel infused pliant foam core body lift is operatively connected to a first elbow arm connector and a second elbow arm connector wherein each of the first elbow arm connector and the second elbow arm connector is extendable at an angle downward from the second end of the front cross bar and the second end of the rear cross bar of the rotary drum anchorage conveyor frame, respectively, wherein the first elbow arm connector includes a first upper arm connector and a first lower arm connector wherein the first upper arm connector of the first elbow arm connector is operatively connected to the second end of the front cross bar by way of a first steel hinge and the first lower arm connector of the first elbow arm connector is operatively connected to an upper portion of the first side edge of the heated gel infused pliant foam core body lift byway of a second steel hinge wherein the second upper connector arm of the second elbow arm connector is operatively connected to the second end of the rear cross bar by way of a third steel hinge and the second lower connector arm of the second elbow arm connector is operatively connected to an upper portion of the second side edge of the heated gel infused pliant foam core body lift by way of a fourth steel hinge;

the heated gel infused pliant foam core body resting and transport table, comprising: a table structure including a perforated stainless steel body having a removable perforated rigid silicone non-slip tabletop and a perforated rigid silicone non-slip table bottom joined by four rigid non-slip silicone walls including a rigid silicone non-slip front facing wall, a rigid silicone non-slip rear facing wall, a first rigid silicone non-slip side wall and an opposing second rigid non-slip side wall joined at four corners, wherein the first rigid silicone non-slip side wall is configured with a front handlebar brake;

wherein the table structure of the heated gel infused pliant foam core body resting and transport table is supported by four insulated table support columns including a rigid silicone non-slip first front table support column, a second front rigid silicone non-slip front table support column, a first rigid silicone non-slip first rear table support column, and a second rear insulated table support column wherein each of the four insulated table support columns are configured with a 360° swivel wheel affixed to a terminal distal end of each of the four insulated table support columns wherein each of the 360° swivel wheels is integrated with the front handlebar brake;

wherein a braking rod locks each of the 360° swivel wheels and the braking rod is actuated when the front handlebar brake of the heated gel infused pliant foam core body resting and transport table is pressed down to lever a back end of the braking rod in an up position to cause the braking rod to pull up and release pressure from each of the 360° swivel wheels thereby unlocking each of the 360° swivel wheels;

the exhaust hood, comprising:

a metal rectangular pyramid structure including four cohesive triangular metal panels being integrally welded together forming an apex and a rectangular base configured with a top opening at the apex having a circumferential cross section and a bottom opening integrated within the rectangular base having a rectangular cross section wherein the bottom opening having an exterior facing peripheral rim having four sides, a front facing rim wall, a rear facing rim wall, a first lateral facing rim wall, a second lateral facing rim wall;

wherein the exhaust hood is anchored to a metal ceiling ladder mount permanently affixed to a ceiling by way of a stainless steel cable system;

wherein the stainless steel cable system is equipped with a plurality of 1.50 mm steel suspension cables configured being disposed contiguous with the rectangular base of the exhaust hood so that a first end of a first 1.50 mm steel suspension cable is affixed to a first metal rung of the metal ceiling ladder mount and the second end of the first 1.50 mm steel suspension cable is welded coaxial to a first end of the front facing rim wall of the exhaust hood, a first end of a second 1.50 mm steel suspension cable is affixed to a second metal rung of the metal ceiling ladder mount and the second end of the 1.50 mm steel suspension cable is welded coaxial to a second end of the front facing rim wall of the exhaust hood, a first end of a third 1.50 mm steel suspension cable is affixed to a third metal rung of the metal ceiling ladder mount and the second end of the third 1.50 mm steel suspension cable is welded coaxial to a first end of the rear facing rim wall of the exhaust hood, a first end of a fourth 1.50 mm steel suspension cable is affixed to a fourth metal rung of the metal ceiling ladder mount and a second end of the fourth 1.50 mm steel suspension cable is welded coaxial to a second end of the rear facing rim wall of the exhaust hood, a first end of a fifth 1.50 mm steel suspension cable is affixed to a fifth rung of the metal ceiling ladder mount and a second end of the fifth 1.50 mm steel suspension cable is welded coaxial to a top portion of a metal exhaust hood conduit;

an open steel lattice framework including a plurality of contiguous lateral metal rods is integrated within the bottom opening of the exhaust hood bounded by the exterior facing peripheral rim dimensioned with an open steel lattice framework surface area of at least 84 inches×76 inches;

wherein the plurality of contiguous lateral metal rods is configured symmetrically aligned a distance apart from each other in rows extending from the first lateral facing rim wall, a second lateral facing rim wall of the entirety of the open steel lattice framework;

wherein the circumferential top opening of the exhaust hood is fluidly connected to the metal exhaust hood conduit having a first conduit opening and a second conduit opening wherein the first conduit opening is fluidly connected to a vacuum generator motor configured with 1500 cubic feet per minute wherein the vacuum generator motor provides a predetermined force of air flow in fluid communication with the open steel lattice framework configured to generate a predetermined vacuum pull therethrough the open steel lattice framework, wherein the second conduit opening is fluidly connected to an interface delivering a stream of hot air into an outside environment; and the vacuum generator motor is operationally connected to an ON/OFF operation switch, wherein the predetermined vacuum pull is purged therethrough the open steel lattice framework when the vacuum generator motor is in an on-operation mode, and the predetermined vacuum pull is ceased when the vacuum generator motor is in an off-operation mode to enable pull of hot air being emitted from the 380° F. heated liquid gel within the metal gel basin.

2. The rotary drum system for the formation of the gel infused pliant foam body, according to claim 1 wherein the first trunnion, the second trunnion, the third trunnion, the fourth trunnion, the fifth trunnion, each includes a trunnion locking mechanism configured with a screw locking lever.

3. The rotary drum system for the formation of the gel infused pliant foam body, according to claim 1, wherein the first tributary gel supply pipe and the second tributary gel supply pipe can be disposed at a centralized position directly above the front facing metal basin wall of the metal gel basin and a centralized position directly above the rear facing metal basin wall of the metal gel basin such that each of the dual streams of gel simultaneously and straightaway fluidly are turbulently injected into the metal gel basin of the gel heating metal table to a predetermined volume of the 380° F. heated liquid gel wherein when a turbulent mixing of the gel sustains the 380° F. temperature of the 380° F. heated liquid gel of the gel bath within the metal gel basin.

4. The rotary drum system for the formation of the gel infused pliant foam body, according to claim 1, wherein the electrical power supply is configured to carry high loads with an output motor heater, an auxiliary fan, a trip limit, configured with a 380-480V voltage range, heavy duty current at 623 Amps, heavy duty HP at 400 HP, and drives for the extruder system and the temperature controller operatively electrically connected to the planar heater device within a range of 380° F.-400° F. thereby heating the metal gel basin.

5. The rotary drum system for the formation of the gel infused pliant foam body, according to claim 1, wherein the rotary drum can revolve at a rate of between approximately 1.25-1.75 revolutions per minute (rpm).

6. The rotary drum system for the formation of the gel infused pliant foam body, according to claim 1, wherein the rotary drum having the pliant foam core body clutched by the dual gripping effector wherein the rotary drum continues to rotate 360° for 45 seconds measured by the timer so that each of the exterior cube surfaces of the plurality of extended cubes and the outlying surfaces of each of the plurality of recessed channels of the pliant foam core body is infused with 380° F. heated liquid gel to a predetermined gel thickness to create a hydrophobic gel barrier over each of the exterior cube surfaces of each of the plurality of extended cubes of the series of the plurality of extended cubes and outlying surfaces of each of the plurality of recessed channels to form the heated gel infused pliant foam core body.

7. The rotary drum system for the formation of the gel infused pliant foam body, according to claim 1, wherein the gel position sensor is selected from the group comprising any one of potentiometric linear transducer sensors, laser position sensors, and contact position sensors.

8. The rotary drum system for the formation of the gel infused pliant foam body, according to claim 1, wherein the gel is selected from any one of a colloidal matter comprising any one of a gelatinous matter that is characterized to consist of two phases that are intertwined with one another having a solid particle network and a liquid solvent phase when treated with heat in the range of 360° F.-380° F.

9. The rotary drum system for the formation of the gel infused pliant foam body, according to claim 1, wherein each of the 360° swivel wheels are selected from the group of 360° swivel wheels comprising simple braking pad and a shoehorn brake.

10. The rotary drum system for the formation of the gel infused pliant foam body, according to claim 1, wherein the metal gel basin floor and the four upright perimetric metal walls of the metal gel basin can be treated with a non-stick perfluorocarbon coating selected from any one of the non-stick perfluorocarbons comprising polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).

11. The rotary drum system for the formation of the gel infused pliant foam body, according to claim 1, wherein a first interior circumferential wall of the first gel supply pipe inlet port and the second interior circumferential wall of the second gel supply pipe inlet port is treated with a non-stick perfluorocarbon coating selected from any one of the non-stick perfluorocarbons comprising polytetrafluoroethylene (PTFE), polyvinylidene fluoride (PVDF), fluorinated ethylene propylene (FEP), perfluoroalkoxy alkane (PFA), and ethylene tetrafluoroethylene (ETFE).

12. The rotary drum system for the formation of the gel infused pliant foam body, according to claim 1, wherein a first interior circumferential wall of the first gel supply pipe inlet port and a second interior circumferential wall of the second gel supply pipe inlet port and the first tributary gel supply pipe and the second tributary gel supply pipe is treated with a non-stick perfluorocarbon coating selected from any one of the non-stick perfluorocarbons comprising polytetrafluoroethylene (PTFE), polyvinylidene fluoride (PVDF), fluorinated ethylene propylene (FEP), perfluoroalkoxy alkane (PFA), and ethylene tetrafluoroethylene (ETFE) to prevent accumulation of the gel within the first tributary gel supply pipe and the second tributary gel supply pipe.

13. The rotary drum system for the formation of the gel infused pliant foam body, according to claim 1, wherein the gel heating metal table and the metal gel basin is manufactured with any one of the metals selected from the group comprising, stainless steel, aluminum, copper, iron, cast iron, or any combination thereof.

14. The rotary drum system for the formation of the gel infused pliant foam body, according to claim 1, wherein the rotary drum further includes a variety of size markers indicated in circumferential colored lines disposed around the rotary drum, wherein the variety of size markers includes a King, a Queen, a Double, and a Twin.

15. The rotary drum system for the formation of the gel infused pliant foam body, according to claim 1, further comprising a cutting device wherein the dual gripping effector includes the first rigged teeth edge of the first gripping jaw and the second rigged teeth edge of the second gripping jaw being sharpened to provide serrated blades to enable cutting of the pliant foam core body to any of a variety designated sizes indicated by the variety of size markers including King, Queen, Double, and Twin, such that when each of the first gripping jaw and the second gripping jaw are raised and tightened against the pliant foam core body the pliant foam core body can be cut.

16. The rotary drum system for the formation of the gel infused pliant foam body, according to claim 1, wherein the exhaust hood and the metal ceiling ladder mount is manufactured with any one of the metals selected from the group comprising, stainless steel, aluminum, copper, iron, cast iron, or any combination thereof.

17. The rotary drum system for the formation of the gel infused pliant foam body, according to claim 1, wherein a quick reference code is imprinted thereon a surface of the gel infused pliant foam core body wherein upon opening the quick reference code by way of a smart phone a patent number, or a patent application number, or a trademark registration number identified with the gel pliant foam body system and/or the gel infused pliant foam core body.

18. The rotary drum system for the formation of the gel infused pliant foam body, according to claim 1, further including a method for the formation of the gel infused pliant foam body implementing the rotary drum system, the method comprising:

Step 1. providing the rotary drum system for the formation of the gel infused pliant foam body;

Step 2. providing any one of a get pliant foam core body of the plurality of pliant foam core bodies;

Step 3. rotating the first handle of the first gripping effector of the dual gripping effector counterclockwise about the first shaft top header of the first elongated shaft of the first all-thread and, simultaneously, rotating the third handle of the second gripping effector of the dual gripping effector in a counterclockwise direction causing the opening of the first gripping jaw of the dual gripping effector away from the circumferential metal drum casing along the first longitudinal length of the rotary drum causing the first gap between the first gripping jaw and the rotary drum;

Step 4. feeding the leading end of the ge pliant foam core body into the first gap between the first gripping jaw and the rotary drum along an entirety of the first longitudinal length of the rotary drum;

Step 5. mounting the pliant foam core body thereupon the rotary drum oriented with the series of the plurality of extended cubes facing in an upright direction wherein the bottom flat surface of the bottom pliant foam core body portion is in immediate contact with the circumferential metal drum casing of the rotary drum;

Step 6. rotating the first handle of the first gripping effector about the first shaft top header of the first elongated shaft of the first all-thread in a clockwise direction to actuating the first gripping jaw of the dual gripping effector to move in the upward direction towards the circumferential metal drum casing of the rotary drum and synchronously rotating the third handle of the second gripping effector of the dual gripping effector about the third shaft top header of the third elongated shaft third all-thread in a counterclockwise direction actuating the movement of the first gripping jaw of the dual gripping effector in the upward direction towards the circumferential metal drum casing of the rotary drum causing a clockwise rotation of the first handle about the first shaft top header of the first elongated shaft of the first all-thread causing the first all-thread to move upward having the first compression spring compress and shorten and in synchrony therewith rotating the third handle counterclockwise about the third shaft top header of the third elongated shaft of the third all-thread causing the third all-thread to move upward having the third compression spring compress and shorten causing the first gipping jaw moves in the upward direction towards the circumferential metal drum casing of the rotary drum operably closing the first gap between the first gripping jaw and the circumferential metal drum casing of the rotary drum while gripping the leading end of the pliant foam core body removably retained therebetween the first gripping jaw and the circumferential metal drum casing of the rotary drum;

Step 7. rotating the second handle of the first gripping effector bout the second shaft top header of the second all-thread such that a clockwise rotation of the second handle about the second shaft top header of the second elongated shaft of the second all-thread causes the second all-thread to move in the downward direction having the second compression spring relax and lengthen and in synchrony therewith a counterclockwise downward movement of the fourth handle about the fourth shaft top header of the fourth elongated shaft fourth all-thread causes the fourth all-thread to move in the downward direction having the fourth compression spring relax and lengthen whereby the second gripping jaw moves in the downward direction in a range of 0.50 inch to 5.00 inches distance measured away from the circumferential metal drum casing of the rotary drum forming a second gap in a range of 0.50 inch to 5.00 inches between the second gripping jaw and the circumferential metal drum casing of the rotary drum;

Step 8. feeding the trailing end of the pliant foam core body into the second gap between the second gripping jaw and the circumferential metal drum casing of the rotary drum whereby the pliant foam core body being wrapped about the rotary drum maintaining the bottom flat surface of the bottom pliant foam core body portion being in immediate contact with the circumferential metal drum casing of the rotary drum having the plurality of extended cubes being in an upright facing position;

Step 9. rotating simultaneously the second handle of the first gripping effector in a counterclockwise direction and synchronously rotating the fourth handle of the second gripping effector in a clockwise direction causing the upward movement of the second gripping jaw of the dual gripping effector against the trailing end of the pliant foam core body thereby causing closing of the second gap between the second gripping jaw and the rotary drum causing the trailing end of the pliant foam core body to be removably gripped between the second gripping jaw and the rotary drum;

Step 10. adjusting the temperature controller operatively electrically connected to the at least one planar heater device within a range of 380° F.–400° F. thereby pre-heating the metal gel basin;

Step 11. maneuvering, simultaneously, the first valve of the first tributary gel supply pipe to be parallel to the first tributary gel supply pipe and maneuvering the second valve of the second tributary gel supply pipe to be parallel to the second tributary gel supply pipe of the dual gel supply pipe system causing the opening of the first valve and the second valve of each of the first tributary gel supply pipe and the second tributary gel supply pipe, respectively, fluidly connected to the gel supply well causing the dual steam of the first stream of gel and the second stream of gel to enter into the metal gel basin of the gel heating metal table reaching the predetermined volume of gel wherein control of the flow of the first stream of gel therethrough the first tributary gel supply pipe being controlled by the first valve operationally configured on the first tributary gel supply pipe and the second stream of gel being controlled by the second valve operationally configured on the second tributary gel supply pipe proximate to the gel supply well and thereby providing the dual stream of gel being propelled byte variable frequency drive pump to enter the metal gel basin allowing the gel to reach the predetermined volume of gel indicated by a metal measurement bar disposed on an interior surface of the four upright perimetric metal walls of the metal gel basin;

Step 12. simultaneously maneuvering the first valve of the first tributary gel supply pipe to be perpendicular to the first tributary supply pipe and maneuvering the second valve of the second valve of the second tributary supply pipe to be perpendicular to the second tributary gel supply pipe causing the closing of the first valve of the first tributary gel supply pipe and causing the closing the second valve of the second tributary gel supply pipe of the dual get supply pipe system of the get supply well causing the dual stream of gel of the first stream of gel and the second stream of gel to cease entering the metal gel basin of the gel heating metal table;

Step 13. adjusting the temperature controller operatively electrically connected to the at least one planar heater device to 380° F. maintaining a 380° F. heated liquid gel of the gel bath contained therein the metal gel basin;

Step 14. turning the vacuum generator motor to an "ON" operation mode byway of the ON-OFF operation switch providing the vacuum pulling force enabling rising hot air being emitted from the 380° F. heated liquid gel bath within the metal gel basin to flow therethrough the open steel lattice framework of the bottom opening of the exhaust hood therethrough first conduit opening fluidly connected to the vacuum generator motor and the second conduit opening of the metal exhaust hood conduit fluidly connected to the interface delivering a stream of hot air into an outside environment;

Step 15. turning the down-control knob of the dual direction rack and pinion actuator causing the rotary drum having the pliant foam core body mounted and gripped thereon to move in the downward vertical direction into the 380° F. heated liquid gel of the gel bath contained therein the metal gel basin of the gel heating metal table wherein at the predetermined depth the get position sensor touching on the top surface of the 380° F. heated liquid gel halts the downward vertical movement of the rotary drum preventing the unwanted retention of the influent of the 380° F. heated liquid gel upon the plurality of extended cubes of the pliant foam core body;

Step 16: actuating the on switch of the rotary drum motor single speed actuator of the rotary drum motor causing the rotation of the rotary drum within the predetermined depth of the hot liquid gel bath within the metal gel basin in a single 360° rotation at 1.25-1.75 revolutions per minute facilitating forming a hydrophobic gel barrier of a predetermined thickness on the outer peripheral surfaces of each of the plurality of extended cubes and on the outlying surfaces of each of the plurality of recessed channels while retaining the top pliant core body portion of the pliant foam core body to be untouched by the 380° F. heated liquid gel thereby forming a heated gel-infused pliant foam core body;

Step 17. turning the up-control knob of the dual direction rack and pinion actuator causing the rotary drum having the heated gel-infused pliant foam core body mounted and gripped thereon to move in the upward vertical direction causing the heated gel-infused pliant foam core body being lifted out from the 380° F. heated liquid gel of the gel bath;

Step 18. actuating the off switch of the rotary drum motor single speed actuator of the rotary drum motor causing the rotation of the rotary drum to halt;

Step 19. rotating the first handle of the first gripping effector in the counterclockwise direction and, synchronously, rotating the third handle of the second gripping effector in a clockwise direction causing the opening of the first gripping jaw away from the circumferential metal drum casing of the rotary drum opening the first gap between the first gripping jaw of the dual gripping effector and the rotary drum releasing the leading end of the heated gel pliant foam core body from the first gripping jaw;

Step 20. maneuvering the leading end of the heated gel pliant foam core body away from the rotary drum positioning the heated gel infused pliant foam core body having the plurality of heated gel extended cubes facing in an upright direction wherein the bottom flat surface of the heated gel pliant foam core body is in immediate contact with the top anti-static high temperature mat of the top plate of the heated gel infused pliant foam core body lift;

Step 21. rotating the second handle of the first gripping effector in a clockwise direction and the synchronously rotating the fourth handle of the second gripping effector in a counterclockwise direction causing the opening of the second gripping jaw opening the second gap between the second gripping jaw and the circumferential metal drum casing of the rotary drum thereby releasing the trailing end of the heated gel pliant foam core body from the second gripping jaw;

Step 22. maneuvering the trailing end of the heated gel pliant foam core body away from the rotary drum positioning the heated gel infused pliant foam core body extending from the leading end to the trailing end having the plurality of heated gel extended cubes facing in an upright direction wherein the bottom flat surface of the heated gel pliant foam core body portion is in immediate contact with the top anti-static high temperature mat of the top plate of the heated gel infused pliant foam core body lift;

Step 23. placing the heated gel pliant foam core body in a level prone position having the plurality of heated gel plurality of extended cubes facing in the upright direction being supported by the heated gel infused pliant foam core body resting and transport table allowing the heated gel pliant foam core body to rest for at least three minutes allowing the heated gel to cure forming a hydrophobic gel barrier over each of the exterior cube surfaces of each of the plurality of extended cubes of the series of the plurality of extended cubes and outlying surfaces of each of the plurality of recessed channels to form a gel infused pliant foam core body;

Step 24. maintaining the heated gel infused pliant foam core body in a level prone position for at least three minutes at ambient temperature allowing the 380° F. heated liquid gel to cure forming a gel infused pliant foam core body;

Step 25. repeating steps 1-24 until a predetermined number of gel infused pliant foam core bodies are formed;

Step 26. ejecting remnant gel from the metal gel basin therethrough the first gel supply inlet port and the second gel supply pipe inlet port by injecting oil into the metal gel basin byway of one or more portable silicone double ply discharge hoses wherein a first end of a first portable silicone double ply discharge hose is removably attached to a first receiving port of an oil container activated by an oil pump and the second end of the first portable silicone double ply discharge hose is removably attached to the first gel supply inlet port wherein a first end of a second portable silicone double ply discharge hose is removably attached to the second gel supply pipe inlet port and the second end of the second portable silicone double ply discharge hose is removably attached to a second receiving port of the oil container activated by the oil pump wherein when activated remnant gel is ejected and disposed into a transportable rubber bin;

Step 27. rolling the gel heating metal table cover onto the first roller track and the second roller track of the gel heating metal table thereby enclosing the metal get basin of the get heating metal table;

Step 28. securing the heated get infused pliant foam core body resting and transport cover onto the removable perforated rigid silicone non-slip tabletop of the heated gel infused pliant foam core body resting and transport table wherein the heated get infused pliant foam core body resting and transport cover is a fiberglass fire blanket; and Step 29. providing an imprint of a trademark specimen characterized with a color selected from any one of the group of colors comprising white, blue, and orange and imprinting one or more of the plurality of extended cubes with the imprint.

19. A kit, including a rotary drum system for the formation of a gel infused pliant foam body, comprising:

a rotary drum system for the formation of a gel infused pliant foam body; a gel heating metal table; a gel heating metal table cover; a gel heating metal table cover weighted rubber mat; a plurality of pliant foam core bodies; an overhead double-beam bridge crane; a rotary drum anchorage conveyor frame; a rack and pinion motor; a rotary drum; a rotary drum motor; a dual gripping effector; a get position sensor; a timer; an exhaust hood; a heated gel infused pliant foam core body lift; a plurality of top anti-static high temperature mat; a heated gel infused pliant foam core body resting and transport table; a dual gel supply pipe system; a gel extruder system; a gel subscription for recurring delivery; a pliant foam core body subscription for recurring pliant foam core body delivery service; a geofoam core body system instruction manual including a quick reference code to access a manufacturer's instructions; warranty; contact information; ion-intercalated Mxene film subscription for recurring delivery; a plurality of bolted column end cap plates; a plurality of I-beam end plates; a plurality of 90° cast aluminum channel joiner fitting connectors; a plurality of steel double joist holders; a plurality of plain push trolleys being rivet locked; a plurality of iron face plates; a plurality of wheels adapted for the gel heating metal table cover; a plurality of 360° swivel wheels adapted for the heated gel infused pliant foam core body resting and transport table; a plurality of gripping effectors; a plurality of rolled steel square tubing; a plurality of rack and pinion drive chains; a plurality of first rotary drum drive chains; a plurality of second rotary drum drive chains; a plurality of sprockets; a plurality of trunnions; a plurality of drive shaft center support bearings; a plurality of differential pilot bearings; a plurality of hook connectors; a plurality of carabiner snap clips; a plurality of rotary drum cylindrical drive axle; a plurality of bolted flanged metal face plates; a plurality of I-beam end plates; a plurality of stainless steel square plate eye hook; quick reference code label including intellectual property identifying registration numbers, or serial numbers, or certificate numbers, comprising any one of the group of intellectual property patents, trademarks, and copyright; Occupational Safety and Health Administration (OSHA) guidelines for the planar heater device and for the gel heating metal table; and gel product information sheets.

* * * * *